(12) United States Patent
Cioanta et al.

(10) Patent No.: US 12,110,238 B2
(45) Date of Patent: *Oct. 8, 2024

(54) SYSTEMS AND METHODS FOR ACTIVATING AND DEWATERING SLUDGE USING ACOUSTIC PRESSURE SHOCK WAVES

(71) Applicant: SANUWAVE, INC., Suwanee, GA (US)

(72) Inventors: Iulian Cioanta, Milton, GA (US); John Jackson, Buford, GA (US)

(73) Assignee: SANUWAVE, INC., Suwanee, GA (US)

( * ) Notice: Subject to any disclaimer, the term of this patent is extended or adjusted under 35 U.S.C. 154(b) by 346 days.

This patent is subject to a terminal disclaimer.

(21) Appl. No.: 17/676,495

(22) Filed: Feb. 21, 2022

(65) Prior Publication Data

US 2022/0371922 A1 Nov. 24, 2022

Related U.S. Application Data

(62) Division of application No. 16/504,583, filed on Jul. 8, 2019, now Pat. No. 11,254,589, which is a division
(Continued)

(51) Int. Cl.
*B01D 21/00* (2006.01)
*B01D 9/00* (2006.01)
(Continued)

(52) U.S. Cl.
CPC .............. *C02F 1/36* (2013.01); *B01D 9/0004* (2013.01); *B01D 9/0009* (2013.01); *B01D 9/0036* (2013.01); *B01D 9/0081* (2013.01); *B01D 21/0006* (2013.01); *B01D 21/0012* (2013.01); *B01D 21/0084* (2013.01); *B01D 21/009* (2013.01); *B01D 21/283* (2013.01); *B01D 61/025* (2013.01); *B01D 65/02* (2013.01);
(Continued)

(58) Field of Classification Search
CPC .... B01D 21/283; B01D 2321/35; B03D 3/04; C02F 1/36
See application file for complete search history.

(56) References Cited

U.S. PATENT DOCUMENTS 3,264,213 A 8/1966 Pav et al.
4,705,054 A * 11/1987 Fields ...................... F28G 7/00
134/1
(Continued)

FOREIGN PATENT DOCUMENTS

CN 001373091 4/2002
DE 103 06 627 9/2004
(Continued)

OTHER PUBLICATIONS

Adeniyi, et al., HybridICE HIF filter: principle and operation, Water Resources Management VII 259, 2013, vol. 171, WIT Press.
(Continued)

*Primary Examiner* — Bradley R Spies
(74) *Attorney, Agent, or Firm* — Polsinelli PC

(57) ABSTRACT

A method of activating and dewatering sludge through application of acoustic pressure shock waves to wastewater.

19 Claims, 39 Drawing Sheets

Related U.S. Application Data of application No. 15/351,514, filed on Nov. 15, 2016, now Pat. No. 10,457,571, which is a division of application No. 15/230,765, filed on Aug. 8, 2016, now Pat. No. 10,053,376.

(60) Provisional application No. 62/202,455, filed on Aug. 7, 2015.

(51) Int. Cl.
| | |
|---|---|
| *B01D 21/28* | (2006.01) |
| *B01D 61/02* | (2006.01) |
| *B01D 65/02* | (2006.01) |
| *B01D 65/08* | (2006.01) |
| *B03D 3/04* | (2006.01) |
| *C01B 5/02* | (2006.01) |
| *C02F 1/22* | (2023.01) |
| *C02F 1/36* | (2023.01) |
| *C02F 1/44* | (2023.01) |
| *C02F 11/12* | (2019.01) |
| *C02F 11/15* | (2019.01) |
| *C02F 101/32* | (2006.01) |
| *C02F 103/08* | (2006.01) |
| *G21F 9/06* | (2006.01) |
| *C02F 1/52* | (2023.01) |

(52) U.S. Cl.
CPC ............ *B01D 65/08* (2013.01); *B03D 3/04* (2013.01); *C01B 5/02* (2013.01); *C02F 1/22* (2013.01); *C02F 1/441* (2013.01); *G21F 9/06* (2013.01); *B01D 2313/205* (2022.08); *B01D 2313/24* (2013.01); *B01D 2321/2066* (2013.01); *B01D 2321/30* (2013.01); *C02F 1/44* (2013.01); *C02F 1/52* (2013.01); *C02F 2001/5218* (2013.01); *C02F 11/12* (2013.01); *C02F 11/15* (2019.01); *C02F 2101/32* (2013.01); *C02F 2103/08* (2013.01); *C02F 2201/008* (2013.01); *C02F 2303/04* (2013.01); *C02F 2303/16* (2013.01); *C02F 2303/20* (2013.01); *C02F 2303/22* (2013.01); *Y02A 20/124* (2018.01); *Y02A 20/131* (2018.01); *Y02A 20/144* (2018.01); *Y02W 10/30* (2015.05); *Y02W 10/37* (2015.05)

(56) References Cited

U.S. PATENT DOCUMENTS

| | | | |
|---|---|---|---|
| 4,959,234 | A | 9/1990 | Ahmed et al. |
| 5,240,600 | A | 8/1993 | Wang |
| 6,029,518 | A | 2/2000 | Oeftering |
| 6,416,934 | B1 | 7/2002 | Yamagishi |
| 7,008,540 | B1 | 3/2006 | Weavers |
| 7,186,344 | B2 | 3/2007 | Hughes |
| 7,588,796 | B2 | 9/2009 | Klare |
| 8,529,451 | B2 | 9/2013 | Warlick |
| 8,685,317 | B2 | 4/2014 | Cioanta |
| 9,057,232 | B2 | 6/2015 | Cioanta et al. |
| 9,840,313 | B2 | 12/2017 | Cioanta |
| 10,053,376 | B2 | 8/2018 | Cioanta et al. |
| 10,164,073 | B2 | 12/2018 | Hsieh |
| 10,232,329 | B2 | 3/2019 | Okano |
| 10,246,349 | B2 | 4/2019 | Cioanta |
| 10,457,571 | B2 | 10/2019 | Cioanta et al. |
| 10,562,793 | B2 | 2/2020 | Cioanta |
| 10,874,126 | B2 | 12/2020 | Lebovich |
| 2004/0016699 | A1 | 1/2004 | Bayevsk |
| 2005/0098497 | A1 | 5/2005 | Khudenko |
| 2005/0279129 | A1 | 12/2005 | Muchnik |
| 2007/0295673 | A1 | 12/2007 | Enis et al. |
| 2008/0272056 | A1 | 11/2008 | Kazem |
| 2009/0050572 | A1 | 2/2009 | McGuire et al. |
| 2009/0088670 | A1 | 4/2009 | Warlick |
| 2009/0120862 | A1 | 5/2009 | Lv et al. |
| 2012/0325747 | A1 | 12/2012 | Rietman et al. |
| 2014/0151292 | A1 | 6/2014 | Ng |
| 2014/0151295 | A1 | 6/2014 | Heon et al. |
| 2014/0223958 | A1 | 8/2014 | McCormack et al. |
| 2014/0305877 | A1 | 10/2014 | Cioanta |
| 2015/0056715 | A1 | 2/2015 | Laugharn, Jr. et al. |
| 2016/0152494 | A1 | 6/2016 | Cho |
| 2017/0036923 | A1 | 2/2017 | Cioanta et al. |
| 2017/0057843 | A1 | 3/2017 | Cioanta |
| 2017/0057844 | A1 | 3/2017 | Cioanta |
| 2017/0313606 | A1 | 11/2017 | Hack |
| 2017/0321175 | A1 | 11/2017 | Florida |
| 2018/0056244 | A1 | 3/2018 | Vogel |
| 2019/0330082 | A1 | 10/2019 | Cioanta |
| 2019/0330083 | A1 | 10/2019 | Cioanta |

FOREIGN PATENT DOCUMENTS

| | | |
|---|---|---|
| EP | 2371446 | 10/2011 |
| FR | 2966888 | 11/2010 |
| WO | WO 2014/147645 | 9/2014 |

OTHER PUBLICATIONS

Flemming, Microbial Biofouling: Unsolved Problems, Insufficient Approaches, and Possible Solutions, Biofilms Highlights, Springer Series on Biofilms 5, DOI 10: 1007/978-3-642-19940-0_5, 2011, Springer-Vertag Berlin Heidelberg.

Graham, Product Concentration: An Assessment of EPRI Freeze Technologies 1985-2002-1007399, Oct. 2002, EPRI, Palto Alto, CA.

Igunnu et al., Produced water treatment technologies, International Journal of Low-Carbon Technologies Advance Access, Jul. 4, 2012, Oxford University Press.

International Search Report and Written Opinion of PCT/US16/45999 mailed Oct. 26, 2016.

Jusoh et al., Development of a New Crystallisation Chamber for a Progressive Freeze Concentration System, Recent Advances in Technologies, Nov. 3, 2009, IBN 978-953-307-017-9, in Tech.

OCETA, Environmental Technology Profiles-Plasma Spark Water Treatment System, (2016) Retrieved on Oct. 5, 2016 from https://www.dajere.ca/Plasma%20Spark%Water29%Treatment...pdf, p. 1-3.

Franceschini, Dewatering of sludge by freezing, Master's Thesis, Lulea University of Technology, 2010:024 CIV, ISSN 1402-1617, Samhallsbyggnad.

Petkovsek et al., A Novel rotation generator of hydrodynamic cavitation for waste-activated sludge disintegration, Ultrasonics Sonochemistry, vol. 26 (2015) Retrieved on Oct. 5, 2016 from https:// www,researchgate.net/publication/270879285, p. 2, para. 2-3, p. 3, para. 3 abstract.

Tempel, Eutectic Freeze Crystallization: Separation of Salt and Ice, master Thesis, TUDelft University of Technology, Jun. 2012.

Wang, An Overview of Shock Wave Therapy in Musculoskeletal Disorders, Chang Gung Med J vol. 26 No. 4, 220:223, (2003).

Non Final Office Action issued by the USPTO, mailed Jun. 29, 2021 for U.S. Appl. No. 16/504,607, 6 pgs.

Corrected Notice of Allowance issued by the USPTO, mailed Jul. 31, 2019 for U.S. Appl. No. 15/351,514, 8 pgs.

Notice of Allowance issued by the USPTO, mailed Jul. 22, 2019 for U.S. Appl. No. 15/351,514, 14 pgs.

Response to Non Final Office Action filed Mar. 11, 2019, for U.S. Appl. No. 15/351,514, 4 pgs.

Non Final Office Action issued by the USPTO, mailed Dec. 10, 2018, for U.S. Appl. No. 15/351,514, 11 pgs.

Terminal Disclaimer Over Pending Application filed Jul. 26, 2018 for U.S. Appl. No. 15/351,514, 3 pgs.

Response to Non Final Office Action filed Jul. 26, 2018 for U.S. Appl. No. 15/351,514, 7 pgs.

Corrected Notice of Allowance issued by the USPTO, mailed Jun. 29, 2018 for U.S. Appl. No. 15/230,765, 8 pgs.

(56) References Cited

OTHER PUBLICATIONS

Notice of Allowance issued by the USPTO mailed Jun. 8, 2018, for U.S. Appl. No. 15/230,765, 15 pgs.
Response to Non Final Office Action filed May 15, 2018, for Application No. 15/230/765, 8 pgs.
Non Final Office Action issued by the USPTO, mailed Mar. 27, 2018 for U.S. Appl. No. 15/351,514, 23 pgs.
Non Final Office Action issued by the USPTO, mailed Feb. 16, 2018 for U.S. Appl. No. 15/230,765, 12 pgs.
Preliminary Amendment filed with the USPTO on Oct. 21, 2016 for U.S. Appl. No. 15/230,765, 5 pgs.
Notice to File Missing Parts issued by the USPTO, mailed Aug. 22, 2016, for U.S. Appl. No. 15/230,765, 2 pgs.

* cited by examiner

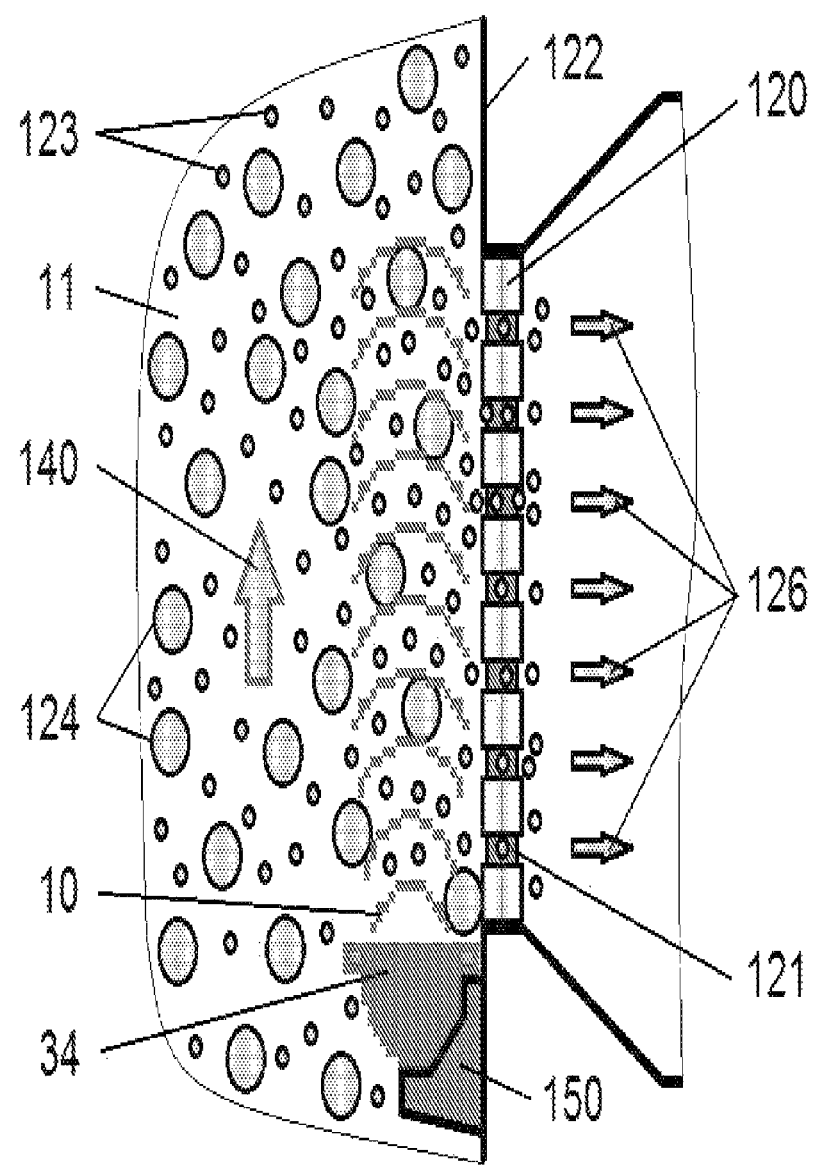

SYSTEMS AND METHODS FOR ACTIVATING AND DEWATERING SLUDGE USING ACOUSTIC PRESSURE SHOCK WAVES

CROSS-REFERENCE TO RELATED APPLICATIONS

This application is divisional of Ser. No. 16/504,583 filed Jul. 8, 2019, which is a divisional of U.S. application Ser. No. 15/351,514 filed Nov. 15, 2016, now U.S. Pat. No. 10,457,571, issued Oct. 29, 2019, which is a divisional of U.S. application Ser. No. 15/230,765 filed Aug. 8, 2016, now U.S. Pat. No. 10,053,376 issued Aug. 21, 2018, which claims the benefit of priority of U.S. provisional application No. 62/202,455 filed Aug. 7, 2015, all of which are incorporated herein by reference.

BACKGROUND OF THE INVENTION

In this invention are presented methods and device embodiments that use acoustic pressure shock wave technology in water/fluid treatment processes such as turbidity and total suspended solid reduction, membrane filtration, algae removal, disinfection processes, water softening procedures, separation of radioactive heavy water from normal water, sludge dewatering and desalination of salted water/fluids, including brine that has a high concentration of salt in water/fluid.

Although water exists in abundance on Earth, it is increasingly unreliable, insufficient and declining in quality. The main sources of drinking water are lakes, reservoirs, canal, ground water, sea water, rain water, etc. In the modern era, water is becoming a strategic resource and harvesting the water suitable for the needs of various industries such as petro-chemical industry, steel industry, oil and gas, power generation, municipal supply, mining, chemical industry, and consumer goods requires the introduction of new technologies that makes more efficient the use of water and waste water cleaning for re-use/recycling. The quality of water is determined by many factors such as physical, chemical or biological parameters and its final use (for drinking or for industrial processes)

For example the drinking water must be subjected to a treatment process, to achieve the standard quality for drinking purpose. General treatment of drinking water is consisting of several stages to remove or reduce suspended, dissolved solids and microbial pollutants. Cleaning of used water and recycling represents the most important approach that can conserve the water and improve the overall efficiency of using water in any industrial/household processes associated with modern human society.

An important parameter for the drinking water quality is called turbidity, which is a measure of the degree water loses its transparency due to the presence of suspended particulates (the murkier the water, the higher the turbidity). Turbidity is caused by suspended substances or dissolved substances such as clay, silt, oil, finely divided inorganic and organic matter, soluble colored organic compounds, plankton and other microscopic organisms. Conventional methods for decreasing turbidity and reduction of total suspended solids/pollutants in water are coagulation/flocculation (performed in special large tanks called clarifiers or settlers or weir tanks), rapid/slow filtration, microfiltration (0.1-10 micrometer pore size), nanofiltration (2-100 nanometer pore size), ultrafiltration (0.5-2 nanometer pore size), electrodialysis, and reverse osmosis (<0.5 nanometer pore size).

Membrane technologies are now widely accepted as suitable processes for solids' separation from liquids, due to their high removal capacity and ability to meet multiple liquid/water quality objectives. Some advantages of this technology are effectiveness, easiness to be automated, compact, removing pathogens, requiring less coagulating agents and disinfectors, simpler to maintain and capable of producing high-quality drinking water for human consumption. In addition to these advantages, membrane filtrations have some operation problems such as fouling and concentration polarization. The fouling can be a process where solute or particles such as clays, flocs (colloidal fouling), bacteria, fungi (biological fouling), oils, polyelectrolytes, humics (organic fouling) and mineral precipitates (scaling) deposit onto a membrane's surface or into membrane's pores that degrade the membrane's performance due to blocking of the membrane's pores. The fouling issue can be prevented or reduced by using acoustic pressure shock waves.

Industrial processes (petro-chemical, steel, chemical, etc.), oil/gas recovery, mining, and power generation use huge amounts of water that generate the so-called produced water. Produced water has a complex composition, but its constituents can be broadly classified into organic and inorganic compounds including dissolved and dispersed oils, grease, heavy metals, radio nuclides, organic matter, treating chemicals, formation solids, salts, dissolved gases, scale products, waxes, and micro-organisms.

The general objectives for operators treating produced water are: de-oiling (removal of dispersed oil and grease), desalination, removal of suspended particles and sand, removal of soluble organics, removal of dissolved gases, removal of naturally occurring radioactive materials, disinfection and softening (to remove excess water hardness). For removal of suspended particles, sand, soluble organics, dissolved gases, and radioactive materials usually there are used evaporation ponds, gas flotation systems, media filtration (sand, gravel, anthracite, walnut shell and others), ion exchange technology and chemical oxidation systems that use ozone, peroxide, permanganate, oxygen and chlorine.

Algae that live in water are a large and diverse group of simple organisms, ranging from unicellular to multicellular forms. Bloom concentrations of algae cause an increase in coagulant demand and treatability, taste and odor issues, filter blocking and toxin release in water treatment facilities. There are various strategies to control and remove algae from water such as dissolved air flotation, covering of basins and filters, advanced oxidation processes, ozonation, coagulation/flocculation by copper sulphate and potassium permanganate, bubble curtains, pulsed sludge blanket clarification, aeration, pre-oxidation using chlorine, ozoflotation, catalytic processes, barley straw, etc.

Water disinfection process is fundamental to remove microorganisms, and can be done by different methods such as use of ultraviolet, ozone and chemical substances (chlorine, hypochlorite, chloramines, chlorine dioxide, bromine).

Water hardness is known as existence of bivalent and trivalent cations such as calcium ($Ca^{2+}$), magnesium ($Mg^{2+}$), and in lower traces, aluminum ($Al^{2+}$, $Al^{3+}$) and iron ($Fe^{2+}$, $Fe^{3+}$). Water hardness causes some problems such as scale formation in pipes and cooling towers, reaction by soap and hard foam formation and decreased heat exchange capacity and membrane clogging. Conventional methods for hardness removal (also known as water softening process) are lime-soda process, ion exchange, electro-coagulation, electro-dialysis, reverse osmosis and nano-filtration.

In nuclear plants that use natural uranium as fuel, the reactors are functioning on heavy water, which is a form of water that contains a larger than normal amount of hydrogen isotope, deuterium. The heavy water used as a coolant for the nuclear reactors contains tritium (tritiated water) that can make it radioactive and hazardous for living organisms and environment. For this reason, nuclear power plants store the mixture of light water with tritiated water in drums for 10 times the half time for tritium (120 years) or this mixture is dispersed into environment in small quantities to prevent ecological disasters. An alternate method to separate heavy water (tritiated water) from light water (normal water) that is both economically and feasible is needed. In the patent application US 2005/0279129, different methods are presented (filtration, chemical, centrifugal, electromigrational and catalytic) that are currently used to separate heavy water (tritiated water) from light water. These methods have high complexity and are inefficient, expensive and can generate more contaminated materials (filters, membranes, etc.) that are contaminated and require storage or discharging problems as for the original water mixture. A combination of the principle presented in patent application US 2005/0279129 (lowering the temperature of the mixture to the melting point of the heavy water) combined with acoustic pressure shock waves, can offer an efficient method to accomplish an economic and feasible solution.

The sludge is a semi-solid slurry and can be produced from wastewater treatment processes or as a settled suspension obtained from conventional drinking water treatment and numerous other industrial processes. The term is also sometimes used as a generic term for solids separated from suspension in a liquid. Most producers pay for sludge disposal by weight, and water is heavy. Therefore, if the water is removed as much as possible, then the sludge is lighter and thus costs less to dispose it. Inorganic (lime and ferric salt) or organic (polymers) conditioners can be used in order to improve the solid content of waste sludge. Oily sludge frequently generated by oil production or processing sites, contains different concentrations of waste oil (40%-60%), wastewater (30%-90%) and mineral particles (5%-40%). The oil can be in its continuous phase although the water is in a high percentage in form of oil droplets absorbed onto solid particles, creating a protective layer and in the presence of surfactants forms emulsions, which creates difficulties in the waste treatment processes and subsequently in the dewatering process. The most common way to dewater sludge is to physically squeeze the water out of the sludge via pressure filtration dewatering, belt press dewatering filtration, air sludge drying processes, sludge dewatering centrifugation and vacuum filtration. In addition, a sludge drier can be utilized at the end of the process. Driers are oven like equipment that actually bake out the water. To improve of the process efficiency and reduce costs, other non-conventional approaches can be used such as acoustic pressure shock wave technology.

The water desalination technologies currently used are the reversed osmosis, multi stage flash, multiple effect distillation, vapor compression distillation and electro dialysis reversal. These technologies are energy intensive, which significantly increases the cost of produced desalinated water.

Reversed osmosis (RO) is a membrane separation process that recovers water from a saline solution pressurized to a point greater than the osmotic pressure of saline solution. In essence, membrane filters out salt ions from pressurized solution, allowing only water to pass. RO post-treatment includes removal of dissolved gasses ($CO_2$) and pH stabilization via Ca or Na salts addition. It is interesting to note that RO works effectively only for low concentrated brine solutions, due to high concentrates that produce rapid scaling of RO membrane. The fouling/scaling of RO membranes significantly increases the operation cost. The membrane exchange represents the most of the cost necessary to operate a RO desalination facility therefore it limits the RO use in filtrating water from high concentrated brines produced by oil industry, mining or other industrial processes.

Thermal technologies—are employed in regions where the cost of energy is relatively low. Multi stage flash (MSF) distillation units are often coupled with steam or gas turbine power plants for better utilization of fuel energy. Steam produced at high temperature and pressure by fuel is expanded through turbine to produce electricity. The low to moderate temperature and pressure steam exiting the turbine is used to drive the desalination process. Multi effect distillation (MED) process involves application of sufficient energy that converts saline water to steam, which is condensed and recovered as pure water. To increase performance, each stage is run at a successively lower pressure. Even so, the energy consumption is significant and can be prohibitive in many cases.

Vapor compression distillation (VCD) uses vapor generated in evaporation chamber, compressed thermally or mechanically. The heat of condensation is returned to the evaporator and utilized as a heat source. Vapor compression processes are particularly useful for small to medium installations. However, VCD require energy intensive consumption to achieve desalination—a significant drawback.

Electrodialysis reversal (EDR) involves the separation of dissolved ions from water through ion exchange membranes. A series of ion exchange membranes is used, containing electrically charged functional sites arranged in an alternating mode between the anode and the cathode, to remove charge substances from the feed salty water. If the membrane is positively charged, only anions are allowed to pass through it. Similarly, negatively charged membranes allow only cations to pass through them. EDR uses periodic reversal of polarity to optimize its operation. The membranes of EDR units are subject to fouling, and thus some pretreatment of the feed water is usually necessary.

SUMMARY OF THE INVENTION

Acoustic pressure shock waves were studied from the beginning of the 20th century for military, medical and civilian applications. Towards the middle of the century, use of acoustic pressure shock waves in non-destructive applications was focused on medical field applications, in order to destroy kidney stones from outside the body (extracorporeal treatment). These new devices were invented in Germany and called lithotripters. The first lithotripters used the electrohydraulic principle to produce acoustic pressure shock waves, based on high voltage discharge in between two electrodes submerged in a fluid. A high voltage discharge vaporizes the fluid and produces a plasma bubble that grows very fast and collapses violently, producing an acoustic pressure shock wave that is focused via a reflector towards the desired area. The transformation of high voltage electric energy into kinetic energy of acoustic pressure shock waves is efficient and proved beneficial for different medical fields such as urology, orthopedics, wound care, etc. After development and commercialization of electrohydraulic lithotripters, new methods of producing acoustic pressure shock waves were researched and implemented based on electromagnetic or piezoelectric principles.

The acoustic pressure shock waves produced by the proposed embodiments will have a compressive phase (produces high compressive pressures) and a tensile phase (produces cavitation bubbles that collapse with high speed jets) during one cycle of the acoustic pressure shock waves. These two synergetic effects work in tandem, enhancing of acoustic pressure shock waves effects on liquid/water processing.

The acoustic pressure shock wave pulses incorporate frequencies ranging from 100 kHz to 20 MHz and will generally have a repetition rate of 1 to 20 Hz. The repetition rate is limited by cavitation, which represents the longest time segment (hundreds to thousands of microseconds) of pressure pulse produced by acoustic pressure shock waves. To avoid any negative influence of new coming pulse, cavitation bubbles need sufficient time to grow to their maximum dimension and then collapse with high speed jets that have velocities of more than 100 m/s. These jets, together with unidirectional nature of pressure fronts created by acoustic pressure shock waves, play an important role in unidirectional moving of particles from fluids/water via acoustic streaming, which is enhancing and producing a high efficiency of the water/fluid cleaning process. Thus, acoustic pressure shock wave pulses that have a high repetition rate can interfere with one another and negatively affect the cavitation period, hence reducing the acoustic pressure shock waves desired effect.

The shock waves can increase convection in liquids by two mechanisms known as acoustic streaming and micro-streaming. The acoustic streaming represents the momentum transferred to liquid from directed propagating sound waves (pressure waves), causing the liquid to flow in the direction of the sound propagation. During the cavitation phase, cavitation sets up eddy currents in fluid surrounding vibrating bubbles. In the vicinity of vibrating gas bubbles, surrounding liquid is subjected to rotational forces and stresses, producing a microscopic shear flow/fluid movement called micro-streaming. Also, compressive forces and high velocity cavitational jets produced by imploding cavitation bubbles, when directed towards solids, can disturb and dislodge solid particles.

The collapse of cavitational bubbles produced by acoustic pressure shock waves have a large amount of energy released in form of pressure gradients, fluid jets and transient heat (transient hot spots of 3000-50000 K). In these extreme condition, hydroxyl (OH−) and hydrogen (H+) radicals would be formed by thermal dissociation of water that can dissolve organic compounds and can be used to enhance chemical reactions necessary to eliminate undesired inorganic elements from the fluid/water.

In general, after shock waves application, a number of mechanical, acoustical, chemical and biological changes occur in a liquid due to acoustic cavitation that can help with cleaning of fluids and installations.

For removal of suspended particles, sand, dissolved solids, soluble organics, microbial pollutants, dissolved gases, and radioactive materials from liquids/fluids/water, the most commonly used systems are evaporation ponds/tanks, coagulation/flocculation tanks and gas flotation systems.

Evaporation ponds are artificial reservoirs that require a relatively large space of land designed to efficiently evaporate water by solar energy. It is a favorable technology for warm and dry climates, due to the potential for high evaporation rates. All water is lost to the environment when using this technology, a major setback when water recovery is an objective for water treatment. The evaporation ponds can be replaced by mobile steel tanks called weir/separation tanks that can be hauled by trucks to desired location. Acoustic pressure shock waves by producing acoustic streaming via pressure gradients and collapse of cavitational bubbles can easily separate and produce sedimentation of suspended particles, sand, dissolved solids, and soluble organics from liquids/fluids/water. The process can be done using only acoustic pressure shock waves (without the need of additional chemicals/flocculants) or in combination with different flocculants (for the coagulation/flocculation tanks) that aggregate particles in larger clumps, which are easier to be pushed in downward direction (towards the bottom of separation/weir tanks or coagulation/flocculation tanks) by acoustic pressure shock waves.

Gas flotation technology is widely used for treatment of conventional oilfield and industrial produced water. This process uses fine gas bubbles to separate suspended particles that are not easily separated by sedimentation. When gas is injected into produced water, suspended particulates and oil droplets are attached to air bubbles as they rise. This results into formation of foam on water surface, which is skimmed off as froth. Gas floatation can remove particles as small as 25 μm and can even remove contaminants up to 3 mm in size if coagulation is added as pre-treatment, but it cannot remove soluble oil constituents from water. Acoustic pressure shock waves can be used to push down any particles that were not raised to the tank surface during the air flotation process. Practically, by combining air flotation with acoustic pressure shock waves the system efficiency can be improved. Furthermore, acoustic pressure shock waves can be used to push accumulated sludge at the top of the tank, without any moving mechanical means, which can increase the system reliability (the absence of moving parts reduces the possibility of malfunctions).

The activated sludge process is used for treating sewage and industrial wastewaters with the help of air and a biological floc composed of bacteria and protozoa. The process involves air or oxygen being introduced into a mixture of screened, and primary treated sewage or industrial wastewater (wastewater) combined with organisms to develop a biological floc, which reduces the sewage organic content. In all activated sludge plants, once wastewater has received sufficient treatment, excess mixed liquor (combination of wastewater and biological mass) is discharged into settling tanks. Inorganic (lime and ferric salt) or organic (polymers) conditioners can be used in order to improve solid content of waste sludge. However, freeze/thaw treatment is a promising technique that can be used sludge conditioning, enhancing its dewatering characteristics without use of polymers. Freeze/thaw conditioning is able to transform bond water into free water that can easily and more efficiently be removed by a mechanical method, as application of acoustic pressure shock waves. One freezing cycle is enough to obtain good results on workshop sludge. Performing more cycles is not viable. Material thawing of should be performed over a permeable media (like a sieve or a compost bed) in order to let all the liquor to flow away without being retained in solidified sludge. Using acoustic pressure shock waves, sludge activation can be accomplished easily, due to acoustic streaming and cavitational activity. Furthermore, water separation (dewatering) from sludge can be expedited using acoustic pressure shock waves, due their different propagation speed in water (300 m/s) and solids (1500 m/s). The difference in speed in between water/fluids and solids produces shear forces that allows water to be "squeezed" more efficiently from solid matter using high compressive pressures and acoustic cavitation generated by acoustic pressure shock waves.

Oily sludges, generated frequently by oil production or processing sites, contain different concentrations of waste oil (40%-60%), wastewater (30%-90%) and mineral particles (5%-40%). The oil can be a continuous phase although water is present in a high percentage in oil droplets absorbed onto solid particles, thus creating a protective layer in the presence of surfactants that forms emulsions, which creates difficulties in waste treatment processes and subsequently in dewatering process.

Demulsification treatments are necessary in order to reduce water from sludge, thus reduce its volume, save resources and prevent environmental pollution. Conventional demulsification techniques include electrical, chemical, thermal, and mechanical methods. The freeze/thaw technique can also be used for oily sludges treatment and starting with a lower oil content will lead to better results. Direct, indirect and natural freeze processes can be applied in a direct freezing process, where refrigerant is mixed directly with brine (process less used due to possibility of contamination) or in an indirect process, where refrigerant is separated from brine by a heat transfer surface. $CO_2$ has specific benefits in use as a refrigerant. First of all, it is limitless available in our atmosphere. It has no ozone depletion potential and insignificant global warming potential (considering the small amounts used in refrigeration). Furthermore, it is a cheap, non poisonous and a non flammable refrigerant. Acoustic pressure shock waves can be used to separate oil from wastewater, due to their unidirectional acoustic streaming. In the case of freeze/thaw technique to very fast separate the ice (frozen water) from the icy sludge, which can significantly speed-up the oily sludge treatment.

For membrane technologies used in water/fluids cleaning, when membrane fouling occurs, permeate flux is declined and membrane resistance is increased, which affect water/fluid quality and quantity that passes through membrane and significantly reduces the membrane life time. Mechanical (sponges, jets, etc.), biological (biocides) and chemical (acids, alkalis, surfactants, sequestrates and enzymes) methods can be used to clean the affected membranes. The application of these methods and subsequent cleaning necessary after their application require installation shutdown and possibly secondary pollution from chemical cleaning. The cost of biofouling in a membrane application includes the costs for membrane cleaning itself, labor costs and down-time during cleaning, pretreatment costs, including biocides and other additives, an increased energy demand due to higher trans-membrane and tangential hydrodynamic resistance, and shortened membranes lifetime.

In heat exchangers, the decrease of efficacy of heat transfer is the first aspect of biofouling-related costs and contributes to the "fouling factor". In power plants around the world, thousands of tons of chlorine are spent each day to combat biofilms, which amounts to high values in terms of biocide and wastewater treatment costs. Again, downtime for cleaning causing loss of production and labor costs contribute a much larger share of costs. Treatment of wastewater contaminated with antifouling additives represents an emerging cost factor as the release of biocides is increasingly restricted and will cause more effort for removal.

What clearly makes more sense is putting more effort in biofouling prevention through advanced strategies such as use of acoustic pressure shock waves to increase membrane life and reduce/eliminate chemicals used to prevent biofouling. Acoustic pressure shock waves can be used to reduce, eliminate or clean clogged membranes, in order to improve the system efficiency and make it more economic. Practically, using acoustic streaming, acoustic pressure shock waves can push clogging particles in preferred directions, which can prolong the membrane's life and reduce or eliminate the installation down-time necessary for its cleaning processes (manual, chemical, etc.). The usage of acoustic pressure shock waves to eliminate membrane fouling can be done as an online operation (can be use during filtration time), without any secondary pollutants, transportation, handling problems or installation shut down. In the same time, acoustic pressure shock waves can enhance the distribution systems disinfection, due to presence of hydrogen peroxide ($H2O2$) and hydroxyl free radicals (OH—). Acoustic pressure shock waves are capable of preventing particles deposition that lead to fouling, can also disturb and dislodge particulate matter/biofilms and enhance dissolution of substances trapped on membrane surfaces, which can eliminate downtimes and prevent reduction in filtration efficiency. Even more, acoustic pressure shock waves can act on any type of filter/membrane regardless of the material used in their construction (polymers, metals, ceramics, etc.).

The prevention of clogging of reversed osmosis (RO) membranes using acoustic pressure shock waves can significantly help with this process costs. By reducing the RO membranes fouling, the pressure necessary for the process can be reduced and the cost of exchanging very often of the membrane package/systems can be significantly reduced. Practically, more efficient membranes can be designed to be used in conjunction with acoustic pressure shock waves that have longer service life and a lower manufacturing cost.

For water/fluids disinfection process, there is a trend within the water treatment industry to develop and employ more environmentally responsible technologies to help lower the impact of chemicals in effluent waters. Acoustic pressure shock waves can eliminate use of chemical during filtration/disinfection process for water or any other fluids, which can reduce/eliminate the environmental impact down the line for by-products as sludge or process water. For example, by using existing technologies that involve chemicals, due to their chemical burden, sludge cannot be discharged directly in nature and special dumping sites are needed or additional processing to eliminate chemicals, which increases the operation cost.

For water softening process, acoustic pressure shock waves can be used to facilitate the water minerals to crystallize so that they do not bind to surfaces. This can be achieved in the same time with the water cleaning process that uses acoustic pressure shock waves to remove suspended particles, sand, dissolved solids, soluble organics, microbial pollutants, dissolved gases, etc. Practically, acoustic pressure shock waves can speed-up the chemical reactions by removing the cations to soften the water. When hard foams and scales are already formed, shock waves can break them down through acoustic streaming, micro-streaming and cavitational jets.

Existing desalination technologies produce scaling, i.e. salts precipitation on working surfaces due to concentration process, which is always an important design consideration for desalination plants. Fouling of heat or mass transfer surfaces can greatly reduce the capacity and efficiency of a process. Typically, calcium salts, and in particular $CaSO4$ and $CaCO3$, are major (yet not the only) concerns. There are a number of strategies for preventing scale formation, including operating temperature limitation (calcium salts tend to have retrograde solubility), limitation of water recovery to prevent saturation, chemical pre-treatment (e.g. the addition of acids or polyphosphates) to alter the solubility or onset of scale formers precipitation, and lime or lime-soda softening in order to remove potential scale formers. In addition, many systems are designed to limit the scale occurrence or impact and to allow easy maintenance. The acoustic pressure shock waves can be an appropriate technology to prevent or remove scaling using jets produced by cavitational bubbles collapse generated during the tensile phase of acoustic pressure shock waves.

Water is a unique substance that expands in volume when it becomes ice. Practically, ice is a solid that consists of a crystallographic arrangement of water molecules, where positive charge concentrations of one molecule are strongly bonded with negative charge concentrations of another molecule. This polar attraction plays a major role in ice crystals structure organization that has a steady regularity and symmetry. Because of its highly organized structure, other atoms, molecules or particles cannot become part of the ice crystal lattice without severe local strain, and are rejected by the advancing surface of a growing ice crystal. Ice crystals grow by incorporating only water molecules, and continue to grow as long as water molecules are available. Based on this property, the freezing process can be used to separate pure water from brine (mixture of water and high concentration of salts). The mixture's freezing temperature should be set at a value lower or equal to −10° C. Higher temperatures will lead to longer freezing time and are expensive to maintain. The most known freezing technologies are freeze drying, freeze concentration, freeze crystallization and freeze-thaw residual conditioning. By far, freeze drying is the oldest of said technologies, freeze concentration and freeze crystallization are newer ones. Freeze-thaw residual conditioning is a technology that is commonly used in waste management in cold climates.

Freeze drying is actually a vaporization process that depends on sublimation of ice to a vapor rather than changing water to a vapor. The success of the process depends on the rate of cooling (freezing), which determines the ice crystals size, the vacuum in the chamber, the partial water vapor pressure, and the product being dried. This process is used in freeze drying thinly sliced fruits and vegetables, and has been successful in coffee and similar drink products dehydration. The process does not work well for large particles because it takes a long time for water vapor to diffuse from the inside of the particle to the surface.

A technology extension of freeze drying is freeze concentration, which employs controlled freezing to develop ice crystals in aqueous products. When solutions are chilled below the water freezing point (00 C or 320 F), the water crystallizes as ice and remaining liquid becomes more concentrated. Agitation of chilled solution usually accelerates ice crystal formation thus offering a method to speed up the separation/concentration process. The ice crystals are formed in a suspension of brine solution and require a filtration system/removal system for the ice crystals to be separated from brine and a washing column to wash out brine entrained in between and on the small ice crystals surface. Mainly, three forces are acting on ice, the buoyancy force Fb due to ice density which has to overcome the drag force Fd and gravity (mg) of the ice crystals upward movement. Acoustic pressure shock waves can be used to increase the buoyancy force, thus making the ice upward movement much faster (economical efficiency). Finally, after their separation from brine slush, the ice crystals are melted back into pure water. The process works very well for extracting high-grade water from less than desirable water sources (desalinization).

Water removal by crystallization is much more energy efficient than water removal by vaporization. From an energy utilization standpoint, freeze processes are much more efficient mechanisms of concentration than vaporization processes. It requires 143 British Thermal Units (BTU) to crystallize (freeze) a pound of water and 970 BTU to vaporize (evaporate) the same pound of water.

A new technology used to separate salt and water from a process stream is Eutectic Freeze Crystallization (EFC). Salt and ice are separated in a solid form by their density difference, which allows ice to rise to the top and solid salt to sink to the bottom. The separation is a settling process that uses the density difference between solid salt and solid ice. Although pure salt and ice crystals are formed, they tend to get entangled. This causes all visible ice to sink to the bottom together with the salt. When the salt-ice slurry is settled on the bottom, the salt and ice can be separated by agitating the slurry with some sort of impulse, created by air jets.

There are two available methods for freeze concentration, which are suspension freeze concentration (SFC) and progressive freeze concentration (PFC). In SFC, ice crystals are formed in suspension in brine, while in PFC, ice crystals are formed in a single block of ice on a refrigerated surface. Also, the SFC system must be equipped with a filtration system for the ice crystals to be separated from the concentrate, along with a washing column to wash out those concentrates entrained in between and on the small ice crystals surface.

In the US patent application US2007/0295673, the invention relates to a desalination method and system that uses eutectic freeze crystallization technology, which incorporates use of compressed air energy as the source for freezing temperatures. In the same application different methods to preserve energy and produce a more efficient heat exchange are presented. Thus in order to prevent ice formation sticking to crystallization chamber walls, warm seawater is piped through tubes or cavities that wrap around crystallization chamber, such that seawater is pre-cooled to near freezing temperatures even before it enters the chamber. Also, waste heat from compressors can be used to prevent ice particles from sticking to the crystallization chamber. All these energy optimization processes can also be applied to the invention presented in this patent.

There are several methods to separate ice from brine, by centrifuging or by flowing the slush upward in a column. The brine is then drawn off through peripheral discharge screens. A counter current flow of freshwater is fed into the column top to wash any remaining brine from the ice. The washing can be accomplished with loss of only a few percent of freshwater product. The ice is then pushed to a melter where freshwater is recovered.

On its turn, ice slurries wash doesn't come without difficulties. Issues such as channeling, viscous fingering and ice pack clogging are often seen in practice. Channeling occurs when certain regions are less dense packed with ice then others. The washing liquid will then follow the path of least resistance instead of being distributed evenly. Channeling occurs most of the time near the wall and therefore it is also known as the wall-effect. Viscous fingering occurs when the wash front moves unevenly. The interface between the ice and the wash liquid develops into finger-like shapes. Clogging of the wash column occurs when ice crystals in slurry have not ripened enough, and then they tend to stick together. Often two or all three of these problems occur in the same time, for instance when a part of the column is blocked, the wash front is not moving evenly and viscous fingering occurs.

Advantages of the freezing technology used for desalination include: (a) Unlike other processes, no pre-treatment chemicals are added to feed water. (b) It is not affected if feed-water contains metals/mud or other impurities. (c) The process removes both organic and inorganic compounds. (d) Freezing-out the water part is possible with any chemical composition. (e) Low sludge production if compared to chemical treatment. (f) Waste heat from refrigeration cycle can be utilized to further reduce operating and investment costs for evaporation. (g) Cheap off-peak electric power can be utilized.

In summary, desalination processes using freezing are based on removal of ice particles from salty brine (which is denser than ice particles) due to gravity. The process described in this patent relies on much quicker and efficient way to separate ice crystals from brine by using acoustic pressure shock waves, which improves efficiency and make freezing desalination competitive for an industrial scale application. Furthermore, acoustic pressure shock waves can help pushing out brine trapped in between ice crystals, which can increase even more the efficiency of desalination process and avoid extensive ice crystals wash with fresh water to remove salty brine from ice mass. Intermittent functioning of ice crystallizer with intermittent use of acoustic pressure shock waves after slurry is formed represents the best way of operation.

The idea of using acoustic pressure shock waves to separate ice crystals from brine solution was developed based on intriguing results and difficulties described in the existing literature that presents the development of Eutectic Freeze Crystallization Technology. This Eutectic Freeze Crystallization Technology showed inefficiencies due to slow process to separate ice from solid salt, high dependency on ice crystals size, entanglement between ice crystals and salt particles during separation, larger pieces of ice crystal tend to block the separator, use of numerous moving parts and meshes into the system that can be clogged during separation process, etc.

Our experiments with acoustic pressure shock waves showed that less than 500 acoustic pressure shock wave were needed to apply to the slush in order to separate ice crystals from brine, which represents a high efficiency process. The energy flux density in the focusing zone was 0.1 to 0.5 mJ/mm2 and the frequency of shock waves delivery was 4 Hz (4 shock waves delivered per second). In industrial set-up, the energy of shock waves can be increased beyond 0.5 mJ/mm2 based on used separation container dimensions. In that case, energy flux densities of 0.5 to 3 mJ/mm2 can be used. Without any washing process, salt concentrations were dropped more than 2.5% for each step (freezing/separation).

In the US 2005/0279129, a process and a method are presented to separate heavy water from regular water by lowering the mixture temperature to the melting point of heavy water, which is 4.49° C. Practically, when chilled below 4.49° C., a mixture of tritiated water/heavy water and normal water/light water allows frozen/solid state heavy water to fall to the bottom of a tank and normal water to rise to the top. By using highly unidirectional acoustic pressure shock waves oriented downward, the separation process of heavy water from normal water can be expedited, thus make the method more compelling to be used at industrial scale.

BRIEF DESCRIPTION OF DRAWINGS

FIG. 15B is a schematic representation illustrating use of acoustic pressure shock wave devices for declogging of a filtration porous membrane/filter when liquid/fluid/water flow is parallel to membrane/filter and acoustic pressure shock wave devices are placed parallel to membrane/filter surface along liquid/fluid/water path, according to one embodiment of the present invention.

DETAILED DESCRIPTION OF THE INVENTION

Figure 1:
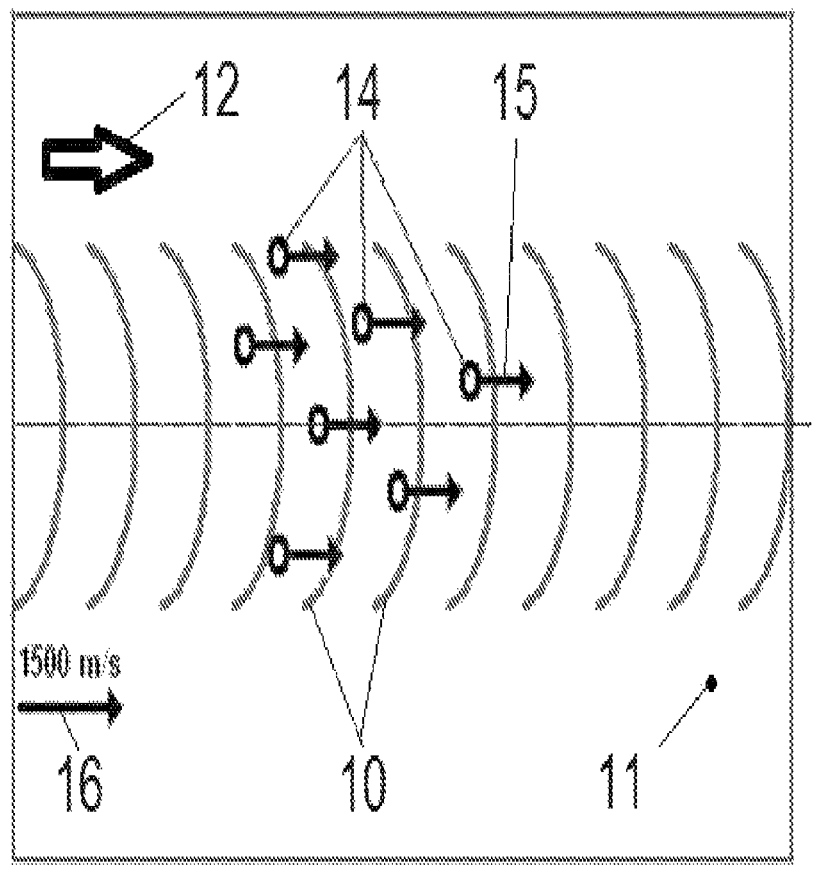
FIG. 1 is a schematic representation of acoustic pressure shock waves interaction with solid particles floating in water or any liquid/fluid

Embodiments of the invention will be described with reference to the accompanying drawings and figures, wherein like numbers represent like elements throughout. Further, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. The terms "connected", and "coupled" are used broadly and encompass both direct and indirect mounting, connecting and coupling. Further, "connected" and "coupled" are not restricted to physical or mechanical connections or couplings.

It is a further objective of the present inventions to provide different methods of generating focused, unfocused, planar, pseudo-planar or radial extracorporeal acoustic pressure shock waves for water processing using specific devices that contain either of the following acoustic pressure shock wave generators:
  electrohydraulic generators using high voltage discharges
  electrohydraulic generators using one or multiple laser sources
  piezoelectric generators using piezo crystals
  piezoelectric generators using piezo fibers
  electromagnetic generators using a flat coil
  electromagnetic generators using a cylindrical coil It is a further objective of the present inventions to provide means of controlling the energy and the penetrating depth of extracorporeal acoustic pressure shock waves via the amount of energy generated from acoustic pressure shock wave generators, total number of the acoustic pressure shock waves/pulses, repetition frequency of the acoustic pressure shock waves and special construction of the reflectors and membranes used in the acoustic pressure shock wave applicators.

It is an objective of the present inventions to provide acoustic pressure shock waves generating devices that are modular, do not need high maintenance and can, if needed, be applied/used in conjunction with other technologies.

It is a further objective of the present inventions to provide a variety of novel acoustic pressure shock wave applicator constructions determined by the number of reflectors housed in the applicator, specific reflector shape and reflector's capability to guide or focus acoustic pressure shock waves on a specific direction.

The inventions summarized below and defined by the enumerated claims are better understood by referring to the following detailed description, which should be read in conjunction with accompanying drawing. The detailed description of a particular embodiment is set out to enable one practice the inventions, it is not intended to limit the enumerated claims, but to serve as a particular example thereof.

Also, the list of embodiments presented in this patent is not an exhaustive one and for those skilled in the art, new applications can be found.

The acoustic pressure shock waves can increase convection in liquids by two mechanisms known as acoustic streaming and micro-streaming. The acoustic streaming represents momentum transferred to liquid from directed propagating acoustic pressure shock waves (pressure waves), causing the liquid to flow in the shock waves' propagation direction. During the cavitation phase, cavitation sets up eddy currents in fluid surrounding vibrating bubbles. In the vibrating gas bubbles vicinity, surrounding liquid is subjected to rotational forces and stresses, producing a microscopic shear flow/fluid movement called micro-streaming. Overall, acoustic streaming and micro-streaming create a unidirectional movement produced by acoustic pressure shock waves.

FIG. 1 shows interaction of acoustic pressure shock waves 10 with small particles 14 that are floating in a water/liquid medium 11. Due to above mentioned acoustic streaming and micro-streaming produced by the acoustic pressure shock waves 10, a unidirectional movement inside water/liquid medium 11 is produced, thus an acoustic pressure shock wave propagation direction 12 is defined. Practically, acoustic pressure shock waves 10 are moving with acoustic pressure shock wave velocity in liquids/fluids/water 16 of approximately 1500 m/s. Small particles 14 that are floating in a water/liquid/fluid medium 11 are engaged via acoustic streaming and micro-streaming produced by the acoustic pressure shock waves 10, thus small particles 14 start to travel in small particle movement direction 15. This process can be beneficial in liquids/fluids/water cleaning, due to the fact that acoustic pressure shock waves 10 can be used to move more efficiently/faster the small particles 14 (suspended/floating particles, sand, dissolved solids, soluble organics, microbial pollutants, dissolved gases, and radioactive materials from liquids/fluids/water) in the required direction to expedite their sedimentation and, finally, cleaning of liquids/fluids/water.

Figure 2:
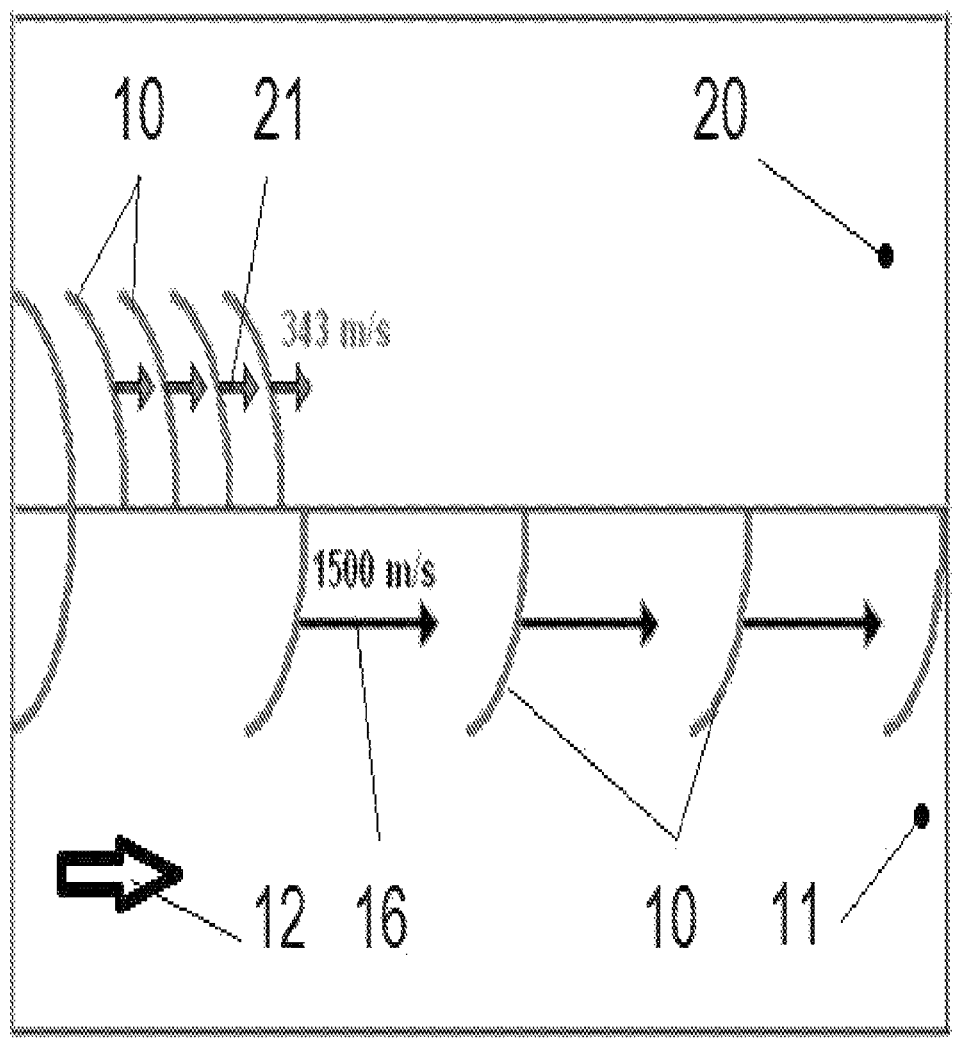
FIG. 2 is a schematic representation of acoustic pressure shock waves action at liquid/fluid/water interface with air/gaseous medium where acoustic pressure shock waves have a different propagation speed in air compared to liquid/fluid/water.

It is well known that acoustic pressure shock waves 10 travel with different acoustic speeds in different mediums. Thus, acoustic speed of acoustic pressure shock waves 10 is the slowest in air (c=343 m/s), it is faster in liquids/fluids/water (c=1500 m/s) and it is the fastest in solids (c=4800-9200 m/s). The difference of acoustic speed in between liquids/fluids/water and air/gaseous medium can be advantageously used when acoustic pressure shock waves 10 travel at the interface in between such mediums, as presented in FIG. 2. Practically, when acoustic pressure shock waves 10 are generated along the interface in between liquid/fluid/water medium 11 and air/gaseous medium 20, acoustic pressure shock waves 10 will move with acoustic pressure shock wave velocity in liquids/fluids/water 16 of approximately 1500 m/s and with acoustic pressure shock wave velocity in air/gaseous medium 21 of approximately 343 m/s, which creates a velocity differential, thus shear forces are generated at the interface/surface that separates liquid/fluid/water medium 11 from air/gaseous medium 20. This can be used to separate foam from liquids/fluids/water or any floating sludge/residues/oil or grease from industrial liquids/fluids or processed/produced waters.

Figure 3:
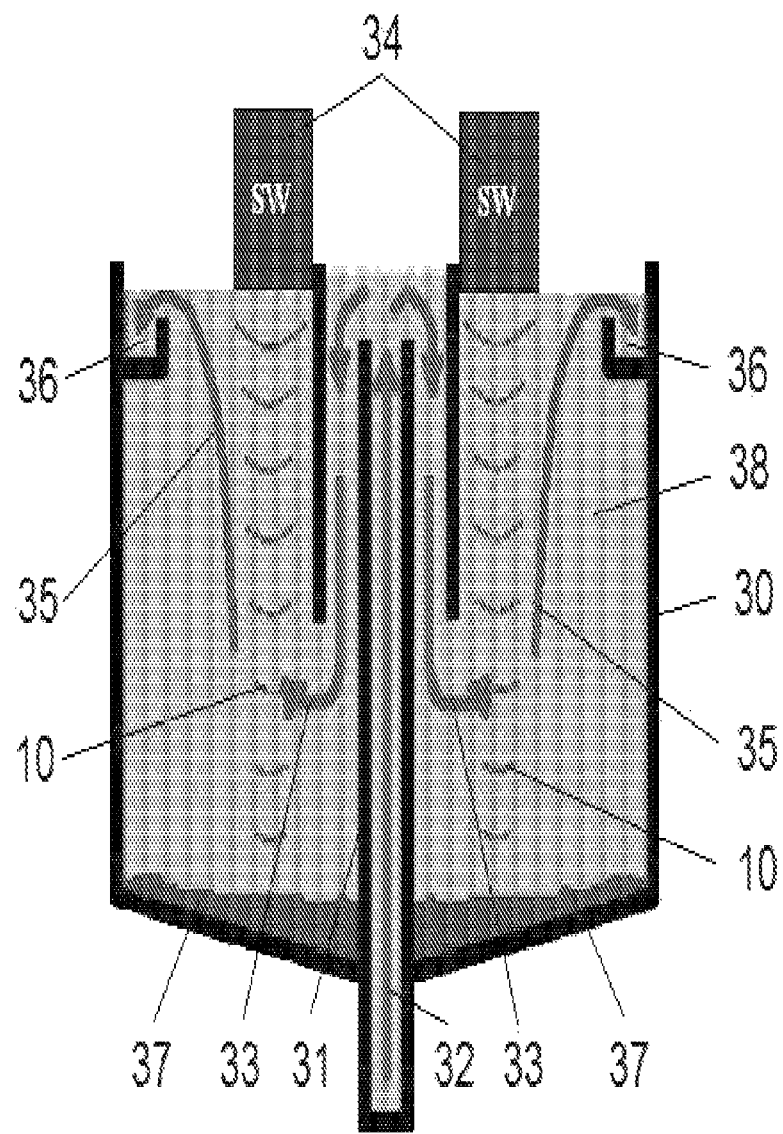
FIG. 3 is a schematic representation of a wastewater/produced water/contaminated liquid/fluid/water processing system that uses a cylindrical separation tank and acoustic pressure shock wave devices, according to one embodiment of the present invention.

The embodiment of FIG. 3 shows a schematic representation of a wastewater/processed or produced water/contaminated fluid/liquid processing system that uses a cylindrical separation tank 30 and acoustic pressure shock wave devices 34. Contaminated liquid/fluid/water 38 is pumped inside cylindrical separation tank 30 via central liquid/fluid/water inlet column 31. Central inlet liquid/fluid/water flow 32 has an upward direction, then contaminated liquid/fluid/water 38 is guided downward and a lateral liquid/fluid/water flow 33 is established through the action zone of acoustic pressure shock waves 10 produced by acoustic pressure shock wave devices 34 positioned at the top of cylindrical separation tank 30. The downward action of acoustic pressure shock waves 10 will efficiently push suspended/floating particles, sand, dissolved solids, soluble organics, minerals, microbial pollutants, dissolved gases, and radioactive materials from contaminated liquid/fluid/water 38 towards the bottom of cylindrical separation tank 30 where they accumulate as sludge 37. After passing through the action zone of acoustic pressure shock waves 10, liquid/fluid/water will take an upward liquid/fluid/water flow 35 towards clean liquid/fluid/water collection channel 36, which is the only way out from cylindrical separation tank 30.

Without acoustic pressure shock waves 10, the cleaning process of contaminated liquid/fluid/water 38 is functioning gravitationally, based on the fact that different particles coalescence together using different coagulants/flocculants, which makes their weight sufficient to overcome the buoyancy forces produced by contaminated liquid/fluid/water 38. By applying downward unidirectional acoustic streaming produced by acoustic pressure shock waves 10, suspended/floating small particles 12 (see FIG. 1) are pushed towards the bottom of cylindrical separation tank 30 with an additional force that adds to gravitational force produced by the particle weight, thus decreasing the time necessary to settle the particle at the bottom of the cylindrical separation tank 30 (easier to overcome contaminated liquid/fluid/water 38 buoyancy forces, which allows particles to move faster towards the bottom of cylindrical separation tank 30). A first consequence of acoustic pressure shock waves 10 action is a faster decontamination of contaminated liquid/fluid/water 38 (increased efficiency). The second consequence is the possibility of eliminating use of coagulants/flocculants, due to the fact that additional forces produced by acoustic pressure shock waves 10 might be able to settle much smaller suspended/floating particles 14 (see FIG. 1) at the bottom of cylindrical separation tank 30, thus eliminating use of coagulants/flocculants with the purpose to make particles bigger through coalescence, which has positive environmental implications.

Figure 4:
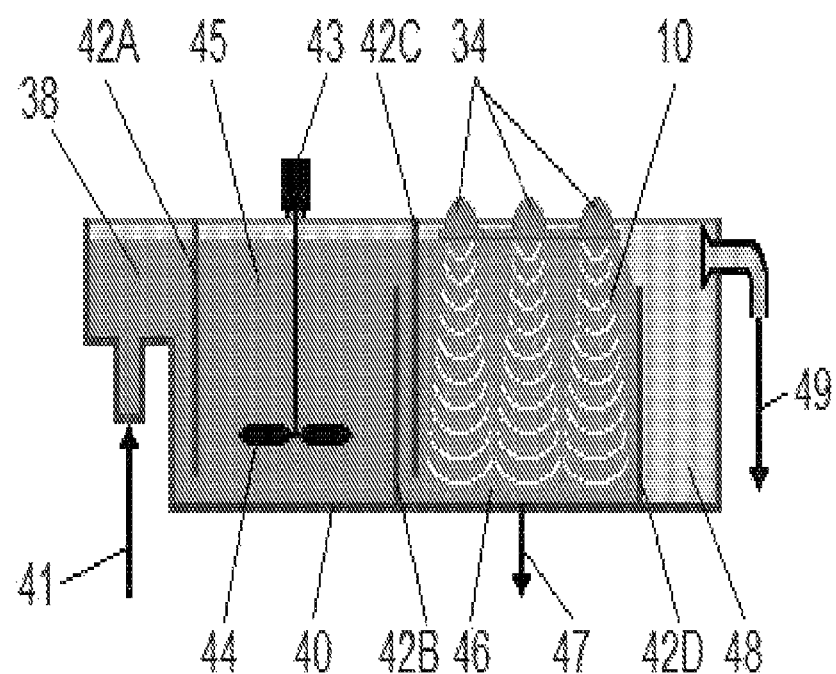
FIG. 4 is a schematic representation of wastewater/produced water/contaminated liquid/fluid/water processing system that uses a parallelepipedic weir tank/separation tank and acoustic pressure shock wave devices for wastewater/produced water/contaminated fluids/liquids processing, according to one embodiment of the present invention.

The embodiment of FIG. 4 shows schematic representation of a wastewater/processed or produced water/contaminated fluid/liquid processing system that uses a parallelepipedic weir tank/separation tank 40 and acoustic pressure shock wave devices 34. Contaminated liquid/fluid/water 38 is pumped via contaminated liquid/fluid/water inlet 41 inside the first chamber of parallelepipedic weir tank/separation tank 40. Contaminated liquid/fluid/water 38 is guided downward around the first separation/partition wall 42A to enter flocculation chamber 45. Flocculation station 43 dispenses coagulants/flocculants used to make bigger suspended/floating small particles 14 through coalescence (see FIG. 1), by mixing contaminated liquid/fluid/water 38 with dispensed coagulants/flocculants via mixing propeller 44. Some of coalesced particles may drop at the bottom of flocculation chamber 45 but majority of particles leave flocculation chamber 45 by passing in between the second and the third separation/partition walls 42B and 42C and enter acoustic pressure shock waves cleaning chamber 46. Contaminated liquid/fluid/water 38 establishes a diagonal flow from the bottom of the third separation/partition wall 42C towards the top of the fourth separation/partition wall 42D and through the action zone of acoustic pressure shock waves 10 produced by acoustic pressure shock wave devices 34 positioned at the top of pressure shock waves cleaning chamber 46. During this diagonal flow inside acoustic pressure shock waves cleaning chamber 46, contaminated liquid/fluid/water 38 is cleaned due to fact that coalesced particles fall at the bottom of the tank as a result of their weight and acoustic streaming force created by acoustic pressure shock waves 10, that overcome the upward buoyancy force produced by contaminated liquid/fluid/water 38. The downward action of acoustic pressure shock waves 10 will efficiently push suspended particles, sand, dissolved solids, soluble organics, microbial pollutants, dissolved gases, and radioactive materials from contaminated liquid/fluid/water 38 towards the bottom of pressure shock waves cleaning chamber 46 where they accumulate as sludge 37 (see FIG. 3), which is evacuated/collected through sludge outlet 47. After passing through the action zone of acoustic pressure shock waves 10, decontaminated liquid/fluid/water 48 flows towards filtration outlet 49.

The parallelepipedic weir tanks/separation tanks 40 (see FIG. 4) in general are designed to establish a relatively horizontal flow from contaminated liquid/fluid/water inlet 41 towards filtration outlet 49, which creates a longer residence time inside these parallelepipedic weir tanks/separation tanks 40 compared to cylindrical separation tanks 30. Due to longer residence time inside parallelepipedic weir tanks/separation tanks 40, dirtier liquid/fluid/waters can be cleaned, which makes these tanks the most popular to be used for wastewater and processed or produced liquids/fluids/waters cleaning.

Mineral exploitation is done with the use of significant amounts of water (processed or produced water) that subsequently need to be separated from the minerals and also cleaned from different residual contaminants. Also, oil exploitations are using significant amounts of water for primary, secondary and tertiary oil extraction. Most of the times, besides separation of oil from water, rocks or minerals and salt need to be extracted from this processed/produced water. For removal of suspended/floating particles, sand, dissolved solids, soluble organics, minerals, microbial pollutants, dissolved gases, and radioactive materials from processed or produced liquids/fluids/waters, the most commonly used systems are evaporation ponds or evaporation tanks, coagulation/flocculation tanks and gas flotation systems.

Evaporation ponds are artificial reservoirs that require a relatively large space of land, designed to efficiently evaporate water by solar energy. It is a favorable technology for warm and dry climates, due to potential high evaporation rates. Evaporation ponds advantages have very low operational costs, are solar driven with minimal maintenance costs, and their disadvantages are leaching, expensive lining materials, high cost of land, slow process, dependency on climate, etc.

The majority of tailing ponds are formed from produced/process water used in oil, mining exploitations, industrial processes, etc. and contain not only dirty liquids/fluids/water, but also toxic substances that affect the environment and wildlife, thus creating an environmental hazard. It is the reason why adjacent communities to tailing ponds are moving to eliminate said ponds, clean the areas and regain the land for other uses. To clean and eliminate tailing ponds, stationary facilities can be created that are using parallelepipedic weir tanks/separation tanks 40 (as presented in FIG. 4) that are environmentally safe.

Evaporation ponds can also be replaced by mobile steel evaporation tanks called weir/separation tanks (similar in construction to the parallelepipedic weir tanks/separation tanks 40 presented in FIG. 4), that can be hauled by trucks to desired location. Acoustic pressure shock waves 10, by producing acoustic streaming via pressure gradients and collapse of cavitational bubbles, can easily separate and produce sedimentation of suspended/floating small particles 14 from contaminated water/liquids/fluids 38 (see FIG. 4). The cleaning process can be completed in some cases using only acoustic pressure shock waves 10 (without the need of additional chemicals/flocculants), which can make the process more environmentally friendly.

There are also other situations where acoustic pressure shock waves 10 are used in combination with different flocculants that aggregate particles in larger clumps. Due to the fact that acoustic pressure shock waves 10 produce streaming inside an aqueous/liquid/fluid medium, acoustic pressure shock waves 10 can be used to mix flocculants with wastewater or processed/produced liquid/fluid/water without the use of expensive mixers, and to produce in the same time a directional move towards the bottom of parallelepipedic weir tanks/separation tanks 40 to push downward particles attached to flocculants, where sludge is accumulated.

In treating processed or produced liquid/fluid/water with acoustic pressure shock waves 10 (see FIG. 1, FIG. 2, FIG. 3 or FIG. 4), the efficient extraction of minerals/elements can be achieved. For these processes, acoustic pressure shock waves 10 can produce reactive species generated by cavitation bubbles collapse created by the tensile phase of acoustic pressure shock waves 10, which can facilitate and promote different necessary chemical reactions at lower energies, thus improving the efficiency of minerals/elements extraction from processed/produced liquid/fluid/water. With this method, acoustic pressure shock waves 10 can eliminate some of the chemicals used in liquid/fluid/water cleaning process, making its cleaning more environmental friendly. Thus, acoustic pressure shock waves can easily deal with foam formation and separation from processed/produced liquid/fluid/water. Also, due to elimination or reduced use of chemicals, when acoustic pressure shock wave technology is employed, the equipment fouling, scaling, foaming and corrosion can be reduced or eliminated. Also, if fouling and scaling do occur, acoustic pressure shock waves can be used to clean the pipes/equipment, as presented in US Application US 2015/0337630.

Using energy delivered by acoustic pressure shock waves 10, processes such as blending, homogenizing, deagglomerating, dispersing, dissolving, particle size reduction, particle surface cleaning, agitation, etc. can be achieved. For this purpose, a mobile fleet of trucks that haul tanks similar to parallelepipedic weir tanks/separation tanks 40 that use acoustic pressure shock waves 10 can be used. Alternatively, acoustic pressure shock waves can be employed in proprietary tanks/enclosures/reactors in shape of a full ellipsoid, to be able and separate suspended particles and ionic substances into precipitants (for example lithium, selenium, zircon, sulfur, heavy mining minerals/metals, salts, etc.), that may have additional commercial value after their cleaning or processed with other secondary processes using known technologies. In this case, specialized trucks hauling trailers on which distinctive proprietary full ellipsoid shaped tanks/enclosures/reactors are installed, to enhance effectiveness of acoustic pressure shock waves 10 in cleaning processed or produced liquid/fluid/water of oil, debris, large particles, suspended/floating particles, sand, dissolved solids, soluble organics, minerals, microbial pollutants, dissolved gases, and radioactive materials or extraction of minerals/elements (see FIG. 5A. FIG. 5B and FIG. 5C). The advantage of such mobile fleet of specialized trucks is the mobility from one tailing pond to another once cleaning is completed, no additional infrastructure is left behind. Also, this approach of mobile trucks can be used for new exploitation, thus avoiding creating new tailing ponds.

Figure 5A:
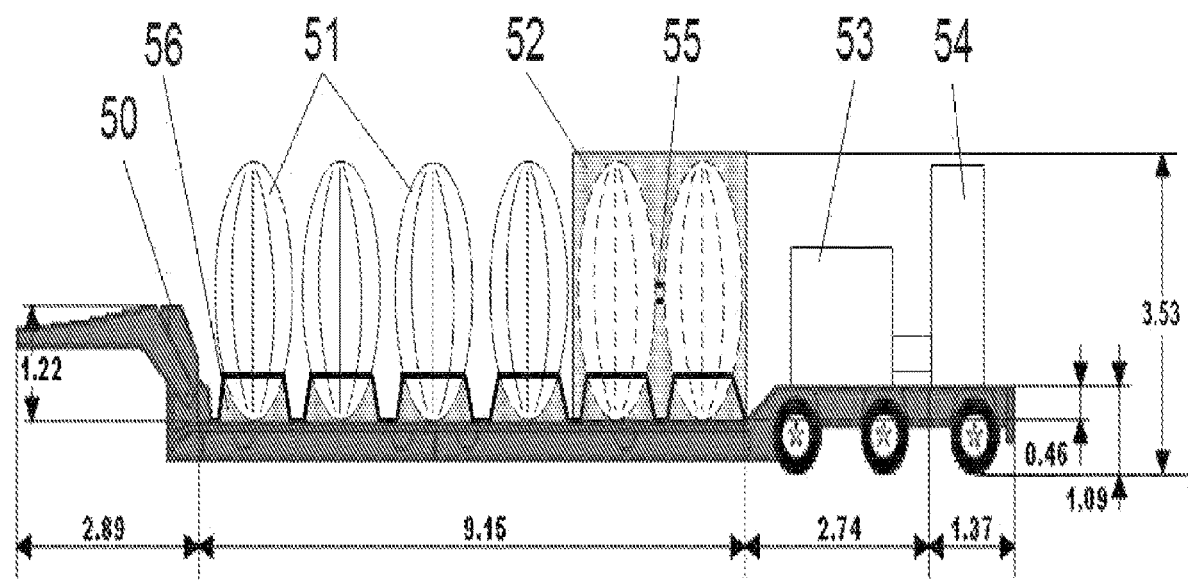
FIG. 5A is a schematic representation of a mobile wastewater/produced water/contaminated liquid/fluid/water processing unit installed on a trailer that uses acoustic pressure shock wave devices and full ellipsoidal tanks, according to one embodiment of the present invention.
Figure 5B:
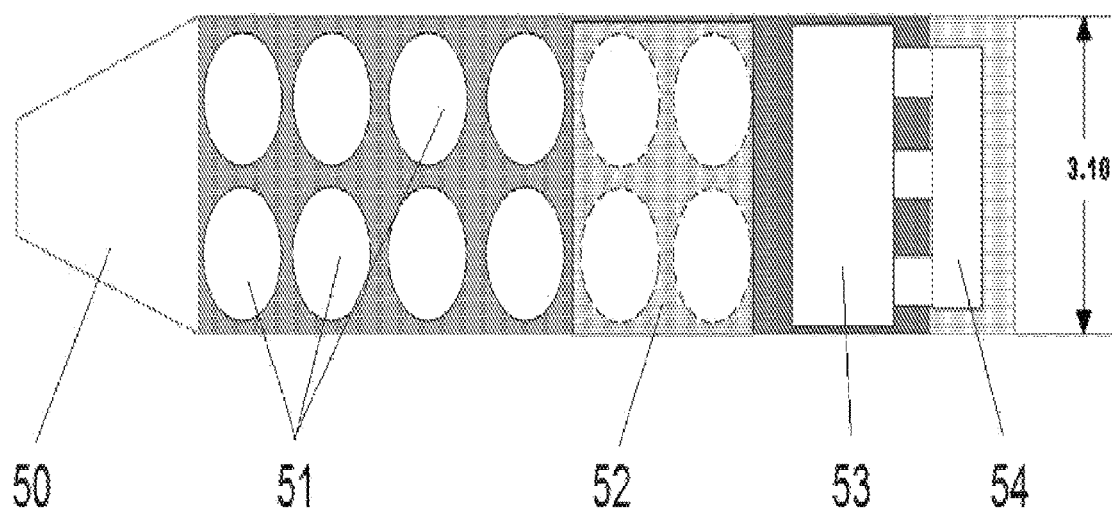
FIG. 5B is a top view schematic representation of a mobile wastewater/produced water/contaminated liquid/fluid/water processing unit installed on a trailer that uses acoustic pressure shock wave devices and full ellipsoidal tanks, according to one embodiment of the present invention.
Figure 5C:
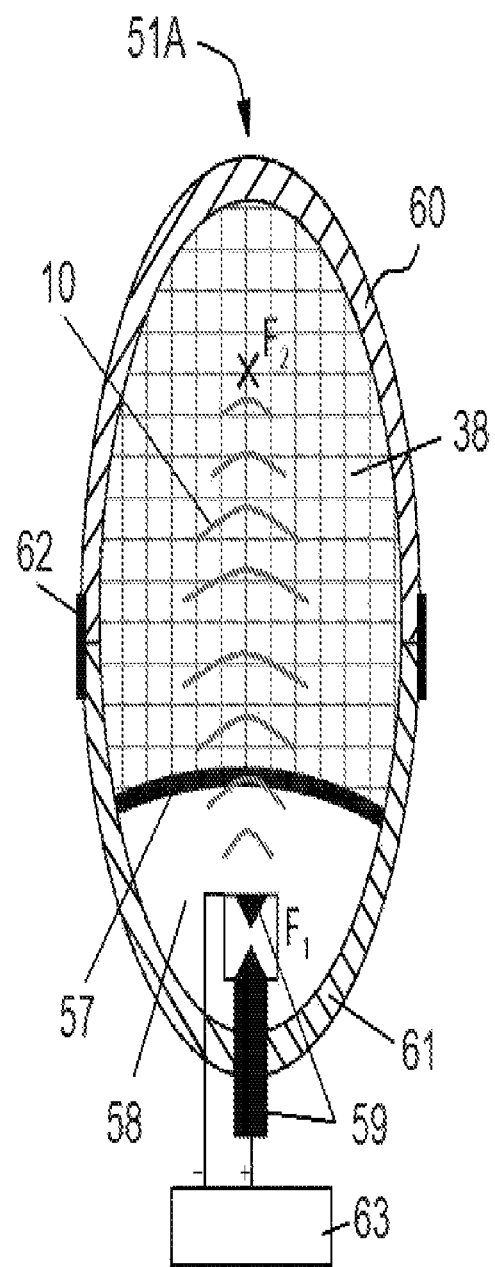
FIG. 5C is a cross-sectional schematic representation of one of the full ellipsoidal tanks presented in FIG. 5A that has a dedicated space to produce acoustic pressure shock waves, according to one embodiment of the present invention.
Figure 5D:
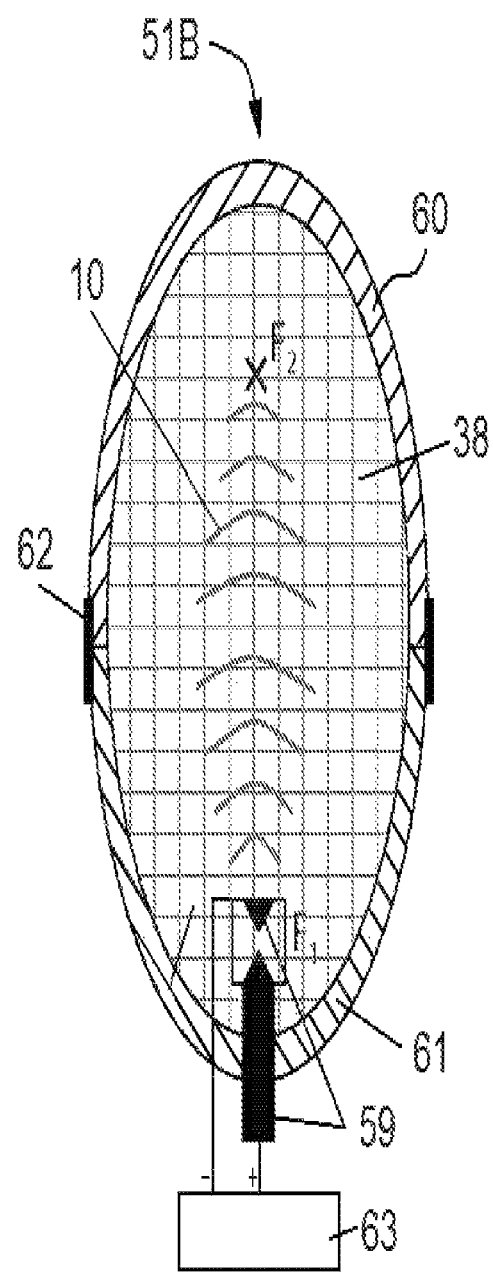
FIG. 5D is a cross-sectional schematic representation of one of the full ellipsoidal tanks presented in FIG. 5A that uses wastewater/produced water/contaminated liquid/fluid/water to generate acoustic pressure shock waves, according to one embodiment of the present invention.

FIG. 5A shows a double drop trailer 50 that carries twelve (12) specialized ellipsoidal acoustic shock wave tanks 51, each with a capacity of 600 gallons, where all trailer dimensions are given in meters. Specialized ellipsoidal acoustic shock wave tanks 51 (full ellipsoid) can be designed to have 300, 600, 900, 1200 or 1800 gallons capacity. In order to accomplish different capacities, the small axis diameter of ellipsoid will increase for 300 to 1800 gallons capacity specialized ellipsoidal acoustic shock wave tanks 51, still having a height (ellipsoid's large axis) that allows trailer to fit under normal bridges build over roads. The number of specialized ellipsoidal acoustic shock wave tanks 51 that fit on a trailer can be 3 tanks for 1800-gallon tanks and up to 12 tanks for the 300 and 600-gallon tanks. In the embodiment presented in FIG. 5A, due to a large number of specialized ellipsoidal acoustic shock wave tanks 51 that fit on double drop trailer 50, said tanks can be grouped and create specialized modules 52, designed to produce acoustic pressure shock waves 10 (see FIG. 5B and FIG. 5C) and accomplish certain cleaning operation (for example, separation of oil from water or separation of suspended particles and ionic substances into precipitants, etc.). The specific operation is accomplished by specific orientation of acoustic shock waves 10 (upward, as seen in FIG. 5B and FIG. 5C, or downward, accomplished when specialized ellipsoidal acoustic shock wave tanks 51 are rotated 180°), dosage (number of acoustic pressure shock waves per second and energy input) or specific substances designed to work in tandem with acoustic pressure shock waves 10. The circulation of processed/produced liquid/fluid/water from one specialized module 52 to another, or from one specialized ellipsoidal acoustic shock wave tank 51 to another is accomplished by pumps module 53 that can incorporate one or more pumps. The connection in between different specialized ellipsoidal acoustic shock wave tanks 51 is realized via liquid/fluid/water circulating pipes 55, which can be positioned at the bottom (not shown in FIG. 5A for simplicity and clarity), at the middle (shown in FIG. 5A) or at the top (not shown in FIG. 5A for simplicity and clarity) of specialized ellipsoidal acoustic shock wave tanks 51. The verticality of each specialized ellipsoidal acoustic shock wave tanks 51 is assured by tank supports 56.

The speed of processed/produced liquid/fluid/water through specialized ellipsoidal acoustic shock wave tanks 51 or specialized modules 52 is assured by control and data panel 54, that controls and displays the work performed by pumps module 53 and the closed or opened state for different valves (not shown in FIG. 5A for simplicity). Furthermore, control and data panel 54 controls and displays the energy output/dosage and functionality of acoustic pressure shock wave generators 63 (see FIG. 5B or FIG. 5C) for each specialized ellipsoidal acoustic shock wave tank 51. In the embodiments presented in FIG. 5A, FIG. 5B and FIG. 5C, upper shell 60 of an ellipsoid geometry is used to create a full ellipsoid together with lower shell 61, which allows usage of the whole ellipsoid surface for focusing acoustic pressure shock waves 10. In this way, a field of pressure gradients is created in the whole ellipsoid volume, which in principle doubles the efficiency, compared to classical construction where only lower shell 61 (called reflector, that represents only half an ellipsoid) is employed, which uses only 50% of an ellipsoid surface to focus acoustic pressure shock waves 10.

If contaminated liquid/fluid/water 38 has a high viscosity and cannot produce acoustic pressure shock waves via electrohydraulic principle (high voltage discharge in between electrodes 59 in order to create an oscillating plasma bubble), then a clean liquid/fluid/water propagation medium 58 is necessary (see FIG. 5B) to produce oscillating plasma bubble in between electrodes 59, thus generating acoustic pressure shock waves in first focal point $F_1$, which then are focused towards the second focal point $F_2$. To accomplish this, a membrane 57 needs to be incorporated inside specialized ellipsoidal acoustic shock wave tank with membrane 51A (see FIG. 5B), which allows the separation of contaminated liquid/fluid/water 38 from clean liquid/fluid/water propagation medium 58, where acoustic pressure shock waves (not shown in FIG. 5B for simplicity and clarity) are generated via high voltages and currents provided by acoustic pressure shock wave generators 63. The acoustic impedance (product of sound speed and medium/material density) of membrane 57 should be in the same range/value with the acoustic impedance of clean liquid/fluid/water propagation medium 58 and contaminated liquid/fluid/water 38, to assure a propagation of acoustic pressure shock waves without losses.

In order to allow easy cleaning of specialized ellipsoidal acoustic shock wave tank with membrane 51A from FIG. 5B, the actual ellipsoid's reflective surface created by using upper shell 60 combined with lower shell 61, kept in place using connecting and sealing assembly 62. For those skilled in the art of engineering, connecting and sealing assembly 62 can be a set of flanges secured in place with screws that incorporate sealing elements such as O-rings, flat or special seals or a band with sealing elements that is secured in place with screws, or any other design that provides a good liquid/fluid/water seal and keeps together upper shell 60 and lower shell 61.

If the contaminated liquid/fluid/water 38 has a low viscosity and can produce acoustic pressure shock waves via electrohydraulic principle (high voltage discharge in between electrodes 59 in order to create an oscillating plasma bubble), then there is no need to have a membrane 57 (as seen in FIG. 5B). In this case, specialized ellipsoidal acoustic shock wave tank without membrane 51B can be used to produce oscillating plasma bubble in between electrodes 59 and thus generating acoustic pressure shock waves in the first focal point $F_1$, which then are focused towards the second focal point $F_2$ (see FIG. 5C).

In order to allow easy cleaning of specialized ellipsoidal acoustic shock wave tank without membrane 51B from FIG. 5C, the actual reflective surface of the ellipsoid is created by using upper shell 60 combined with lower shell 61, kept in place using connecting and sealing assembly 62 that provides a good liquid/fluid/water seal and keeps together upper shell 60 and lower shell 61. As presented before for FIG. 5B, also for the embodiment from FIG. 5C, connecting and sealing assembly 62 can be a set of flanges secured in place with screws that incorporate sealing elements such as O-rings, flat or special seals or a band with sealing elements that is secured in place with screws, or any other design that can provide connection and sealing and can be developed by those skilled in the art of engineering.

For specialized ellipsoidal acoustic shock wave tank with membrane 51A and specialized ellipsoidal acoustic shock wave tank without membrane 51B presented in FIG. 5B and FIG. 5C, if any sludge 37 is produced, special sludge outlets 47 (not specifically shown in FIG. 5B and FIG. 5C) can be added to tanks 51A and 51B for continuous collection of sludge 37 via dedicated pump/pumps from pumps module 53.

Figure 6:
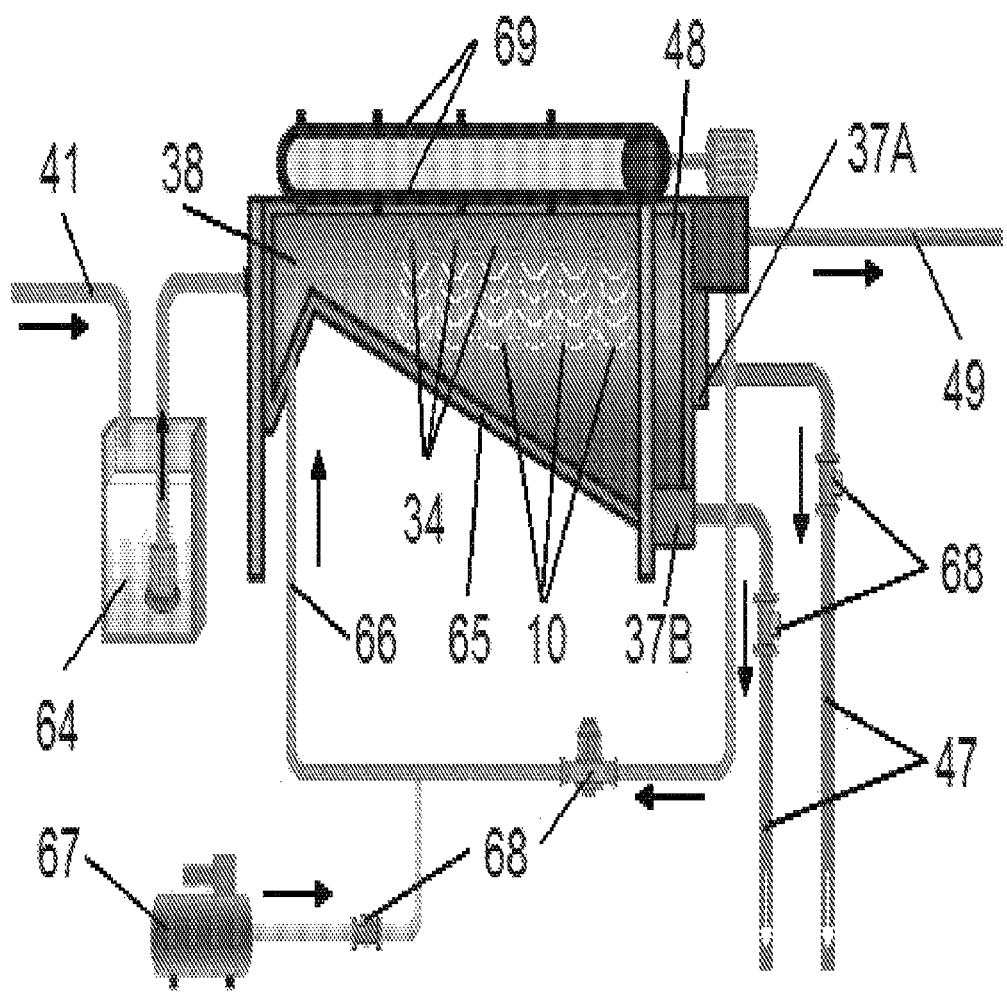
FIG. 6 is the schematic representation of a wastewater/produced water/contaminated liquid/fluid/water processing system that uses acoustic pressure shock wave devices as an integral part of a dissolved air flotation system, according to one embodiment of the present invention.

Another method used for cleaning processed or produced contaminated liquid/fluid/water 38 is the gas flotation technology (see FIG. 6). This process uses fine gas bubbles to separate suspended particles that are not easily separated by sedimentation from contaminated liquid/fluid/water 38 that is introduced inside gas flotation parallelepipedic tank 65 via contaminated liquid/fluid/water inlet 41 and feed sump 64. When gas is injected through gas flotation feed 66 from air compressor 67 into processed or produced contaminated liquid/fluid/water 38, suspended particulates and oil droplets are attached to air bubbles, as they rise. This action results into formation of foam on the surface of contaminated liquid/fluid/water 38, which is skimmed off as froth by scraper 69 and results in sludge 37A, that is evacuated via sludge outlet 47 after valve 68 is opened. Gas flotation can remove particles as small as 25 μm and can even remove contaminants up to 3 mm in size, if coagulation is added as a pre-treatment, but it cannot remove soluble oil constituents from water. Acoustic pressure shock waves 10 produced by acoustic pressure shock wave devices 34 can be used to push down any particles that were not raised to the surface of gas flotation parallelepipedic tank 65 during air flotation process, as seen in FIG. 6. Accumulation of sludge 37B at the bottom of gas flotation parallelepipedic tank 65, produced by acoustic pressure shock waves 10 generated by the acoustic pressure shock wave devices 34, is evacuated via corresponding sludge outlet 47 after valve 68 is opened. Practically, by combining air flotation with acoustic pressure shock waves 10 (that produce a downward acoustic streaming), the system efficiency can be improved. Furthermore, in some embodiments (see FIG. 9), acoustic pressure shock waves 10 can be used to push accumulated foamy sludge 37A at the top of the tank, without any moving mechanical means, which can increase the system reliability (the absence of moving parts reduces the possibility of malfunctions). Decontaminated liquid/fluid/water 48 is evacuated via filtration outlet 49 for further clarification/filtration. Any liquid/fluid/water flow in the system or flow of compressed air from compressor 67 or of sludge 37A or 37B is controlled via valves 68.

Figure 7:
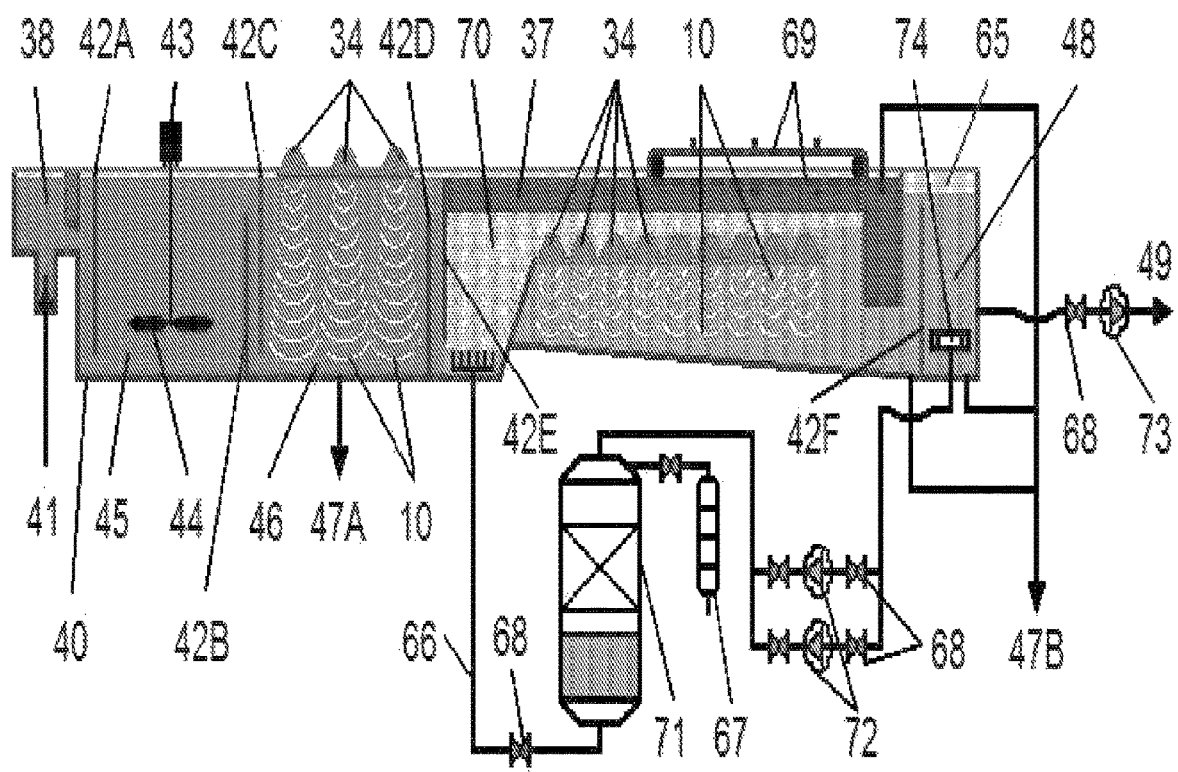
FIG. 7 is the schematic representation of a wastewater/produced water/contaminated liquid/fluid/water processing system that uses acoustic pressure shock wave devices to pre-treat wastewater/produced water/contaminated liquid/fluid/water before entering a parallelepipedic dissolved air flotation system that also incorporates acoustic pressure shock wave devices, according to one embodiment of the present invention.

A typical gas flotation system is designed to re-circulate a portion of clarified decontaminated liquid/fluid/water 48 through a pressurization system by means of centrifugal recycle pumps 72 (shown in FIG. 7 and not specifically shown in FIG. 6). Recycled decontaminated liquid/fluid/water 48 collected via liquid/fluid/water recirculation filter 74 is pumped by centrifugal recycle pumps 72 into an air saturation tank 71 where compressed air sent by air compressor 67 is dissolved into flow under pressure. Air saturated recycled decontaminated liquid/fluid/water 48 is then pushed under pressure through valve 68 into gas flotation feed 66 towards gas flotation parallelepipedic tank 65, where it thoroughly mixes with contaminated liquid/fluid/water 38 or partially cleaned liquid/fluid/water, due to acoustic shock waves 10 action generated by acoustic pressure shock wave devices 34 inside acoustic pressure shock waves cleaning chamber 46, as shown in FIG. 7. The sudden release of pressure by means of a back pressure control valve 68 causes dissolved air to come out of solution and form microscopic gas flotation bubbles 70. These microscopic gas flotation bubbles 70 adhere to incoming solids from contaminated liquid/fluid/water 38 and form a buoyant blanket, which rises to the surface for mechanical removal with scraper 69.

To increase efficiency of liquid/fluid/water cleaning, the embodiment from FIG. 7 shows combination of parallelepipedic weir tank/separation tank 40 (executes heavy cleaning of contaminated liquid/fluid/water 38 inside acoustic pressure shock waves cleaning chamber 46, using flocculation combined with acoustic pressure shock waves 10) with a gas flotation parallelepipedic tank 65 (continues cleaning of contaminated liquid/fluid/water 38 using microscopic gas flotation bubbles 70 combined with acoustic pressure shock waves 10). This combination system presented in FIG. 7 can increase the cleaning efficiency for heavily contaminated liquid/fluid/water 38, by combining flocculation technology, air flotation technology and acoustic shock wave technology. Practically, heavy contaminated liquid/fluid/water 38 is introduced inside parallelepipedic weir tank/separation tank 40 via contaminated liquid/fluid/water inlet 41 and passes separation/partition wall 42A to get inside flocculation chamber 45, where flocculation process takes place under the action of mixing propeller 44 driven by flocculation station 43 that also is dispensing the flocculent agent. Some of the coalesced particles may drop at the bottom of flocculation chamber 45, but most of the particles leave flocculation chamber 45 by passing in between the second and the third separation/partition walls 42B and 42C and enter acoustic pressure shock waves cleaning chamber 46. Contaminated liquid/fluid/water 38 establishes a diagonal flow from the bottom of the third separation/partition wall 42C towards the top of the fourth separation/partition wall 42D and right through the action zone of acoustic pressure shock waves 10 produced by acoustic pressure shock wave devices 34, positioned at the top of acoustic pressure shock waves cleaning chamber 46. During this diagonal flow inside acoustic pressure shock waves cleaning chamber 46, contaminated liquid/fluid/water 38 is cleaned due to fact that coalesced particles fall at the bottom of the tank as a result of own weight and acoustic streaming force created by acoustic pressure shock waves 10 that overcomes the upward buoyancy force produced by contaminated liquid/fluid/water 38. The downward action of acoustic pressure shock waves 10, combined with the downward flow of contaminated liquid/fluid/water 38, will efficiently push suspended particles, sand, dissolved solids, soluble organics, microbial pollutants, dissolved gases, and radioactive materials from contaminated liquid/fluid/water 38 towards the bottom of acoustic pressure shock waves cleaning chamber 46, where particles are evacuated/collected through sludge outlet 47A. After passing through the action zone of acoustic pressure shock waves 10, partially decontaminated liquid/fluid/water flows in between the fourth and the fifth separation/partition walls 42D and 42E and enters gas flotation parallelepipedic tank 65. Microscopic gas flotation bubbles 70 attach to the remaining suspended particulates and oil droplets as they rise towards the top of gas flotation parallelepipedic tank 65. This process creates a foamy/floating sludge 37 at the interface between liquid/fluid/water and air, which is skimmed into a float box/sludge collection area or chamber (at the right side of the gas flotation parallelepipedic tank 65) from where sludge is evacuated/collected via sludge outlet 47B. The bubbly liquid/fluid/water has the tendency to stay at the top of gas flotation parallelepipedic tank 65, and microscopic gas flotation bubbles 70 just disintegrate in the air above gas flotation parallelepipedic tank 65. However, the majority of the liquid/fluid/water is pushed towards the right lower corner of gas flotation parallelepipedic tank 65, which forces partially cleaned liquid/fluid/water to move through the action zone of acoustic pressure shock waves 10 produced by acoustic pressure shock wave devices 34 positioned relatively at the top of gas flotation parallelepipedic tank 65 and below the mixture of liquid/fluid/water with microscopic gas flotation bubbles 70 and sludge 37, that accumulates at the top of gas flotation parallelepipedic tank 65. This process produces an additional cleaning of partially cleaned liquid/fluid/water, and accumulated sludge (at the bottom of gas flotation parallelepipedic tank 65) is evacuated/collected via sludge outlet 47B. Note that acoustic pressure shock waves 10 produced by acoustic pressure shock wave devices 34 from acoustic pressure shock waves cleaning chamber 46 have a downward action against the upward flow of contaminated liquid/fluid/water 38, and in gas flotation parallelepipedic tank 65, acoustic pressure shock waves 10 act in the same direction with the downward flow of partially cleaned liquid/fluid/water, which shows versatility of usage of acoustic pressure shock waves 10 in cleaning processed or produced contaminated liquid/fluid/water 38. In the system presented in FIG. 7, finally, decontaminated liquid/fluid/water then passes the sixth separation/partition walls 42E and it is evacuated via filtration outlet 49 (for further filtration/clarification) when valve 68 is opened and outlet pump 73 is actuated.

Figure 8:
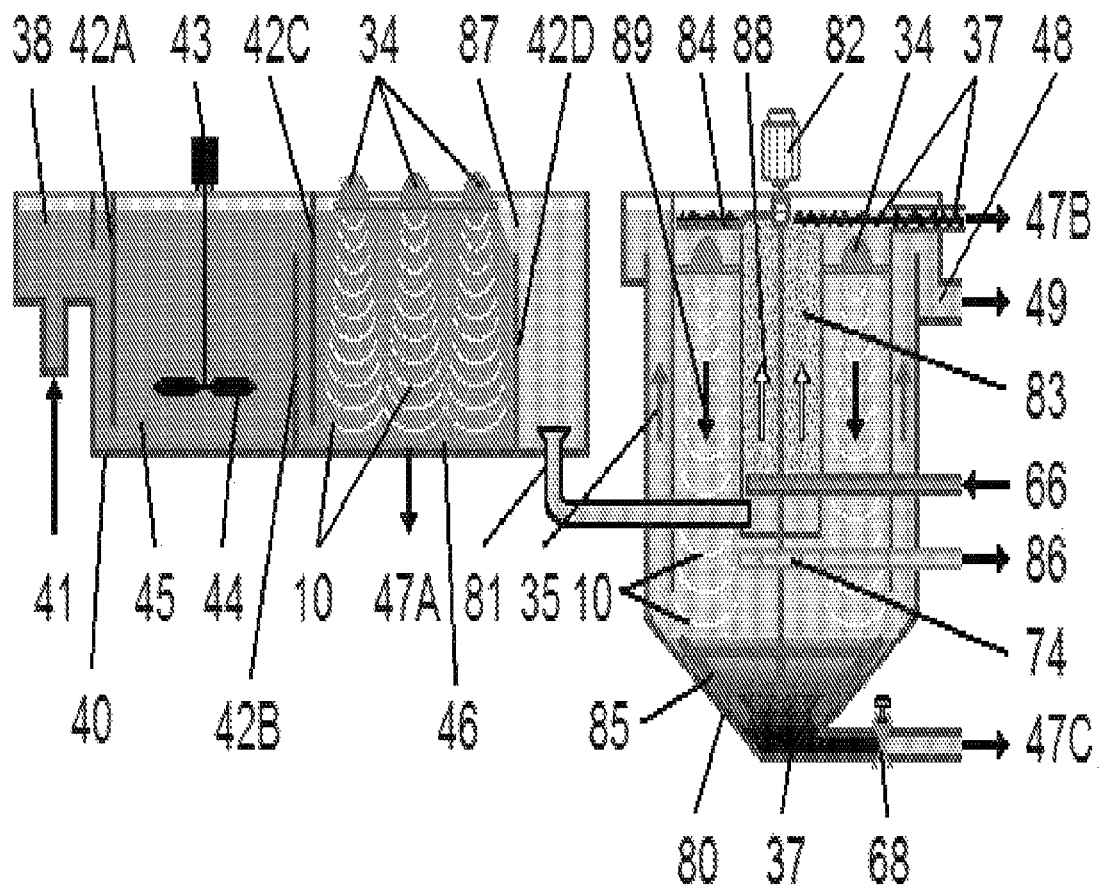
FIG. 8 is the schematic representation of a wastewater/produced water/contaminated liquid/fluid/water processing system that uses acoustic pressure shock wave devices to pre-treat wastewater/produced water/contaminated liquid/fluid/water before entering a cylindrical dissolved air flotation system that also incorporates acoustic pressure shock wave devices, according to one embodiment of the present invention.

In another embodiment of this invention, for increased efficiency of liquid/fluid/water cleaning, a combination of a parallelepipedic weir tank/separation tank 40 (does the heavy cleaning of contaminated liquid/fluid/water 38 inside acoustic pressure shock waves cleaning chamber 46 using flocculation combined with acoustic pressure shock waves 10) with a gas flotation cylindrical tank 80 (continues the cleaning of contaminated liquid/fluid/water 38 using microscopic gas flotation bubbles 70 inside a rise tube 83 combined with acoustic pressure shock waves 10) is presented in FIG. 8.

The system from FIG. 8 is also combining flocculation technology, air flotation technology and acoustic shock wave technology (similar to the system from FIG. 7) to increase the efficiency of cleaning for heavy contaminated liquid/fluid/water 38. Practically, heavy contaminated liquid/fluid/water 38 is introduced inside parallelepipedic weir tank/separation tank 40 via contaminated liquid/fluid/water inlet 41 and passes separation/partition wall 42A to get inside flocculation chamber 45, where flocculation process takes place under the action of mixing propeller 44 driven by flocculation station 43 that is also dispensing the flocculent agent. Some of the coalesced particles may drop at the bottom of flocculation chamber 45, but most of the particles leave flocculation chamber 45 by passing in between the second and the third separation/partition walls 42B and 42C, and enter acoustic pressure shock waves cleaning chamber 46. Contaminated liquid/fluid/water 38 establishes a diagonal flow from the bottom of the third separation/partition wall 42C towards the top of the fourth separation/partition wall 42D and right through the action zone of acoustic pressure shock waves 10 produced by acoustic pressure shock wave devices 34 positioned at the top of acoustic pressure shock waves cleaning chamber 46. During this diagonal flow inside acoustic pressure shock waves cleaning chamber 46, contaminated liquid/fluid/water 38 is cleaned due to fact that coalesced particles fall at the bottom of the tank as a result of own weight and acoustic streaming force created by acoustic pressure shock waves 10 that overcomes the upward buoyancy force produced by contaminated liquid/fluid/water 38. The downward action of acoustic pressure shock waves 10 combined with the downward flow of contaminated liquid/fluid/water 38 will efficiently push suspended particles, sand, dissolved solids, soluble organics, microbial pollutants, dissolved gases, and radioactive materials from contaminated liquid/fluid/water 38 towards the bottom of acoustic pressure shock waves cleaning chamber 46, where particles are evacuated/collected through sludge outlet 47A. After passing through the action zone of acoustic pressure shock waves 10, partially decontaminated liquid/fluid/water flows over the fourth separation/partition walls 42D and enter connection pipe 81 that is transferring partially decontaminated liquid/fluid/water from parallelepipedic weir tank/separation tank 40 to the bottom-central part of gas flotation cylindrical tank 80. Gas flotation feed 66 introduces microscopic gas flotation bubbles inside rise tube 83 in which partially decontaminated liquid/fluid/water together with microscopic gas flotation bubbles are creating an upward gas flotation movement 88. During their upward gas flotation movement 88 inside rise tube 83, the microscopic gas flotation bubbles attach to remaining suspended particulates and oil droplets as they rise towards the top of gas flotation cylindrical tank 80. This process creates a foamy/floating sludge 37 at the interface in between liquid/fluid/water and air at the top of gas flotation cylindrical tank 80, which is skimmed using a half bridge scraper 84 and then evacuated/collected via sludge outlet 47B. The bubbly liquid/fluid/water has the tendency to stay at the top of gas flotation cylindrical tank 80 and the microscopic gas flotation bubbles just disintegrate in the air above gas flotation cylindrical tank 80. However, the majority of liquid/fluid/water is pushed towards the bottom of gas flotation cylindrical tank 80 in a downward liquid/fluid/water flow 89, which forces partially cleaned liquid/fluid/water to move through the action zone of acoustic pressure shock waves 10 produced by acoustic pressure shock wave devices 34 positioned relatively at the top of gas flotation parallelepipedic tank 65 and below the mixture of liquid/fluid/water with microscopic gas flotation bubbles and sludge 37 that accumulates at the top of gas flotation cylindrical tank 80. This additional downward force, created by acoustic pressure shock waves 10, will overlap with the normal downward flow of partially cleaned liquid/fluid/water, which will enhance the cleaning of remaining suspended particulates that will accumulate as sludge 37 at the bottom of gas flotation cylindrical tank 80. Sludge 37 is scrapped using a bottom scraper 85 towards the central part of the bottom of gas flotation cylindrical tank 80 and then evacuated/collected via sludge outlet 47C when valve 68 is opened. Afterwards, decontaminated liquid/fluid/water 48 has an upward liquid/fluid/water flow 35, and it is evacuated via filtration outlet 49 (for further filtration/clarification). For gas flotation cylindrical tank 80, a part of decontaminated liquid/fluid/water 48 is collected via liquid/fluid/water recirculation filter 74 and send via collection pipe for white water 86 to be reintroduced inside gas flotation cylindrical tank 80 using gas flotation feed 66, in order to produce microscopic gas flotation bubbles inside rise tube 83 (using a similar system to produce microscopic gas flotation bubbles, as presented in detail in FIG. 7).

Figure 9:
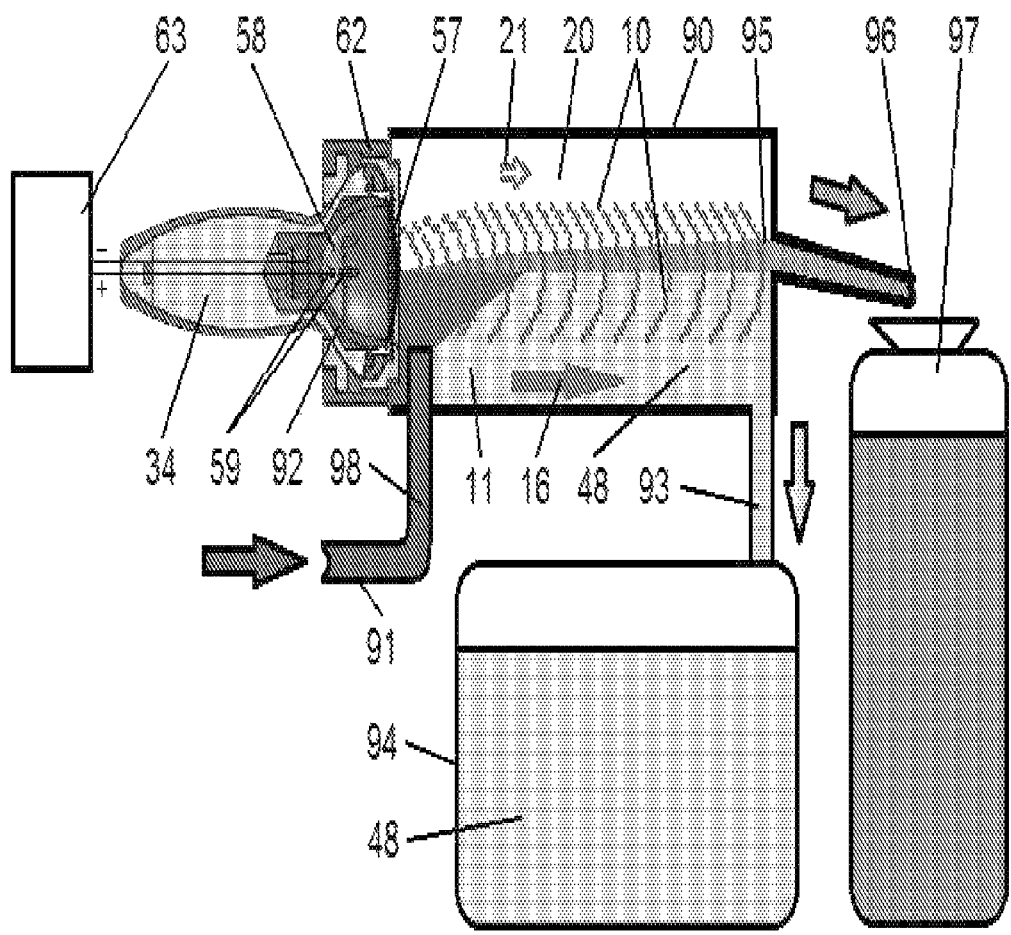
FIG. 9 is the schematic representation illustrating use of acoustic pressure shock wave devices to separate floating foam/sludge/oil or grease at the surface of wastewater/produced water/contaminated liquid/fluid/water, according to one embodiment of the present invention.

In the embodiment presented in FIG. 9, acoustic pressure shock waves 10 can be used to push accumulated foam or foamy sludge 95 present at the top of horizontal separation tank 90, without any moving mechanical means, which can increase the system reliability (the absence of moving parts reduces the possibility of malfunctions). As presented in FIG. 2, the difference of acoustic speeds in between liquids/fluids/water medium 11 and air/gaseous medium 20 can be advantageously used when acoustic pressure shock waves 10 travel at the interface in between such mediums. Practically, when acoustic pressure shock waves 10 are generated along the interface in between liquid/fluid/water medium 11 and air/gaseous medium 20, acoustic pressure shock waves 10 will move with acoustic pressure shock wave velocity in liquids/fluids/water 16 of approximately 1500 m/s, and with acoustic pressure shock wave velocity in air/gaseous medium 21 of approximately 343 m/s, which creates a velocity differential, thus shear forces are generated at the interface/surface that separates liquid/fluid/water medium 11 from air/gaseous medium 20. These shear forces can be used to separate foam from mixture of liquid/fluid/water and foam 98 or any floating sludge/residues/oil or grease from wastewater or industrial processed/produced liquid/fluid/water.

Compared to the embodiments presented before in FIG. 3, FIG. 4, FIG. 5A, FIG. 5B, FIG. 5C, FIG. 6, FIG. 7 and FIG. 8 (where acoustic pressure shock waves 10 are vertical, moving either upwards or downwards), in the embodiment from FIG. 9, acoustic pressure shock wave devices 34 are horizontal and oriented at the interface/surface that separates liquid/fluid/water medium 11 from air/gaseous medium 20, in such a way to have upper half of fronts of acoustic pressure shock waves 10 in air/gaseous medium 20 and their lower half in liquid/fluid/water medium 11. Acoustic pressure shock wave devices 34 receive energy from acoustic pressure shock wave generator 63 to produce acoustic pressure shock waves 10 via high voltage discharge in between electrodes 59 and inside clean liquid/fluid/water propagation medium 58, encompassed by the membrane 57 and acoustic pressure shock wave reflector 92. The role of acoustic pressure shock wave reflector 92 is to focus acoustic pressure shock waves along the interface/surface that separates liquid/fluid/water medium 11 from air/gaseous medium 20. Acoustic pressure shock wave devices 34 are kept in place and in sealed contact with horizontal separation tank 90 by connecting and sealing assembly 62. Mixture of liquid/fluid/water and foam 98 is introduced inside horizontal separation tank 90 via mixture of liquid/fluid/water and foam inlet 91. Due to the difference of acoustic speed in between liquids/fluids/water medium 11 and air/gaseous medium 20, acoustic pressure shock waves 10 move faster in liquids/fluids/water medium 11 than in air/gaseous medium 20, which creates an acoustic streaming in water from the left to the right, thus leaving behind foam or foamy sludge 95 that is slowly and steady pushed towards foam or foamy sludge slot/outlet 96 into foam or foamy sludge storage reservoir 97. Through this process, mixture of liquid/fluid/water and foam 98 is steadily cleaned of foam and foamy sludge 95 resulting in accumulation at the bottom of horizontal separation tank 90 of decontaminated liquid/fluid/water 48, collected via decontaminated liquid/fluid/water outlet 93 and stored for further cleaning/filtration in decontaminated liquid/fluid/water storage reservoir 94.

It is interesting to note that by using a horizontal set-up of acoustic pressure shock wave devices 34, similar to the one presented in FIG. 9, the cleaning of sludge 37 accumulated at the top of gas flotation parallelepipedic tank 65 (from FIG. 6 or FIG. 7) or at the top of gas flotation cylindrical tank 80 (from FIG. 8) can be accomplished without the use of moving scrapers 69 (from FIG. 6 or FIG. 7) or rotational half bridge scrapers 84 (from FIG. 8). The employment of acoustic pressure shock waves 10 to push sludge 37, accumulated during the gas floataton process, eliminates any moving mechanical means/parts, which can increase the system reliability (the absence of moving parts reduces the possibility of malfunctions).

Acoustic pressure shock wave technology can help with the miscibility of water and oil, which can improve oil mobility during exploitation without addition of gas, solvents or polymers to water, as presented in U.S. Pat. No. 9,057,232. This has significant implications in elimination or percentage reduction of additives/pollutants from fracking/wastewater, which can reduce the fracking process' environmental impact.

Based on the acoustic pressure shock wave technology effect on miscibility of water with oil, specialized ellipsoidal acoustic shock wave tanks 51 (full ellipsoid), which are presented in embodiments from FIG. 5B and FIG. 5C, can be used to generate significant cavitation around the second focal point $F_2$ that can act at molecular level and produce emulsification of oil with water at room temperature without the need to heat up oil at low temperatures. The traditional methods of fuel production from oil are based on heating oil up to 67-70° C., which requires significant electric power inputs. Using cavitation produced by acoustic pressure shock wave technology in specialized ellipsoidal acoustic shock wave tanks 51, a significant power saving can be accomplished. Regardless of direction of acoustic pressure shock waves 10 (upward, as seen in FIG. 5B and FIG. 5C, or downward, which can be accomplished if specialized ellipsoidal acoustic shock wave tanks 51 are rotated 180°) for an easier starting of miscibility process, a small quantity of gas/air (for easier/jump start cavitation) might be present inside specialized ellipsoidal acoustic shock wave tanks 51. Cavitational treatment of liquid hydrocarbon such as crude oil, fuel oil, bitumen will reduce their viscosity and increase the yield of light fraction extractable via subsequent atmospheric and/or vacuum distillation.

Heavy crude oils can also benefit from acoustic pressure shock waves 10 cavitational action in specialized ellipsoidal acoustic shock wave tanks 51 (as presented in FIG. 5B and FIG. 5C). Practically, acoustic pressure shock waves 10 are employed in emulsification process/mixing of water with heavy oils/tars in order to drop their viscosity, for an easy transportation through hydrocarbon pipe network (similar to the light oil) and significantly reduce transportation costs when compared to trucks hauling. For this process, cavitation produced by the tensile phase of acoustic pressure shock waves 10 plays the most important role. In order to create more cavitation, injected gas (nitrogen, carbon dioxide, air, etc.) can be used into the cavitation region of acoustic pressure shock waves 10, to act as cavitational seeds and to increase the very small suspended gas droplets that have high specific surface area, which facilitates efficient emulsification of water with heavy oils/tars.

Furthermore, using cavitational bubble generated by acoustic pressure shock waves 10 and heavily produced around the second focal point $F_2$ of specialized ellipsoidal acoustic shock wave tanks 51 (see FIG. 5B and FIG. 5C) the following can be accomplished: neutralization of free fatty acids, acceleration of oxidative desulfurization, oil degumming and de-polymerization of fuel used by heavy trucks (resulting in smoother engine operation, increased fuel economy and reduced emission of ash and soot).

Any of embodiments presented in FIG. 3, FIG. 4, FIG. 5A, FIG. 5B, FIG. 5C, FIG. 6, FIG. 7, FIG. 8 and FIG. 9 can be used for contaminated liquid/fluid/water 38 disinfection. In general, the disinfection process is fundamental to remove microorganisms and it can be accomplished by different methods, such as use of ultraviolet (UV), ozone, activated carbon, and chemical substances (chlorine, hypochlorite, chloramines, chlorine dioxide, bromine). Acoustic pressure shock waves 10 generate high pressures and cavitational activity, which can kill microbes/harmful microorganisms that are found in wastewater or processed/produced contaminated liquid/fluid/water 38 (as presented in U.S. Pat. No. 8,685,317). The antimicrobial activity of the acoustic pressure shock waves 10 will reduce contamination/bioburden of wastewater or processed/produced liquid/fluid/water 38, with significant financial and environmental benefits. Acoustic pressure shock waves systems (as those presented in FIG. 3, FIG. 4, FIG. 5A, FIG. 5B, FIG. 5C, FIG. 6, FIG. 7, FIG. 8 and FIG. 9) can be used independently or in combination/synergistically with existing technologies such as chlorination, UV, ozone, activated carbon, etc. to enhance killing of miscellaneous microbes/harmful microorganisms.

In systems similar to those presented in FIG. 3, FIG. 4, FIG. 5B, FIG. 5C, FIG. 6, FIG. 7, FIG. 8 and FIG. 9, due to mechanical and acoustical energy applied by acoustic pressure shock waves 10 to a reagent or active chemical substance in a fluid form, the reagent/chemical substance can easily be activated, which results in fast initiation of different chemical reactions, speed-up of chemical process, generating high conversion rates with higher yields. In chemical industry, besides promotion of chemical reaction of different liquids/fluids, acoustic pressure shock waves 10 can activate heterogeneous phase transfer catalysts for organic synthesis, promote chemical degradation, catalysts reclamation and regeneration can also be achieved.

Water hardness is known as existence of bivalent and trivalent cations, such as calcium ($Ca^{2+}$), magnesium ($Mg^{2+}$), and in lower traces aluminum ($Al^{2+}$, $Al^{3+}$) and iron ($Fe^{2+}$, $Fe^{3+}$). Water hardness causes some problems, such as scale formation in pipes and in cooling towers, reaction with soap and formation of hard foam, decreased heat exchange capacity and membrane clogging. Conventional methods for hardness removal (also known as water softening process) are lime-soda process, ion exchange, electro-coagulation, electro-dialysis, reverse osmosis and nano-filtration. Based on the same principle of initiation and facilitation of different chemical reactions (mentioned above) for water softening process, acoustic pressure shock waves 10 (generated in systems similar to those presented in FIG. 3, FIG. 4, FIG. 5B, FIG. 5C, FIG. 6, FIG. 7, FIG. 8 and FIG. 9) can be used to facilitate minerals to crystallize in water, so that they do not bind to surfaces. This can be achieved in the same time with wastewater or processed/produced contaminated liquid/fluid/water 38 cleaning process, that uses acoustic pressure shock waves 10 to remove suspended particles, sand, dissolved solids, soluble organics, microbial pollutants, dissolved gases, foam, etc., as presented in FIG. 3, FIG. 4, FIG. 5A, FIG. 5B, FIG. 5C, FIG. 6, FIG. 7, FIG. 8 and FIG. 9. Practically, acoustic pressure shock waves 10 can speed-up chemical reactions by removing the cations and soften the water, thus preventing scaling inside tubing/pipes used for circulating liquid/fluids/waters.

Scale is a mineral deposit that can occur in tubing/pipes used for circulating liquid/fluids/waters. Scale deposits occur when solution equilibrium of liquid/fluid/water is disturbed by pressure and temperature changes, dissolved gases or incompatibility between mixing liquids/fluids/waters or by liquid/fluid/water hardening. When liquid/fluid/water is not going through a softening process, as presented above, hard foams and scales are already formed inside pipes and acoustic pressure shock wave technology can be used to break them down through acoustic streaming, microstreaming and cavitational jets, as presented in patent application US 2015/0337630.

Based on the lithotripsy experience (kidney stone fragmentation using acoustic pressure shock wave technology), acoustic pressure shock waves 10 are able to break, disturb and dislodge solid scale sediments, hard foams, biofilms and sludge deposits that are present inside any pipes or tanks used in water management installations. Due to acoustic impedance mismatch between a fluid/liquid/water and a solid, and due to collapse of cavitation bubbles with micro jets that are directed towards a solid/semi-solid surface, fragmentation/dislodging of solid scale sediments, hard foams, biofilms and sludge deposits is accomplished.

Acoustic pressure shock wave devices can also be used in liquid/fluid/water treatment installation to break sludge accumulated at the bottom of treatment tanks during liquid/fluid/water cleaning by placing acoustic pressure shock wave devices 34 very close to the bottom of cylindrical separation tanks 30, parallelepipedic weir tank/separation tanks 40, gas flotation parallelepipedic tanks 65, gas flotation cylindrical tanks 80 presented in FIG. 3, FIG. 4, FIG. 6, FIG. 7 and FIG. 8. The objective is to break sludge 37 into minutia particles, which allows its dispersion, thus increasing enzyme activity/biological degradation and produces less sludge 37 of which to dispose. In conclusion, by varying the vertical position of acoustic pressure shock wave devices 34 inside treatment tanks, either cleaning/decontamination of contaminated liquid/fluid/water 38 can be accomplished (acoustic pressure shock wave devices 34 placed at the liquid/fluid/water surface, or submerged, close to liquid/fluid/water surface of treatment tanks) or dispersion of sludge 37 for easy removal and degradation can be done (acoustic pressure shock wave devices 34 placed close to the bottom of treatment tanks).

After sludge 37 is produced and evacuated from various treatment tanks (as presented in FIG. 3, FIG. 4, FIG. 5A, FIG. 5B, FIG. 5C, FIG. 6, FIG. 7, FIG. 8 and FIG. 9), it can undergo an activation process (for further cleaning) and, finally, a dewatering process to reduce its mass (disposal of sludge is based on its weight, so the lower the mass/weight of sludge 37, the lower its disposal cost is achieved).

The sludge activation process is in general used for treating wastewater or contaminated liquid/fluid/water 38 or watery sludge 37 evacuated from liquid/fluid/water cleaning process. With help of air and a biological floc composed of bacteria and protozoa that feeds on organic contaminants, activated sludge process is producing a high-quality effluent. The process involves air or oxygen being introduced into a mixture of screened and primary treated wastewater or industrial contaminated liquid/fluid/water 38 or watery sludge 37, combined with organisms that grow and form particles clumping together to develop a biological floc, which reduces the organic content of wastewater or contaminated liquid/fluid/water 38 or watery sludge 37. This mixture is stirred and injected with large quantities of air inside aeration tank or aerated basin system 100 (see FIG. 10), to provide oxygen and keep solids in suspension. In all activated sludge plants, once wastewater or contaminated liquid/fluid/water 38 or watery sludge 37 has received sufficient activation treatment, excess mixed liquor (combination of wastewater or liquid/fluid/water and biological mass) is discharged into settling tanks. In settling tanks, biological floc is allowed to settle to the bottom of the tank, leaving a relatively clear liquid free of organic material and suspended solids (high-quality effluent). The bacteria settle at the bottom of settling tanks, and partially cleaned water flows on for further treatment. The resulting settled solids are pumped back to aeration tank or aerated basin system 100 to begin the process again by mixing with new incoming wastewater or contaminated liquid/fluid/water 38 or watery sludge 37.

In some areas, where more land is available, wastewater or contaminated liquid/fluid/water 38 or watery sludge 37 is treated in large surface-round aeration tanks or aerated basins 100 (see FIG. 10) using motor-driven floating aerators, which provide the mixing required for dispersing the air (actual aeration) and for contacting the reactants (that is, oxygen, wastewater and microbes). Surface-aerated basins achieve 80 to 90% removal of biological material with retention times of 1 to 10 days and may range in depth from 1.5 to 5.0 meters. Biological oxidation processes are sensitive to temperature and, between 0° C. and 40° C., the rate of biological reactions increase with temperature. Most surface-aerated basins operate in between 4° C. and 32° C. Typically, the floating surface aerators are rated to deliver sufficient amount of air to produce sludge 37 activation. However, they do not provide as good mixing, thus they have a low productivity.

Figure 10:
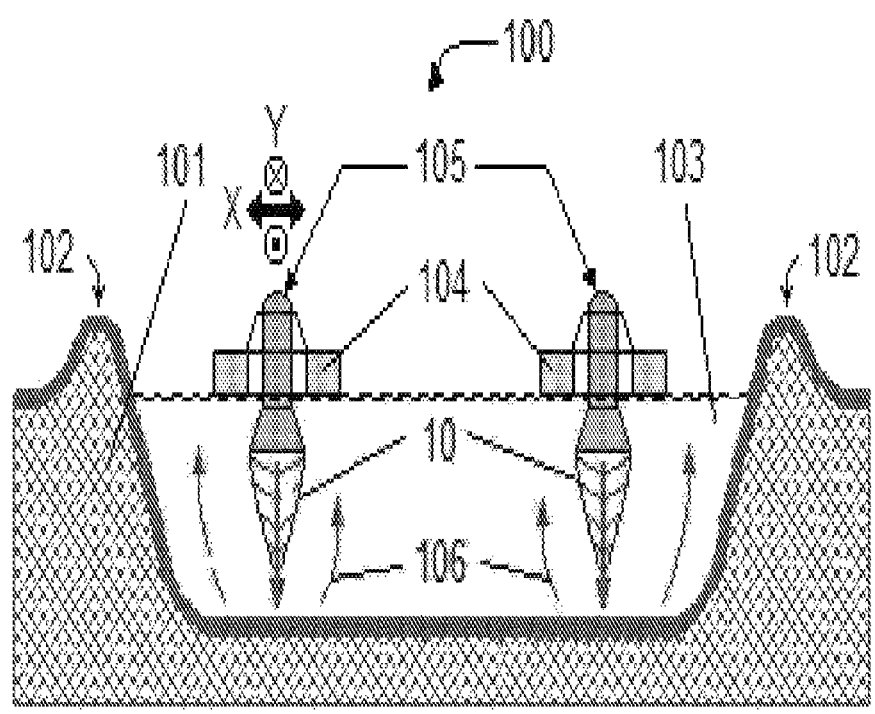
FIG. 10 is a schematic representation illustrating the use of acoustic pressure shock wave devices to activate sludge, according to one embodiment of the present invention.

In order to increase the efficiency of aeration tanks or aerated basin systems 100 (see FIG. 10), acoustic pressure shock wave activation devices 105 can be used. The performance of acoustic pressure shock waves 10 for mixing and aeration of aeration tanks or aerated basin systems 100 is far superior to the aerators, due to high pressure gradients generated by acoustic pressure shock waves 10 and presence of cavitation produced by the tensile phase of acoustic pressure shock waves 10. The most economical surface aeration tanks or aerated basin systems 100 are made in the ground 101. In order to prevent wastewater or contaminated liquid/fluid/water 38 or watery sludge 37 (also called mixed liquor 103) to exit aeration tanks or aerated basin systems 100 during sludge activation, berms 102 are created all around these aeration tanks or aerated basin systems 100. The acoustic pressure shock wave activation devices 105 are mounted on ring floats 104, and allow floating of acoustic pressure shock wave activation devices 105 on top of mixed liquor 103. The ring floats 104 also assures that acoustic pressure shock wave activation devices 105 produce acoustic pressure shock waves 10 very close to mixed liquor 103 surface, thus draws air towards the bottom of aeration tanks or aerated basin systems 100 during acoustic streaming, besides producing sludge mixing/activation 106. Acoustic pressure shock wave activation devices 105 can move manually or automatically (via small driving motors controlled by microprocessors—not shown in FIG. 10) on the surface of mixed liquor 103 in X (arrow) and Y (movement perpendicular to the plane of view) directions, in order to cover the whole area of aeration tanks or aerated basin systems 100, as seen in FIG. 10. Of course, one or two or more acoustic pressure shock wave activation devices 105 can be used for increased efficiency. The embodiment from FIG. 10 shows only acoustic pressure shock wave activation devices 105 at work. However, in some situation a combination of aerators with acoustic pressure shock wave activation devices 105 can be used (not shown in FIG. 10) for uniform activation across aeration tanks or aerated basin systems 100 and for further improvement in efficiency of sludge activation.

When coagulants and flocculants are used to separate suspended particles from wastewater or processed/produced contaminated liquid/fluid/water 38, an important amount of sludge 37 is created (as presented in FIG. 3, FIG. 4, FIG. 5A, FIG. 5B, FIG. 5C, FIG. 6, FIG. 7, FIG. 8 and FIG. 9), which needs to be reduced in volume (dewatering) and compacted for disposal. Dewatering of residuals is the physical process of removing the liquid/fluid/water content of sludge 37, to reduce its volume and convert it from a liquid to a solid product through a variety of different pumping or filtering processes. Sludge 37 dewatering is used to reduce the cost associated with transporting the waste residuals to a disposal site and the actual space taken in a landfill, simply due to less volume. Dewatered residuals are also easier to handle and the dewatering process not only affects the volume, but also the nutrient and odor levels of the material.

Figure 11:
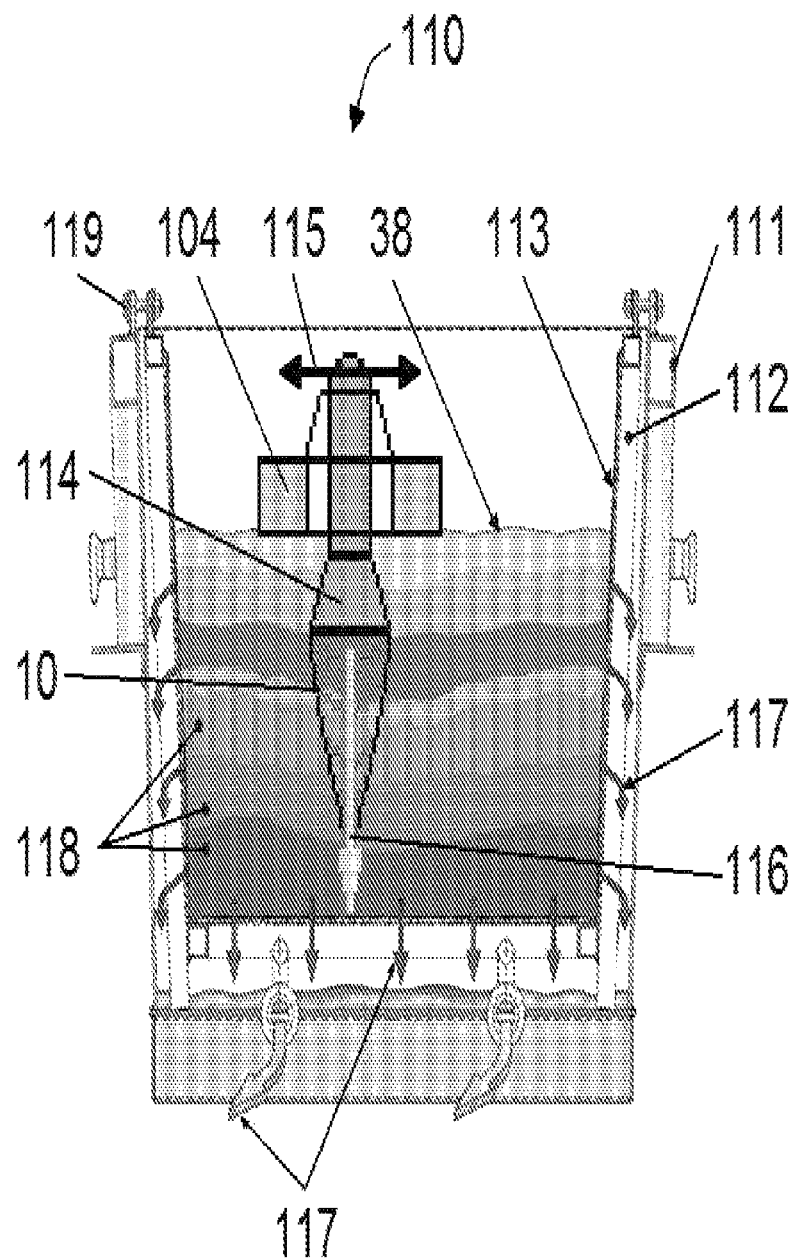
FIG. 11 is a schematic representation illustrating the use of acoustic pressure shock wave devices to produce sludge dewatering, according to one embodiment of the present invention.

FIG. 11 is presenting an embodiment that uses acoustic pressure shock waves 10 in a sludge dewatering tank 110. Sludge dewatering tank 110 comprises of a tank body 111 inside of which a filter basket 112 is installed using suspension system 119. The inside of filter basket 112 is lined on the interior with a cloth filter 113 and then the solid matter that needs dewatering is filling two thirds of filter basket 112. The design of suspension system 119 creates a gap in between filter basket 112 and tank body 111, which allows the product of dewatering, called filtrate flow 117, to freely flow through cloth filter 113 and all around filter basket 112.

Naturally, when solid matter that needs dewatering is dumped inside filter basket 112, a sedimentation starts to occur and liquid/fluid/water accumulates to the top of sludge dewatering tank 110, and sludge sediment 118 settles towards the bottom of filter basket 112. In the mean time, filtrate flow 117 passes through cloth filter 113 and slowly drips from the top accumulation of liquid/fluid/water, and it is flowing towards the bottom of sludge dewatering tank 110 from where it is collected for further cleaning or filtration.

Using as driving forces only the gravitational force and the weight of sludge sediment 118 it makes slow this dewatering process. The separation of liquid/fluid/water from solid matter that needs dewatering can be expedited in a very efficient way using acoustic pressure shock wave dewatering devices 114 that produce acoustic pressure shock waves 10. Due to the difference in propagation speed in between liquid/fluid/water (300 m/s) and solids (1500 m/s) of acoustic pressure shock waves 10, shear forces are produced, that allows liquid/fluid/water to be "squeezed" more efficiently from solid matter using high compressive pressures and acoustic cavitation generated by acoustic pressure shock waves 10. Due to the downward action of acoustic pressure shock waves 10, a downward liquid/fluid/water/filtrate flow 116 is created, which expedites dewatering process. Practically, the gravitational force and the weight of sludge sediment are supplemented by compressive forces of acoustic pressure shock waves 10. Furthermore, the shear forces produced by the difference in propagation speed of acoustic pressure shock waves 10 in liquid/fluid/water (300 m/s) and solids (1500 m/s) creates small vertical crevices inside sludge sediment 118, allowing more consistent filtrate flow 117 towards the bottom of filter basket 112. It means that, when acoustic pressure shock wave dewatering devices 114 are used most of the flow during dewatering process, action/flow is from top to bottom (vertically) and not laterally as it happens when natural sedimentation time is used in the dewatering systems and most of the liquid/fluid/water/filtrate accumulate at the top of sludge dewatering tank 110.

The ring floats 104 are used to position acoustic pressure shock wave dewatering devices 114 at the surface of solid matter that needs dewatering, and also perform dewatering device movement 115 that can be done manually or automatically via small driving motors controlled by microprocessors—not shown in FIG. 11. Dewatering device movement 115 is necessary to deliver uniformly acoustic pressure shock waves 10 to the entire volume of the solid matter that needs dewatering. Finally, one or two or more of acoustic pressure shock wave dewatering devices 114 can be used, based on the dimensions of sludge dewatering tank 110 and the desired efficiency/dewatering speed.

To improve the solid content of waste sludge 37, inorganic (lime and ferric salt) or organic (polymers) conditioners can be used. Another way to produce conditioning of sludge 37 is the freeze/thaw treatment, enhancing dewatering characteristics without use of polymers, fact that has environmental benefits. Direct, indirect and natural freeze/thaw conditioning is able to transform bond water into free water that can easily and more efficiently be removed by a mechanical method, as application of acoustic pressure shock waves 10. In a direct freezing process refrigerant is mixed directly with waste sludge 37, less recommended due to possibility of a contamination. For indirect freezing process, refrigerant is delivered through pipes inside waste sludge 37 providing separation from waste sludge, and freezing process is done by a heat transfer in between pipes and sludge 37. Indirect freezing requires some specialized equipment and pipe system and is the most expensive. Natural freezing is the most economic, but is highly dependent on weather conditions. In general, one freezing cycle is enough to obtain good results on sludge 37, performing more cycles is not viable. The material thawing should be performed over a permeable media (like a sieve or a compost bed) or in a sludge dewatering tank 110, as presented in FIG. 11, in order to let all filtrate flow 117 to move away without being retained in the solidified sludge. Acoustic pressure shock waves 10, delivered by acoustic pressure shock wave dewatering devices 114, can be used to push water in a certain zone of sludge sediment 118, which allows the dewatering using freezing process to be more efficient. Due to the difference in propagation speed in between liquid/fluid/water (300 m/s) and solids (1500 m/s) of acoustic pressure shock waves 10, shear forces are produced that allow free liquid/fluid/water (produced by freeze/thaw conditioning) to be "squeezed" more efficiently from solid matter using high compressive pressures and acoustic cavitation generated by acoustic pressure shock waves 10.

Oily sludges 37 are frequently generated in oil production or processing sites and cleaning systems, as those presented in FIG. 3, FIG. 4, FIG. 5A, FIG. 5B, FIG. 5C, FIG. 6, FIG. 7, FIG. 8 and FIG. 9, and contain different concentrations of waste oil (40%-60%), wastewater (30%-90%) and mineral particles (5%-40%). The water is present in a high percentage in oil droplets absorbed onto solid particles, thus creating a protective layer in presence of surfactants forms emulsions, which creates difficulties in waste treatment processes and subsequently in dewatering process. Demulsification treatments are necessary in order to reduce water from sludge 37, reduce its volume, save resources and prevent environmental pollution. Conventional demulsification techniques include electrical, chemical, thermal, and mechanical methods. Acoustic pressure shock waves 10 can be used to separate oil from wastewater (due to their unidirectional acoustic streaming) in systems similar to those presented in FIG. 5A, FIG. 5B or FIG. 5C. For these systems from FIG. 5A, FIG. 5B, FIG. 5C, the feed of oily sludge 37 should be done at the lower part of specialized ellipsoidal acoustic shock wave tanks 51 and unidirectional acoustic streaming generated by acoustic pressure shock waves 10 should be in an upward direction, to produce demulsification of oily sludge and then naturally accumulate demulsified oil above the water at the top of specialized ellipsoidal acoustic shock wave tanks 51. Pipes at the top of specialized ellipsoidal acoustic shock wave tanks 51 could then collect the oil. Also, systems similar to those presented in FIG. 6 can be adapted to push oil from the top of specialized ellipsoidal acoustic shock wave tanks 51 outside of these tanks for further processing. The water extraction pipes should be placed above the medium section of specialized ellipsoidal acoustic shock wave tanks 51 and lower than those used for oil collection.

The freeze/thaw technique can be also used in the oily sludge treatment and starting with lower oil content leads to better results. Direct, indirect and natural freeze processes can be applied in a direct freezing process (where refrigerant is mixed directly with brine, less used due to possibility of a contamination) or in an indirect process (where refrigerant is separated from brine by a heat transfer surface). $CO_2$ has specific benefits in use as refrigerant due to it is limitless availability in our atmosphere and for the fact that it has no ozone depletion potential with insignificant global warming potential (at least in the small amounts used for the refrigeration process). Furthermore, $CO_2$ is a cheap, non poisonous and a non flammable refrigerant. The acoustic pressure shock waves 10 can be used in the case of freeze/thaw technique due to very fast separation of ice (frozen water) from icy sludge (produced by acoustic streaming generated by acoustic pressure shock waves 10), which can significantly speed-up the demulsification of oily sludge 37. Systems as those presented in FIG. 5A, FIG. 5B, FIG. 5C can be used, where the feed of oily sludge 37 should be done at the lower part of specialized ellipsoidal acoustic shock wave tanks 51. These specialized tanks can have incorporated in their walls the refrigeration system (cavities/spaces where refrigerant can be circulated to produce freezing—not specifically showed in FIG. 5B and FIG. 5C). The freezing process can be controlled by specialized system (installed indoors inside dedicated stationary facilities where specialized ellipsoidal acoustic shock wave tanks 51 are mounted too) or by pumps module 53 and control and data panel 54 for mobile systems as those presented in FIG. 5A. Due to the fact that water turns into ice at 32° F./0° C. and crude oil is not (it gets thicker, but it is not actually freezing), after the freezing process, the unidirectional acoustic streaming generated by acoustic pressure shock waves 10 should be applied in an upward direction, to produce the separation of ice (frozen water) from icy oil sludge/slush. The icy/frozen water will accumulate above icy oil sludge/slush at the top of specialized ellipsoidal acoustic shock wave tanks 51. The icy/frozen water can then be extracted using pipes at the top of specialized ellipsoidal acoustic shock wave tanks 51 using vacuum and the accumulation of oil can be extracted with pipes placed above the medium section of specialized ellipsoidal acoustic shock wave tanks 51 and lower than those used for icy/frozen water collection. In another embodiment, the specialized ellipsoidal acoustic shock wave tanks 51 can have in their upper part heating modalities (not specifically showed in FIG. 5B and FIG. 5C), which melt both icy/frozen water (extracted from the oil) and icy oil sludge/slush. In this case, the oil will move above the water, which will dictate the way collection pipes are positioned (the oil pipe will be above the water pipe). Finally, systems similar to those presented in FIG. 6 can also be adapted to push the top floating substances from the top of specialized ellipsoidal acoustic shock wave tanks 51 outside of these tanks for further processing.

Figure 12:
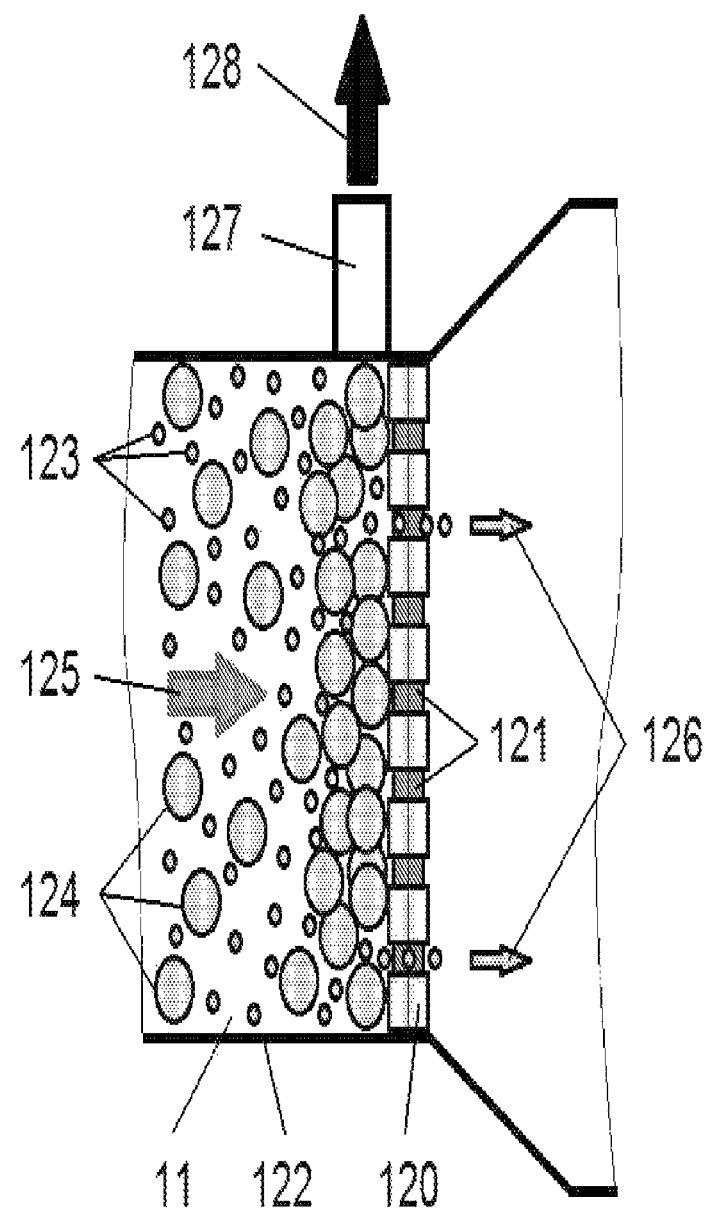
FIG. 12 is a schematic representation illustrating clogging of a filtration porous membrane/filter when liquid/fluid/water flow is perpendicular to membrane/filter.

Porous membrane/filter technologies are now widely accepted as suitable for separation solids from liquids/fluids/waters, due to their high removal capacity and ability to meet multiple liquid/fluid/water quality objectives. As presented in FIG. 12, during their use filtration porous membranes/filters 120 have some operation problems, such as fouling and concentration polarization of dissolved/soluble or nonsoluble particles 124. Fouling degrades performance of filtration porous membrane/filter 120, due to blocking/clogging of membrane/filter pores 121. The cost of fouling in a filtration porous membrane/filter 120 application includes the costs for filtration porous membrane/filter 120, cleaning itself, labor costs, down-time during cleaning costs, pretreatment costs (including biocides and other additives), an increased energy demand due to higher trans-membrane/filter and tangential hydrodynamic resistance, and shortened lifetime of filtration porous membranes/filters 120. In FIG. 12 a filtration porous membrane/filter 120 is installed inside of a filtration pipe/conduit 122 for cleaning of liquid/fluid/water medium 11 from dissolved/soluble or nonsoluble particles 124. In time, liquid/fluid/water frontal flow 125 produces accumulations of dissolved/soluble or nonsoluble particles 124 at the surface of filtration porous membrane/filter 120. This is happening because membrane/filter pores 121 are designed to have a dimension that only let liquid/fluid/water particles 123 to pass through filtration porous membrane/filter 120. Initially, due to clogging and later on fouling of filtration porous membrane/filter 120, liquid/fluid/water flow after membrane/filter 126 gradually reduces until becomes inexistent. During the gradual clogging/fouling of filtration porous membrane/filter 120, some of dissolved/soluble or nonsoluble particles 124 may be pushed laterally towards lateral evacuation pipe 127. Lateral exit for dissolved/soluble particles 128 may alleviate the clogging and fouling of filtration porous membrane/filter 120, but cannot completely eliminate the clogging/fouling and also reduces the filtration system efficiency, due to the fact that it provides an exit for liquid/fluid/water medium 11 without passing through the clogged/fouled filtration porous membrane/filter 120.

Figure 13A:
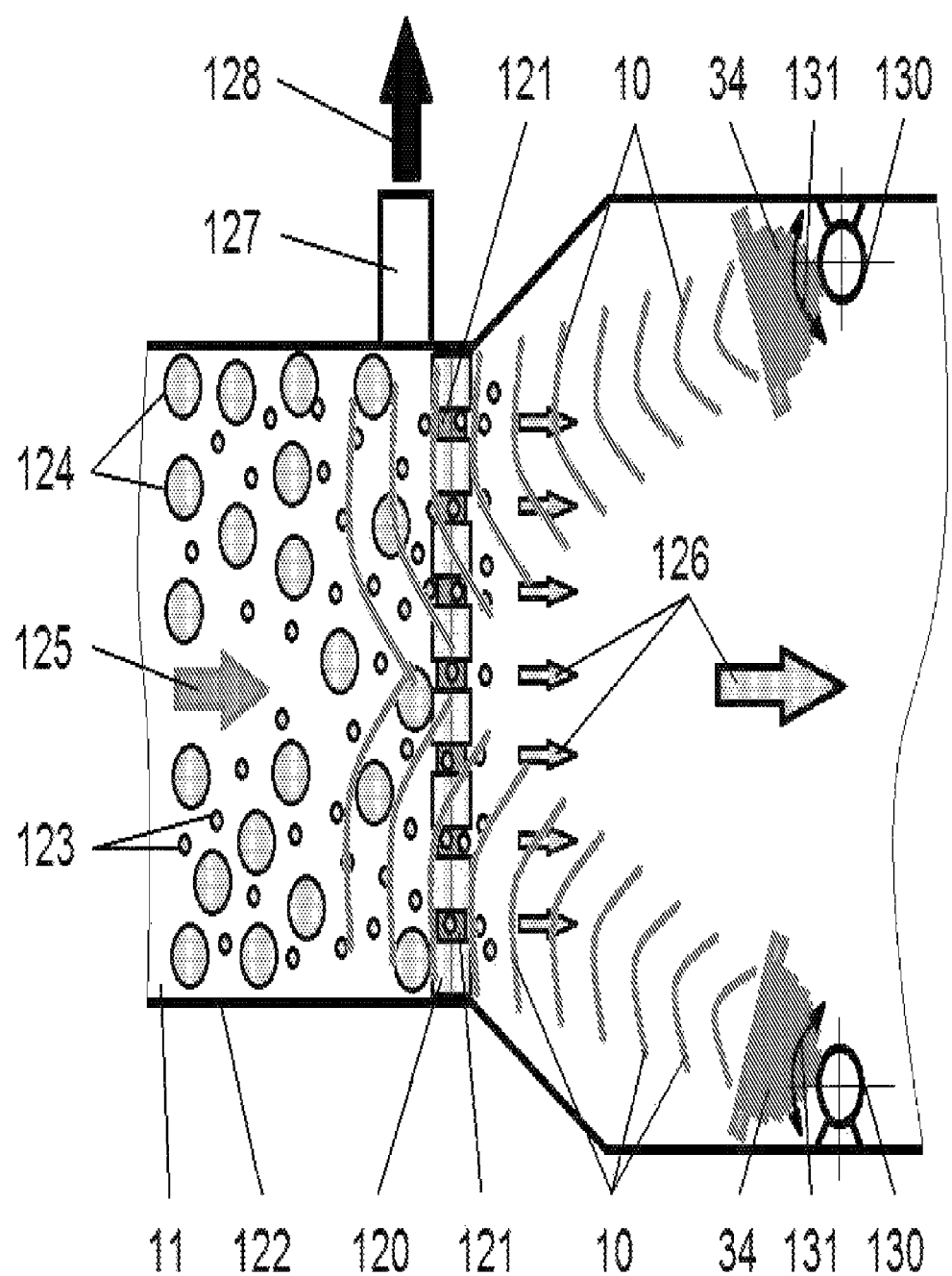
FIG. 13A is a schematic representation illustrating the use of acoustic pressure shock wave devices for declogging of a filtration porous membrane/filter when the liquid/fluid/water flow is perpendicular to the membrane/filter and acoustic pressure shock wave devices are placed after/behind the membrane/filter, according to one embodiment of the present invention.

The fouling problem of filtration porous membranes/filters 120 can be prevented or reduced by using advanced strategies such as acoustic pressure shock waves 10 (see FIG. 13A and FIG. 13B), to increase the life of filtration porous membrane/filter 120 and reduce/eliminate chemicals used to prevent fouling. The embodiment from FIG. 13A shows a cleaning system that is using acoustic pressure shock waves 10 produced by acoustic pressure shock wave devices 34 for declogging of a filtration porous membrane/filter 120 when liquid/fluid/water flows perpendicular to filtration porous membrane/filter 120 and acoustic pressure shock waves devices 34 are placed after/behind filtration porous membrane/filter 120. Practically, acoustic pressure shock waves 10, using acoustic streaming, can push clogging/fouling particles (dissolved/soluble or nonsoluble particles 124) in preferred directions in an online operation (can be used during filtration time), without any secondary pollutants, transportation, handling problems or installation shut down (eliminates the installation down-time necessary for manual or chemical cleaning process). The positioning of acoustic pressure shock wave devices 34 after/behind filtration porous membrane/filter 120 allows acoustic pressure shock waves 10 to push dissolved/soluble through membrane/filter pores 121 or nonsoluble particles 124 push away from filtration porous membrane/filter 120, thus allowing liquid/fluid/water particles 123 to easier pass through filtration porous membrane/filter 120, which translates in a larger liquid/fluid/water flow after membrane/filter 126. Furthermore, acoustic pressure shock waves 10 action, which is against/opposite to direction of liquid/fluid/water frontal flow 125 produces a stirring of dissolved/soluble or nonsoluble particles 124 in front of filtration porous membrane/filter 120, that can push dissolved/soluble or nonsoluble particles 124 towards lateral evacuation pipe 127. The lateral exit for dissolved/soluble particles 128, combined with acoustic pressure shock waves 10 actions, may efficiently prevent clogging and fouling of filtration porous membrane/filter 120.

For the filtration system presented in FIG. 13A, acoustic pressure shock wave devices 34 are placed on pivot 130, which allows them to continuously have a motorized pivoting movement 131 during their service, so that acoustic pressure shock wave devices 34 can send acoustic pressure shock waves 10 on an angle range of different directions, which allows a larger area cleaning on filtration porous membrane/filter 120. In this way, the cleaning efficiency is increased and also a minimal number of acoustic pressure shock wave devices 34 can be used in comparison to stationary designs. The motorized pivoting movement 131 can be automatically controlled by a software controller/microprocessor (for simplicity and clarity, not specifically shown in FIG. 13A) that can have different setting regimens based on the value of flow inside filtration pipe/conduit 122 or the contamination level from liquid/fluid/water medium 11 or the value of membrane/filter pores 121. For stationary systems (not having continuously moving parts creates more reliability in time), before the system is started, pivot 130 can be used to manually adjust for an optimal angle position of acoustic pressure shock wave devices 34 based on the necessity of each specific cleaning cycle.

Figure 13B:
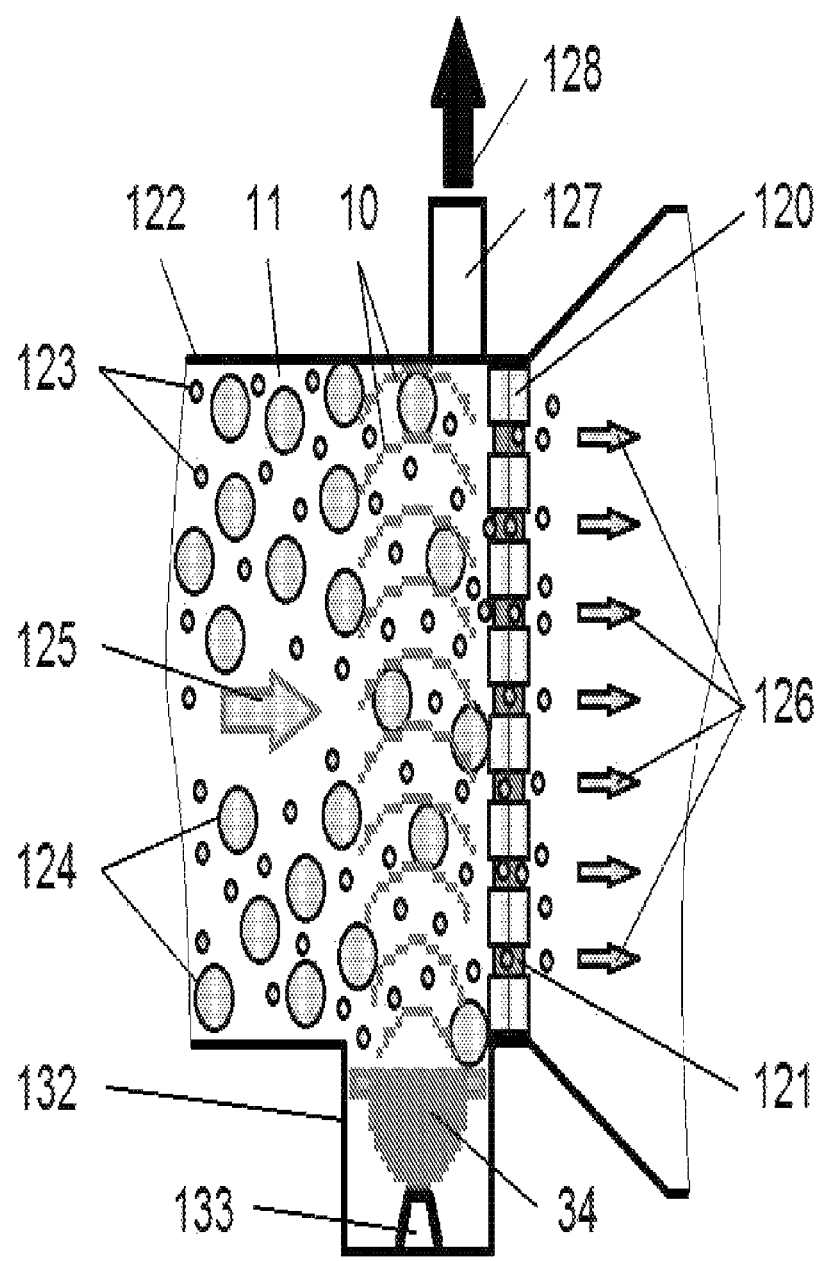
FIG. 13B is a schematic representation illustrating use of acoustic pressure shock wave devices for declogging of a filtration porous membrane/filter when liquid/fluid/water flow is perpendicular to membrane/filter and acoustic pressure shock wave devices are placed parallel to membrane/filter surface, according to one embodiment of the present invention.

FIG. 13B shows an embodiment of this invention illustrating use of acoustic pressure shock wave devices 34 for declogging and removal of fouling from a filtration porous membrane/filter 120 when liquid/fluid/water flows perpendicular to filtration porous membrane/filter 120 and acoustic pressure shock waves 10 are delivered parallel/tangential to filtration porous membrane/filter 120. Positioning of acoustic pressure shock wave devices 34 parallel/tangential relatively to filtration porous membrane/filter 120 allows acoustic pressure shock waves 10 to push dissolved/soluble or nonsoluble particles 124 away from filtration porous membrane/filter 120 and towards lateral evacuation pipe 127. In order to keep as much as possible the active surface of filtration porous membrane/filter 120, acoustic pressure shock wave device 34 sits on support 133, inside dedicated space for acoustic pressure shock wave device 132, built laterally/on the side of filtration pipe/conduit 122. Acoustic pressure shock waves 10, acting parallel/tangential to filtration porous membrane/filter surface 120, allow liquid/fluid/water particles 123 to easier pass through filtration porous membrane/filter 120, which translates in a larger liquid/fluid/water flow after membrane/filter 126. Furthermore, acoustic pressure shock waves 10 action, perpendicular to direction of liquid/fluid/water frontal flow 125, may produce a circular movement/stirring of dissolved/soluble or nonsoluble particles 124 in front of filtration porous membrane/filter 120 that can even more keep away dissolved/soluble or nonsoluble particles 124 from membrane/filter pores 121 and pushes them towards lateral evacuation pipe 127. Lateral exit for dissolved/soluble particles 128 may efficiently prevent clogging and fouling of filtration porous membrane/filter 120. However, attention must be paid to the intensity of acoustic pressure shock waves 10 in such way to not disrupt the actual filtration process (to not produce a significant disturbance of liquid/fluid/water frontal flow 125).

Figure 14:
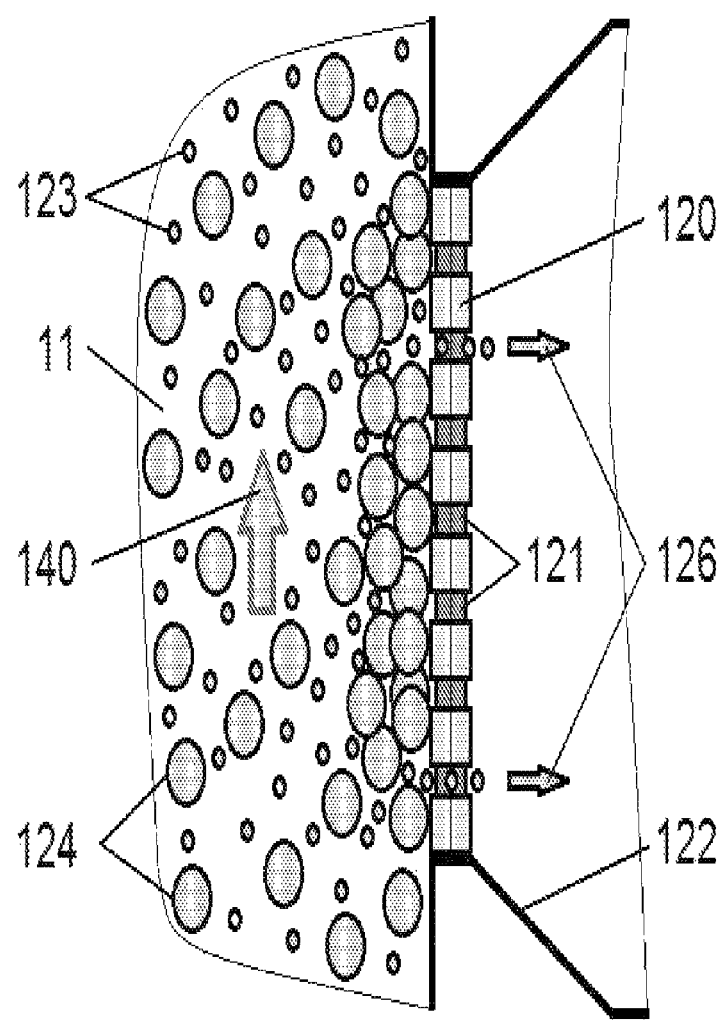
FIG. 14 is a schematic representation illustrating clogging of a filtration porous membrane/filter when liquid/fluid/water flow is parallel to membrane/filter.

The filtration system from FIG. 14 has a liquid/fluid/water tangential flow, relative to membrane/filter 140, and filtration porous membrane/filter 120 is installed on the side of a filtration pipe/conduit 122 and not perpendicular to the flow, as was presented in FIG. 12, FIG. 13A and FIG. 13B. The cleaning of liquid/fluid/water medium 11 from dissolved/soluble or nonsoluble particles 124 is accomplished by a lateral flow of liquid/fluid/water particles 123 through filtration porous membrane/filter 120. In time, an accumulation of dissolved/soluble or nonsoluble particles 124 at the surface of filtration porous membrane/filter 120 can occur, which is producing clogging/fouling of filtration porous membrane/filter 120. This is happening because membrane/filter pores 121 are designed to have a dimension that let to pass only liquid/fluid/water particles 123 through filtration porous membrane/filter 120. Initially, due to clogging and, later on, fouling of filtration porous membrane/filter 120, liquid/fluid/water flow after membrane/filter 126 reduces gradually, until it becomes inexistent.

Figure 15A:
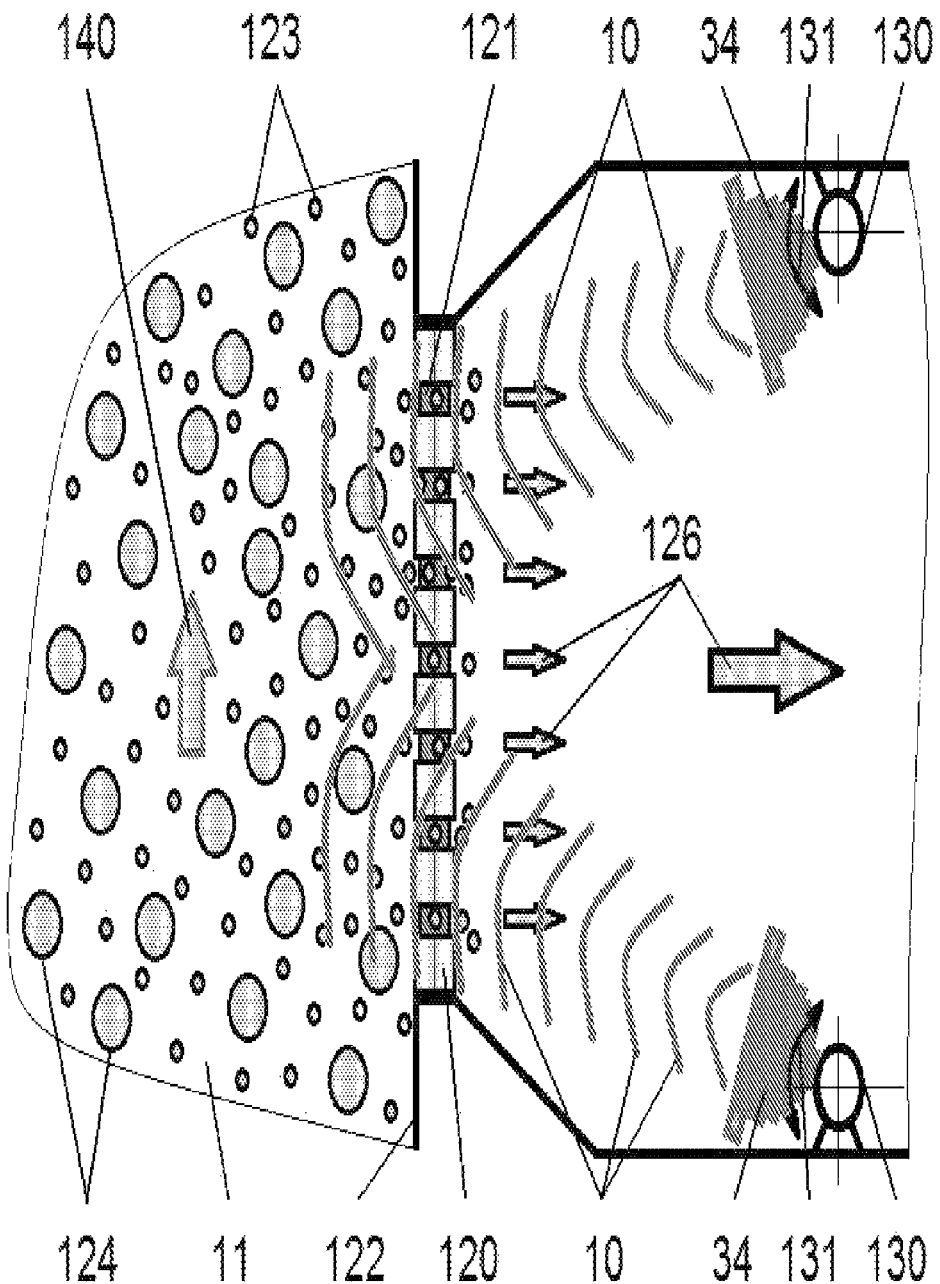
FIG. 15A is a schematic representation illustrating use of acoustic pressure shock wave devices for declogging of a filtration porous membrane/filter when liquid/fluid/water flow is parallel to membrane/filter and acoustic pressure shock wave devices are placed after/behind membrane/filter, according to one embodiment of the present invention.

To address the fouling issue of filtration porous membranes/filters 120 from FIG. 14, a cleaning system that is using acoustic pressure shock waves 10 produced by acoustic pressure shock wave devices 34 can be used for declogging of a filtration porous membrane/filter 120 when liquid/fluid/water tangential flow 140 is parallel/tangential to filtration porous membrane/filter 120 and acoustic pressure shock waves devices 34 are placed after/behind filtration porous membrane/filter 120 (see FIG. 15A). Practically, acoustic pressure shock waves 10, using acoustic streaming, can push the clogging/fouling particles (dissolved/soluble or nonsoluble particles 124) in preferred directions in an online operation. The positioning of acoustic pressure shock wave devices 34 after/behind filtration porous membrane/filter 120 allows acoustic pressure shock waves 10 to push away through membrane/filter pores 121 the dissolved/soluble or nonsoluble particles 124 from filtration porous membrane/filter 120, thus allowing liquid/fluid/water particles 123 to pass easier through filtration porous membrane/filter 120, which translates in a larger liquid/fluid/water flow after membrane/filter 126. Furthermore, acoustic pressure shock waves 10 action is dislodging dissolved/soluble or nonsoluble particles 124 from filtration porous membrane/filter 120 and liquid/fluid/water tangential flow 140 also has the tendency to move dissolved/soluble or nonsoluble particles 124 away from filtration porous membrane/filter 120, which efficiently prevent clogging and fouling of filtration porous membrane/filter 120.

For the filtration system presented in FIG. 15A (similar to the one presented in FIG. 13A), acoustic pressure shock wave devices 34 are placed on pivot 130, which allows them to continuously have a motorized pivoting movement 131 during their service, and in this way acoustic pressure shock wave devices 34 can send acoustic pressure shock waves 10 on an angle range of different directions, which allows the cleaning of a larger area on filtration porous membrane/filter 120. In this way, the cleaning efficiency is increased and also a minimal number of acoustic pressure shock wave devices 34 can be used, in comparison to stationary designs. Motorized pivoting movement 131 can be automatically controlled by a software controller/microprocessor (for simplicity and clarity, not specifically shown in FIG. 15A) that can have different setting regimens, based on the value of liquid/fluid/water tangential flow 140 inside filtration pipe/conduit 122 or the contamination level from liquid/fluid/water medium 11 or value of membrane/filter pores 121. For stationary systems (not having continuously moving parts creates more reliability in time), before the system is started, pivot 130 can be used to manually adjust for an optimal angle position of acoustic pressure shock wave devices 34 based on the necessity of each specific cleaning cycle.

FIG. 15B shows an embodiment of this invention illustrating use of acoustic pressure shock wave devices 34 for declogging and removal of fouling from a filtration porous membrane/filter 120 when liquid/fluid/water tangential flow 140 is parallel/tangential to filtration porous membrane/filter 120, and acoustic pressure shock waves 10 are delivered parallel/tangential to filtration porous membrane/filter 120 surface and in the same direction as liquid/fluid/water tangential flow 140. Conversely, acoustic pressure shock wave devices 34 can be placed relatively to filtration porous membrane/filter 120 in such way to deliver acoustic pressure shock waves 10 against liquid/fluid/water tangential flow 140 (not depicted in a separate figure). By having acoustic pressure shock waves 10 going in an opposite direction from liquid/fluid/water tangential flow 140, a stirring of dissolved/soluble or nonsoluble particles 124 is produced in front of filtration porous membrane/filter 120, which can also help with fouling matter declogging/cleaning from the surface of filtration porous membrane/filter 120. In conclusion, the parallel/tangential positioning of acoustic pressure shock wave devices 34 relatively to filtration porous membrane/filter 120 (using support flange 150 attached to wall of filtration pipe/conduit 122) allows acoustic pressure shock waves 10 to push away dissolved/soluble or nonsoluble particles 124 from filtration porous membrane/filter 120 and in the direction of liquid/fluid/water tangential flow 140. The acoustic pressure shock waves 10 acting parallel/tangential to the surface of filtration porous membrane/filter 120 allow liquid/fluid/water particles 123 to pass easier through filtration porous membrane/filter 120, which translates in a larger liquid/fluid/water flow after membrane/filter 126. Furthermore, for the embodiment depicted in FIG. 15B, the acoustic pressure shock waves 10 action, which is in the same direction as liquid/fluid/water tangential flow 140, may produce a speed-up of dissolved/soluble or nonsoluble particles 124 in front of filtration porous membrane/filter 120, that even more can keep away dissolved/soluble or nonsoluble particles 124 from membrane/filter pores 121, thus it not allows them to clog/foul filtration porous membrane/filter 120.

Figure 16:
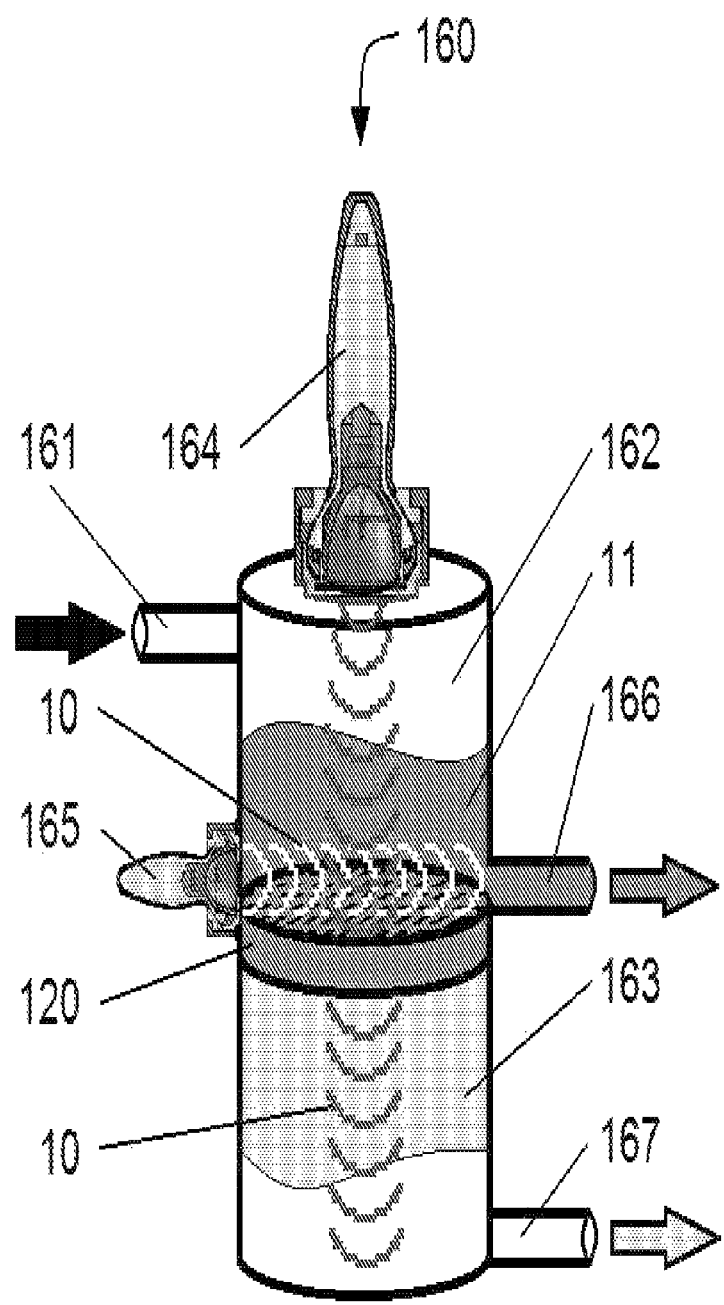
FIG. 16 is a schematic representation illustrating use of acoustic pressure shock wave devices for declogging of a filtration porous membrane/filter when acoustic pressure shock wave devices are placed both tangential and perpendicular to membrane/filter surface, according to one embodiment of the present invention.

The embodiment from FIG. 16 represents a filtration module 160 illustrating use of acoustic pressure shock waves 10 for declogging/fouling elimination of a filtration porous membrane/filter 120 when the acoustic pressure shock wave devices are placed both perpendicular/frontal (frontal acoustic pressure shock wave devices 164) and tangential (tangential acoustic pressure shock wave devices 165) to the surface of filtration porous membrane/filter 120. Frontal acoustic pressure shock wave devices 164 and tangential acoustic pressure shock wave devices 165 have similar construction as acoustic pressure shock wave devices 34 presented in FIG. 9 (acoustic pressure shock wave reflector 92, membrane 57, clean liquid/fluid/water propagation medium 58, membrane 57, and electrodes 59). Also, for simplicity, acoustic pressure shock wave generators 63 were not shown in FIG. 16. In this case, liquid/fluid/water medium 11 that needs filtration will enter filtration module 160 via filtration liquid/fluid/water inlet 161. Filtration porous membrane/filter 120 separates filtration module 160 in two separate chambers—the upper chamber 162 and the lower chamber 163. In upper chamber 162, acoustic pressure shock waves 10 produced by frontal acoustic pressure shock wave devices 164 are providing the necessary pressurization of the liquid/fluid/water medium 11 and thus pushing it through filtration porous membrane/filter 120. The acoustic pressure shock waves 10, produced by frontal acoustic pressure shock wave devices 164, can pass through filtration porous membrane/filter 120 and continue to push filtered liquid/fluid/water medium 11 towards clean liquid/fluid/water collection outlet 167. In the same upper chamber 162, acoustic pressure shock waves 10 produced by tangential acoustic pressure shock wave devices 165 are providing the push of clogging/fouling particles towards fouling evacuation outlet 166, thus continuously cleaning filtration porous membrane/filter 120. Thus, upper chamber 162 is the space where filtration and foul cleaning happens, due to strong action of acoustic pressure shock waves 10. The lower chamber 163 serves more as a reservoir where the clean liquid/fluid/water is collected after filtration porous membrane/filter 120 due to the action of acoustic pressure shock waves 10 produced by frontal acoustic pressure shock wave devices 164. As seen in FIG. 16, one frontal acoustic pressure shock wave device 164 and one tangential acoustic pressure shock wave devices 165 could be used. However, more than one of these devices can be used based on the specificity of the filtration process. It is interesting to note that frontal acoustic pressure shock wave device 164 direction of action matches the flow direction of liquid/fluid/water medium 11, which is opposite to embodiments presented in FIG. 13A and FIG. 15A, where the direction of acoustic pressure shock waves 10 was either against liquid/fluid/water frontal flow 125 (for FIG. 13A), or perpendicular to liquid/fluid/water tangential flow 140 (for FIG. 15A). These finds show the versatility of acoustic pressure shock wave technology in accomplishing the desired goals and use of unidirectional action of acoustic pressure shock waves 10 to precisely move liquid/fluid/water in specific directions, towards and through designated targets.

Figure 17:
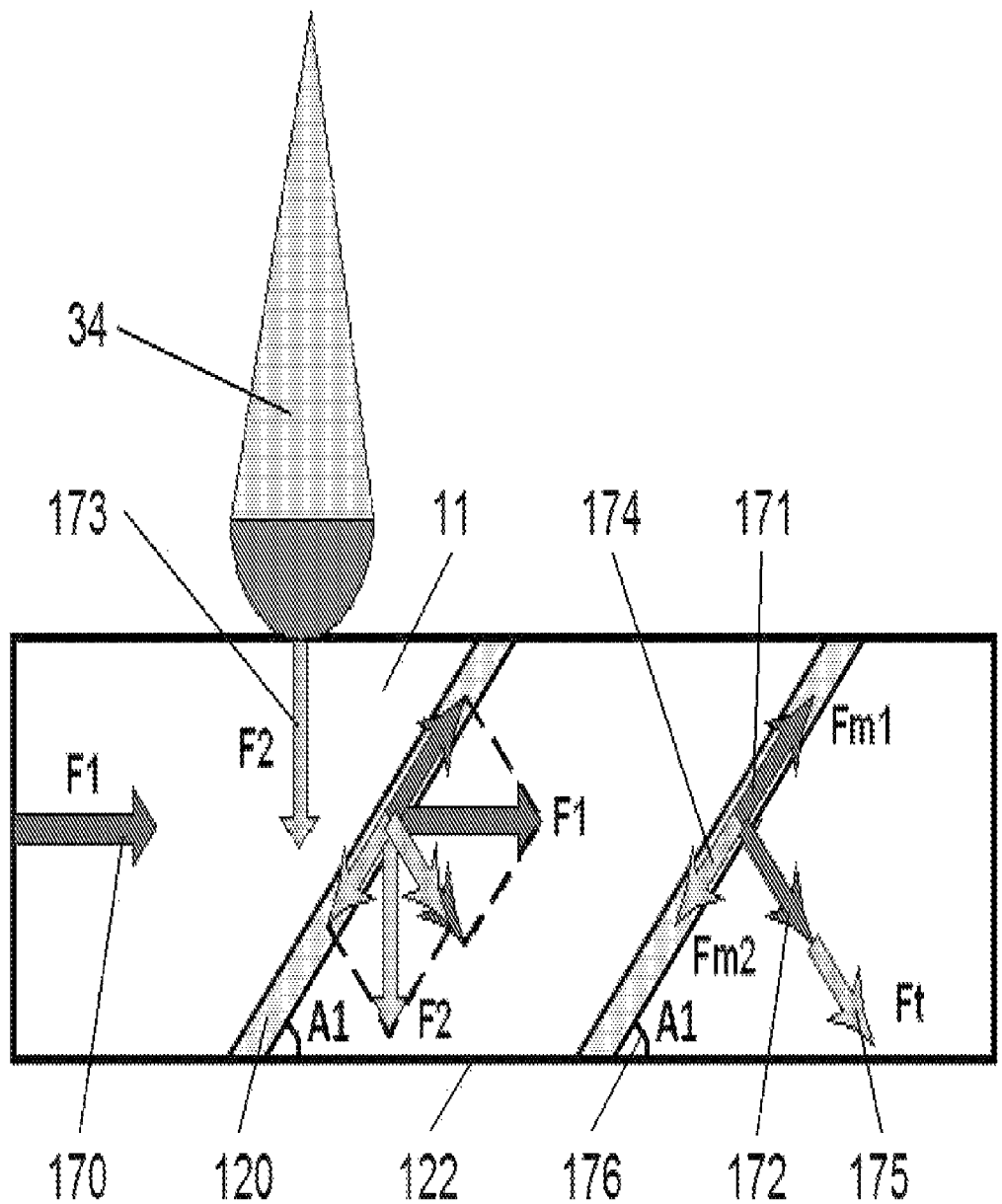
FIG. 17 is a schematic representation illustrating use of acoustic pressure shock wave devices for declogging of a filtration porous membrane/filter positioned at angle A1 to direction of liquid/fluid/water flow and acoustic pressure shock wave devices are placed perpendicular to liquid/fluid/water path, according to one embodiment of the present invention.

The embodiments from FIG. 12, FIG. 13A, FIG. 13B, FIG. 14, FIG. 15A, FIG. 15B and FIG. 16 have filtration porous membrane/filter 120 positioned either perpendicular (ninety degrees angle) to the axis of filtration pipe/conduit 122/filtration module 160 (FIG. 12, FIG. 13A, FIG. 13B and FIG. 16), or parallel/tangential (zero degrees angle) to the axis of filtration pipe/conduit 122 (FIG. 14, FIG. 15A, and FIG. 15B). Besides these more classical approaches to position filtration porous membrane/filter 120 inside filtration pipe/conduit 122 or filtration module 160, there are options where the membrane is placed at an angle between 90° and 0° (acute angle) relative to the axis of filtration pipe/conduit 122, as presented in FIG. 17. In this case, filtration porous membrane/filter 120 is placed at 45° degrees membrane/filter angle 176. Under the action of velocity/pressure/force of liquid/fluid/water 170 and acoustic pressure shock wave pressure/force 173 produced by acoustic pressure shock wave devices 34 (placed perpendicularly to the liquid/fluid/water path and before filtration porous membrane/filter 120), and due to the 45° angle of filtration porous membrane/filter 120 relatively to the axis of filtration pipe/conduit 122, the two forces project in force components along filtration porous membrane/filter 120 surface (tangential velocity/pressure/force of liquid/fluid/water 171 and tangential acoustic pressure shock wave pressure/force 174) and force components perpendicular to filtration porous membrane/filter 120 (normal velocity/pressure/force of liquid/fluid/water 172 and normal acoustic pressure shock wave pressure/force 175). When force components' actions are analyzed for each direction, interesting conclusions can be drawn. In FIG. 17, if the velocity/pressure/force of liquid/fluid/water 170 and acoustic pressure shock wave pressure/force 173 are comparable in value, then the tangential force components along the surface of filtration porous membrane/filter 120 (tangential velocity/pressure/force of liquid/fluid/water 171 and tangential acoustic pressure shock wave pressure/force 174) consistently move fouling agents/particles towards the edges of filtration porous membrane/filter 120, which can help on keeping clean the membrane's central part and produce proper filtration. If lateral evacuation pipes 127 (see FIG. 12, FIG. 13A and FIG. 13B) or fouling evacuation outlet 166 (see FIG. 16) are present, then the fouling agents/particles are continuously pushed outside filtration pipe/conduit 122 or filtration module 160, which insures a long utility life for filtration porous membrane/filter 120, due to its efficient removal of clogging/fouling substances. The normal force components, acting perpendicular to filtration porous membrane/filter 120 (normal velocity/pressure/force of liquid/fluid/water 172 and normal acoustic pressure shock wave pressure/force 175), are adding together and create a large force that pushes more efficiently liquid/fluid/water medium 11 through filtration porous membrane/filter 120. In conclusion, it seems that a filtration porous membrane/filter 120 placed on an acute angle relatively to the axis of filtration pipe/conduit 122/filtration module 160 helps both with the online fouling cleaning operation (can be used during filtration time) and with the filtration efficiency (due to addition of normal force components).

Figure 18:
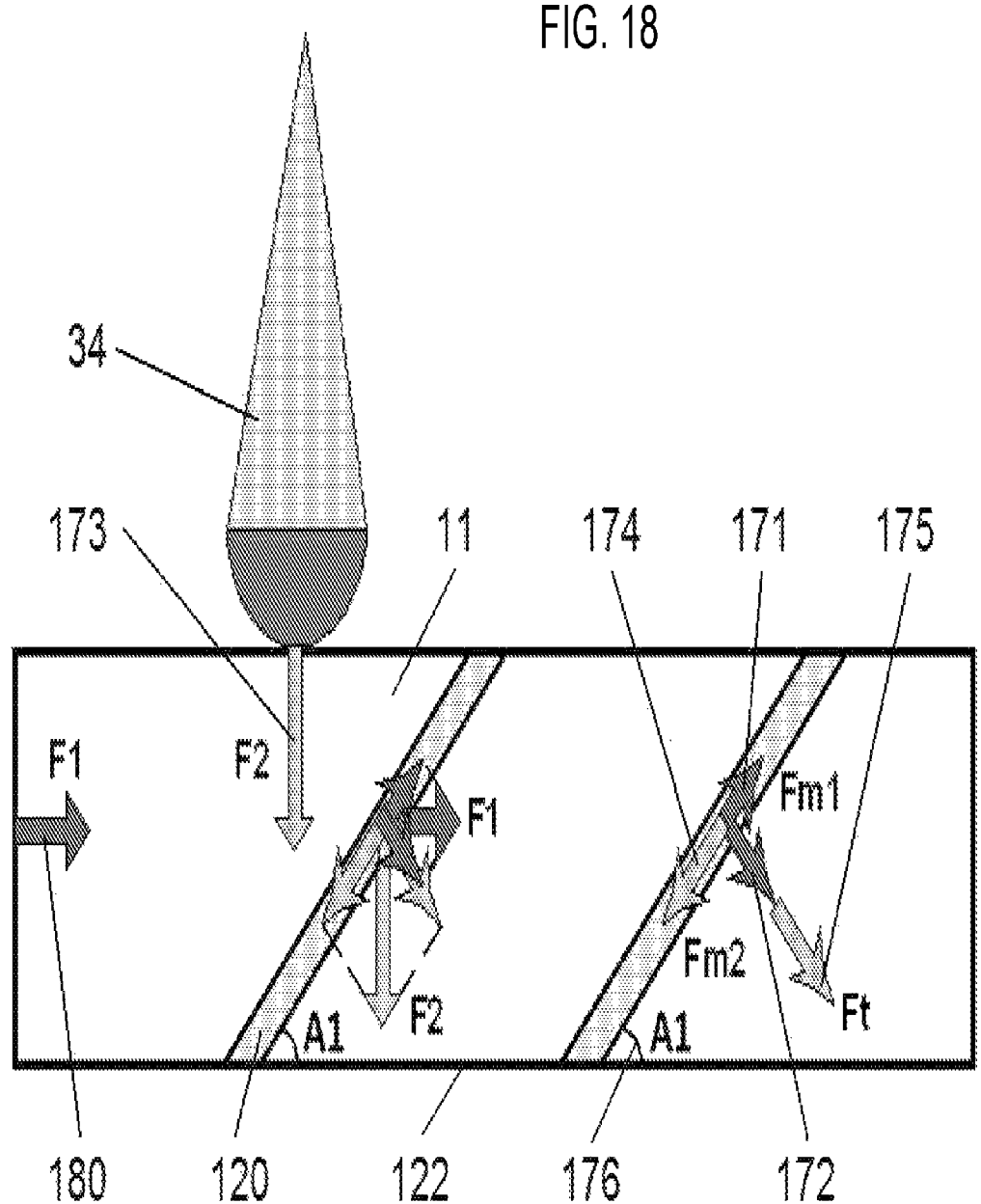
FIG. 18 is a schematic representation illustrating the influence of low velocity/pressure/force of liquid/fluid/water on declogging process (compared with high velocity/pressure/force of liquid/fluid/water illustrated in FIG. 17), when a filtration porous membrane/filter is positioned at angle A1 to the direction of liquid/fluid/water flow and acoustic pressure shock wave devices are placed perpendicular to liquid/fluid/water path, according to one embodiment of the present invention.

In FIG. 18, the influence of low velocity/pressure/force of liquid/fluid/water 170 on declogging/antifouling process (compared to high velocity/pressure/force of liquid/fluid/water 170 illustrated in FIG. 17), when a filtration porous membrane/filter 120 is positioned at angle of 45 degrees membrane/filter angle 176 relatively to the axis of filtration pipe/conduit 122 and acoustic pressure shock wave device 34 are placed perpendicular to the liquid/fluid/water path and before filtration porous membrane/filter 120. Similar to the embodiment from FIG. 17, low velocity/pressure/force of liquid/fluid/water 180 and acoustic pressure shock wave pressure/force 173 (similar to the one from FIG. 17) project in force components along the surface of filtration porous membrane/filter 120 (tangential velocity/pressure/force of liquid/fluid/water 171 and tangential acoustic pressure shock wave pressure/force 174) and force components perpendicular to filtration porous membrane/filter 120 (normal velocity/pressure/force of liquid/fluid/water 172 and normal acoustic pressure shock wave pressure/force 175). In this case, tangential velocity/pressure/force of liquid/fluid/water 171 is smaller than tangential acoustic pressure shock wave pressure/force 174, which creates a more significant movement of fouling agents/particles towards the lower part of filtration porous membrane/filter 120. If lateral evacuation pipes 127 (see FIG. 12, FIG. 13A and FIG. 13B) or fouling evacuation outlet 166 (see FIG. 16) are placed at the bottom of filtration porous membrane/filter 120, then the fouling agents are continuously pushed outside filtration pipe/conduit 122 or filtration module 160, which insures a long utility life for filtration porous membrane/filter 120, due to its efficient removal of clogging/fouling substances. The normal force components acting perpendicular to filtration porous membrane/filter 120 (normal velocity/pressure/force of liquid/fluid/water 172 and normal acoustic pressure shock wave pressure/force 175) are adding together to create a large force that pushes more efficiently liquid/fluid/water medium 11 through the filtration porous membrane/filter 120. In conclusion, when low velocity/pressure/force of liquid/fluid/water 180 and larger acoustic pressure shock wave pressure/force 173 act on filtration porous membrane/filter 120 placed on an acute angle relatively to the axis of filtration pipe/conduit 122/filtration module 160, it helps both with the online fouling cleaning operation (if lateral evacuation pipes 127 (see FIG. 12, FIG. 13A and FIG. 13B) or fouling evacuation outlet 166 (see FIG. 16) are placed in the correct location—at the bottom of filtration porous membrane/filter 120), and also with the filtration efficiency (due to addition of normal force components).

Figure 19:
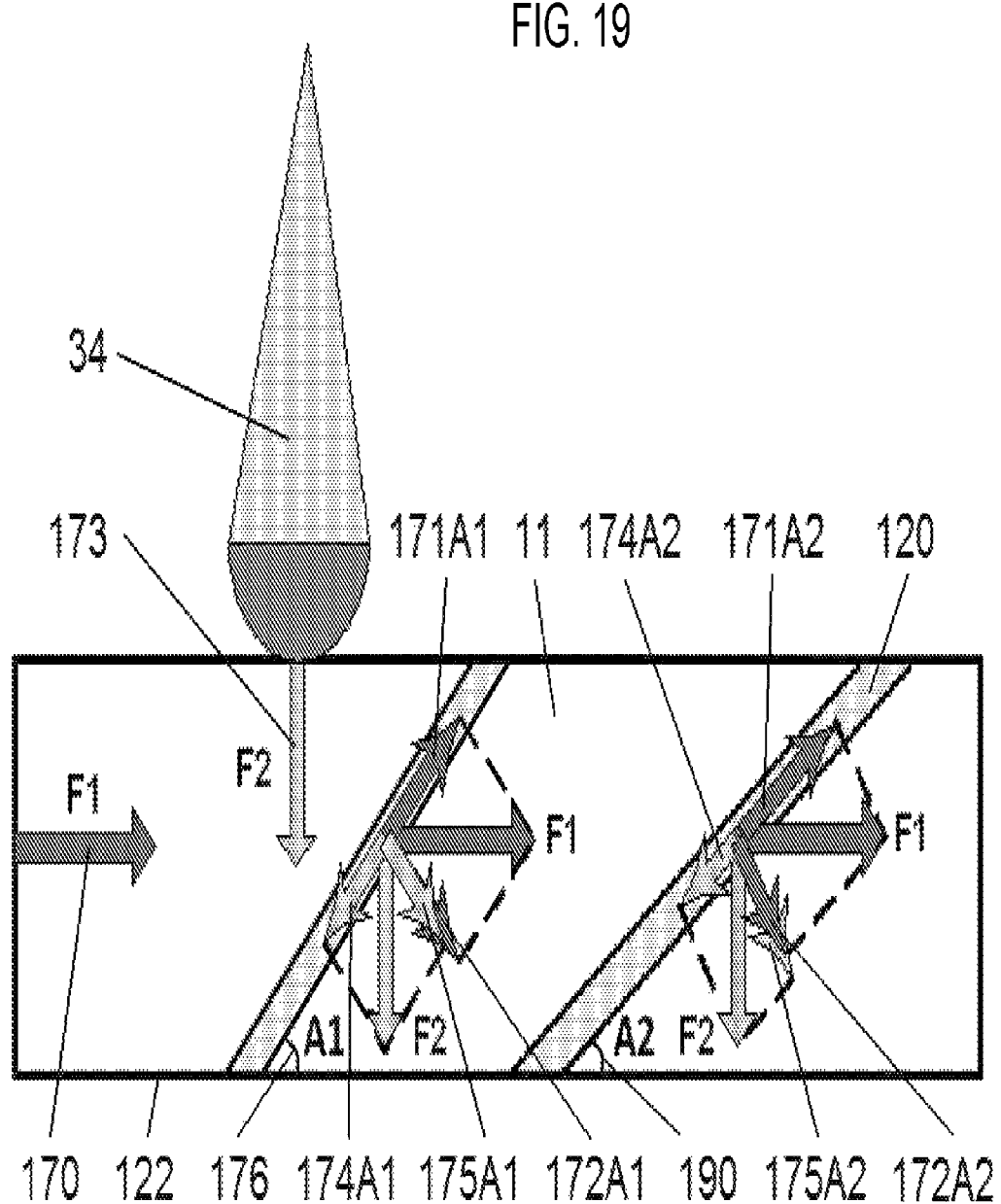
FIG. 19 is a schematic representation illustrating the influence of a filtration porous membrane/filter orientation relatively to liquid/fluid/water flow (angles A1 and A2) on declogging process when acoustic pressure shock wave devices are placed perpendicular to the liquid/fluid/water path, according to one embodiment of the present invention.

In FIG. 19 it is analyzed the influence of a filtration porous membrane/filter 120 orientation relatively to the axis of filtration pipe/conduit 122 (45 degrees membrane/filter angle 176 or 30 degrees membrane/filter angle 190) on declogging process, when acoustic pressure shock wave devices 34 are placed perpendicular to the liquid/fluid/water path and before filtration porous membrane/filter 120. The almost equal velocity/pressure/force of liquid/fluid/water 170 and acoustic pressure shock wave pressure/force 173 project in force components along the surface of filtration porous membrane/filter 120 as tangential velocity/pressure/force of liquid/fluid/water 171A1 and tangential acoustic pressure shock wave pressure/force 174A1 for the 45 degree orientation of filtration porous membrane/filter 120, and in tangential velocity/pressure/force of liquid/fluid/water 171A2 and tangential acoustic pressure shock wave pressure/force 174A2 for the 30 degree orientation of filtration porous membrane/filter 120. Correspondingly, the force components perpendicular to filtration porous membrane/filter 120 are the normal velocity/pressure/force of liquid/fluid/water 172A1 and normal acoustic pressure shock wave pressure/force 175A1 for the 45 degree orientation of filtration porous membrane/filter 120 and in tangential velocity/pressure/force of liquid/fluid/water 172A2 and tangential acoustic pressure shock wave pressure/force 175A2 for the 30 degree orientation of filtration porous membrane/filter 120. The tangential force components along filtration porous membrane/filter 120 surface for the 45 degree orientation of filtration porous membrane/filter 120 are almost equal and give uniform movement to the fouling agents/particles towards the edges of filtration porous membrane/filter 120 (as presented in FIG. 17). When the 30 degree orientation of filtration porous membrane/filter 120 is used, then the tangential velocity/pressure/force of liquid/fluid/water 171A2 is larger than the tangential acoustic pressure shock wave pressure/force 174A2, which creates a more significant movement of fouling agents/particles towards the upper part of filtration porous membrane/filter 120. If lateral evacuation pipes 127 (see FIG. 12, FIG. 13A and FIG. 13B) or fouling evacuation outlet 166 (see FIG. 16) are placed at the upper part of filtration porous membrane/filter 120, then the fouling agents are continuously pushed outside the filtration pipe/conduit 122 or filtration module 160, which insures a long utility life for filtration porous membrane/filter 120, due to its efficient removal of the clogging/fouling substances. For both angles (45 or 30 degrees), the normal force components 172A1 and 175A1 (for 45 degrees angle) or 172A2 and 175A2 (for 30 degrees angle) are adding together to create a larger force that pushes more efficiently liquid/fluid/water medium 11 through filtration porous membrane/filter 120. In conclusion, it seems that the angle of filtration porous membrane/filter 120 can change the direction in which fouling/agents/particles move at the surface of filtration porous membrane/filter 120 when acoustic pressure shock waves 10 are used. However, regardless of the angle of filtration porous membrane/filter 120 relative to the axis of filtration pipe/conduit 122/filtration module 160, it helps both with the online fouling cleaning operation (can be used during filtration time) and with the filtration efficiency (due to addition of normal force components). In this way, a double action is accomplished at the surface and through filtration porous membrane/filter 120, using a single acoustic pressure shock wave device 34, instead of dedicated devices for each specific action on filtration porous membrane/filter 120, as presented in FIG. 13A, FIG. 13B, FIG. 15A, FIG. 15B, and FIG. 16.

The acoustic pressure shock waves 10 can be periodically or continuously applied for cleaning of filtration porous membranes/filters 120 from clogging/fouling particles (dissolved/soluble or nonsoluble particles 124), thus prolonging their life and reduce the pressure necessary to push liquid through respective filtration porous membranes/filters 120. For the intermittent cleaning, the regimen of action and pause times can be determined based on specific application and based on the necessary grade of cleaning/foul elimination, to allow normal function of filtration porous membranes/filters 120. The intermittent cycles can be performed manually or automatically, controlled via a software controller/microprocessor (for simplicity, not specifically shown in FIG. 13A, FIG. 13B, FIG. 15A, FIG. 15B, FIG. 16, FIG. 17, FIG. 18, or FIG. 19) that can have different setting regimens based on the value of the flow inside filtration pipe/conduit 122, or the contamination level from liquid/fluid/water medium 11, or the value of membrane/filter pores 121.

For embodiments presented in FIG. 13A, FIG. 13B, FIG. 15A, FIG. 15B, FIG. 16, FIG. 17, FIG. 18, or FIG. 19, the number of acoustic pressure shock wave devices 34 used to perform the continuous or intermittent cleaning of filtration porous membrane/filter 120 depends on the surface and the shape of the respective filtration porous membrane/filter 120, and the contamination level from liquid/fluid/water medium 11. Thus, the number of acoustic pressure shock wave devices 34 can vary from one, two or more, which is dictated by the specificity of each filtration application. For the embodiment from FIG. 13B, FIG. 15B and FIG. 16, it is interesting to note that when multiple acoustic pressure shock wave devices 34, 164 or 165 are used, the devices must be placed at different angular position (30, 60, 45, 90 degrees) relatively to each other, the filtration system should also have a similar or less number (as the acoustic pressure shock wave devices 34, 164 or 165) of lateral evacuation pipes 127 or fouling evacuation outlet 166.

For all systems presented in FIG. 13A, FIG. 13B, FIG. 15A, FIG. 15B, FIG. 16, FIG. 17, FIG. 18, or FIG. 19, the output energy for acoustic pressure shock waves 10 is suitably adjusted in such way to produce continuous or intermittent cleaning of filtration porous membrane/filter 120, without producing any loss of integrity/harm to filtration porous membrane/filter 120 as pitting, tear, deformation, etc.

For all systems presented in FIG. 13A, FIG. 13B, FIG. 15A, FIG. 15B, FIG. 16, FIG. 17, FIG. 18, or FIG. 19, acoustic pressure shock waves 10 can be used to reduce fouling of filtration porous membranes/filters 120, regardless of the size of dissolved/soluble or nonsoluble particles 124, which makes shock wave technology applicable for filtration, micro-filtration, ultra-filtration and nano-filtration. Even more, the acoustic pressure shock waves can act on any type of filter/membrane regardless of the material used in their construction (polymers, metals, ceramics, etc.).

The embodiments presented in FIG. 13A, FIG. 13B, FIG. 15A, FIG. 15B, FIG. 16, FIG. 17, FIG. 18, or FIG. 19 can also use acoustic pressure shock waves 10 to disturb and dislodge particulate matter/biofilms that produce biofouling, in a similar way and application as presented above for normal fouling produced by non-living substances (inorganic or organic). Practically, due to antibacterial properties of acoustic pressure shock waves 10 and their destruction/removal effect on biofilm structures formed by bacteria, the filtration systems that use acoustic pressure shock wave devices 34 will be very efficient against biofouling. Also, acoustic pressure shock waves 10 can enhance the dissolution of substances/bio-matter trapped on filtration porous membrane/filter 120 surfaces. In the same time, acoustic pressure shock waves 10 can enhance disinfection of distribution systems due to the presence of hydrogen peroxide ($H_2O_2$) and hydroxyl free radicals ($OH^-$) generated by the cavitational phase of acoustic pressure shock waves 10.

As described in U.S. Pat. No. 8,685,317, the acoustic pressure shock waves 10 can kill bacteria, viruses and micro-organisms that can be found in liquid/fluid/water mediums. Based on teachings of said patent, acoustic pressure shock waves 10 can be used to kill different micro-organisms from liquid/fluid/water, which combined with filtration and other existent technologies, can render liquids/fluids/waters to be used for human consumption or produce sterilized liquids/fluids/waters for medical and food industries. For some pharmaceutical processes, ultra-purified liquids/fluids/waters must be used and acoustic pressure shock waves devices 34 and specialized systems (similar to those presented in FIG. 3, FIG. 4, FIG. 5A, FIG. 5B, FIG. 5C, FIG. 6, FIG. 7, FIG. 8 and FIG. 9) can be used into the ultra-purification processes, based on their reactivity towards any impurities, facilitation of chemical reactions and prevention of fouling of ultra-filtration membranes (as presented in FIG. 13A, FIG. 13B, FIG. 15A, FIG. 15B, FIG. 16, FIG. 17, FIG. 18 and FIG. 19). Acoustic pressure shock waves systems (as those presented in FIG. 3, FIG. 4, FIG. 5A, FIG. 5B, FIG. 5C, FIG. 6, FIG. 7, FIG. 8, FIG. 9, FIG. 13A, FIG. 13B, FIG. 15A, FIG. 15B, FIG. 16, FIG. 17, FIG. 18 and FIG. 19) can be used independently or in combination/synergistically with existing technologies such as chlorination, UV, ozone, activated carbon, etc., to enhance the killing of different microbes/harmful micro-organisms.

Acoustic pressure shock waves 10 can be also used to clean the fouling of already clogged filtration porous membrane/filter 120 during their cleaning process. Use of mobile acoustic pressure shock wave devices 34 to produce acoustic pressure shock waves 10 inside a cleaning bath can expedite/accelerate the removal of clogging/fouling particles (dissolved/soluble or nonsoluble particles 124).

In the cases where biocides are employed to clean biofouling from filtration porous membrane/filter 120 that are left in place in filtration systems (not removed from systems as those presented in FIG. 12, FIG. 13A, FIG. 13B, FIG. 14, FIG. 15A, FIG. 15B, FIG. 16, FIG. 17, FIG. 18 and FIG. 19), the acoustic pressure shock waves 10 can be used to enhance the biocide effect and also to remove residues left on the surface of filtration porous membrane/filter 120, which helps with cleaning of byproducts, and generate a more efficient biofilm removal and rinse-out of dead bacteria or biofilm/biofouling small fragments. In fact, acoustic pressure shock waves 10 can produce a mechanical cleaning and destruction without direct contact used with other mechanical cleaning means such as brushes, cleaning pigs, etc. Acoustic pressure shock waves 10 elimination of fouling/biofilms can be used in conjunction with any other existing technology, as an addition or to enhance the effects of a designated technology, as mentioned above. The economical advantage of acoustic pressure shock wave technology comes from possible elimination of chemical or complex substances used for fouling treatment that need to be filtered afterwards, or can be harmful to the environment. Also, acoustic pressure shock waves 10 are relatively inexpensive in energy consumptions and have high energy efficiency during their transfer towards targeted area.

Figure 20:
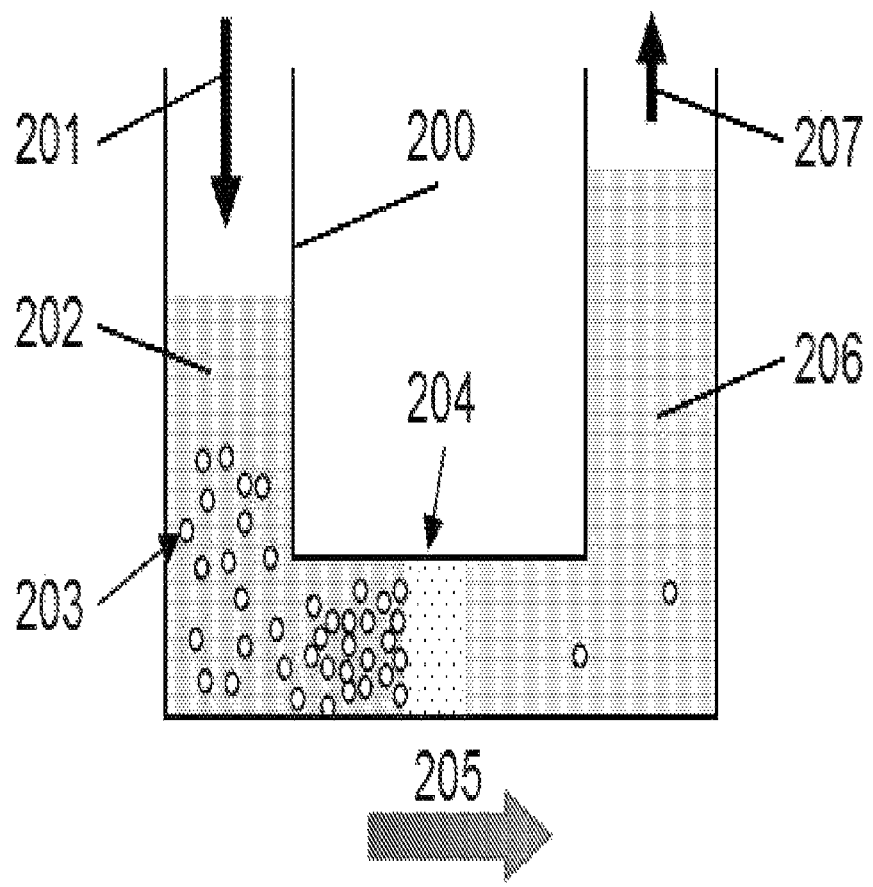
FIG. 20 is a diagram illustrating reverse osmosis (RO) process used for water desalination (prior art).

A reverse osmosis system is presented as prior art in FIG. 20. For reversed osmosis process, a semi-permeable reverse osmosis membrane 204 allows water to diffuse from one side to the other side of reverse osmosis vessel 200. When the liquid on one side of the semi-permeable reverse osmosis membrane 204 is saltier than the other side (salt water/industrial brine 202 on the left side compared to pure water 206 on the right side of the reverse osmosis vessel 200), fresh water 206 diffuses through semi-permeable reverse osmosis membrane 204 from the less concentrated to the more concentrates side (right side towards the left side of reverse osmosis vessel 200). This process, which tends to equalize the saltiness of the two solutions, is called osmosis and the flow is called osmotic flow. The osmosis can be stopped by applying pressure to salt water/industrial brine 202 to the influx of water molecules from the fresh water 206. The pressure required (equal in size and opposite in direction to the pressure exerted by osmosis) is known as applied osmotic pressure 201. Applying pressure greater than the osmotic pressure does not simply stop the osmosis, but just creates a reverse osmosis, which uses semi-permeable reverse osmosis membrane 204 to trap salt particles 203. The direction of salt water/industrial brine flow 205 is from salt water/industrial brine 202 towards pure water 206. Practically, the salty liquid becomes even more concentrated and pure water builds up on the other side of semi-permeable reverse osmosis membrane 204 and pure water collection/evacuation 207 is accomplished.

Figure 21:
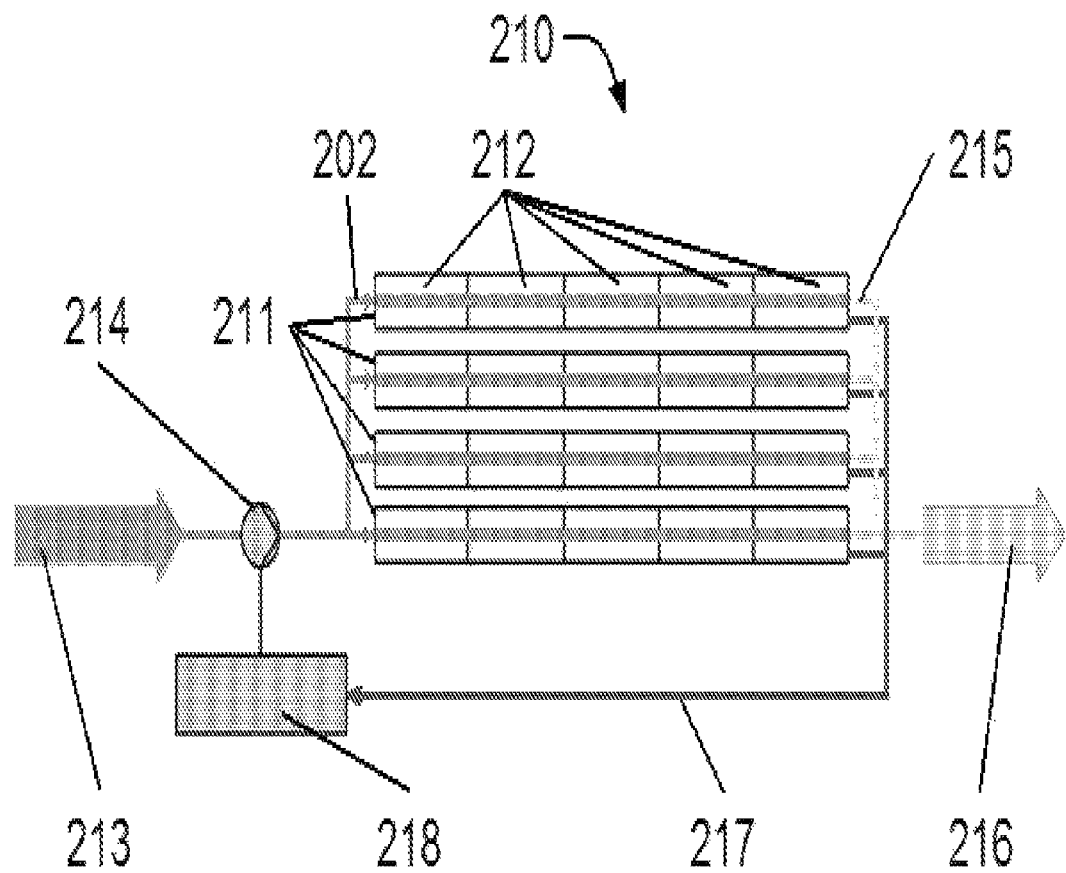
FIG. 21 is a schematic representation illustrating a reverse osmosis (RO) desalination system (prior art).

In practice, reverse osmosis is applied in systems similar to the one presented in FIG. 21 as a prior art, where special designed reverse osmosis membrane elements/cartridges 212 are incorporated in pressure vessels 211 to create a reverse osmosis array 210. Practically, the system presented in FIG. 21 has four pressure vessels 211, each of them has five reverse osmosis membrane elements/cartridges 212 that create a four pressure vessels times five membrane elements array. Reverse osmosis membrane elements/cartridges 212 are tubular elements that have a spiral rolled semi-permeable reverse osmosis membrane 204 capable to separate salt and minerals from salt water/industrial brine 202, thus producing desalinated water 215. Salt water/industrial brine 202 enters the system via the salt water/industrial brine from pre-treatment inlet 213, and it is pumped by high pressure pump 214 towards pressure vessels 211 and reverse osmosis membrane elements/cartridges 212, where the reverse osmosis process takes place. In order for high pressure pump 214 to produce the high pressures necessary for pushing salt water/industrial brine 202 through reverse osmosis membrane elements/cartridges 212, there is significant energy consumption, one of the major drawbacks of this system. Also significant is the cost of osmosis membrane elements/cartridges 212, driven by the cost of semi-permeable reverse osmosis membrane 204 and its high pressure resistance construction. At the distal end (right end) of pressure vessels 211, filtered desalinated water 215 is collected and sent towards post-treatment outlet 216 for eventual further processing (filtration, disinfection, etc.). On same distal end of pressure vessels 211, the salt concentrated solution or brine is sent back towards energy recovery device 218 via brine concentrated pipe 217. The brine residue is usually discharged back into the seat at the end of the cycle. The energy from the very high water pressure used in reverse osmosis process is recaptured in energy recovery device 218, to be used for example by a water plant in order to turn a turbine and to create electricity.

Figure 22:
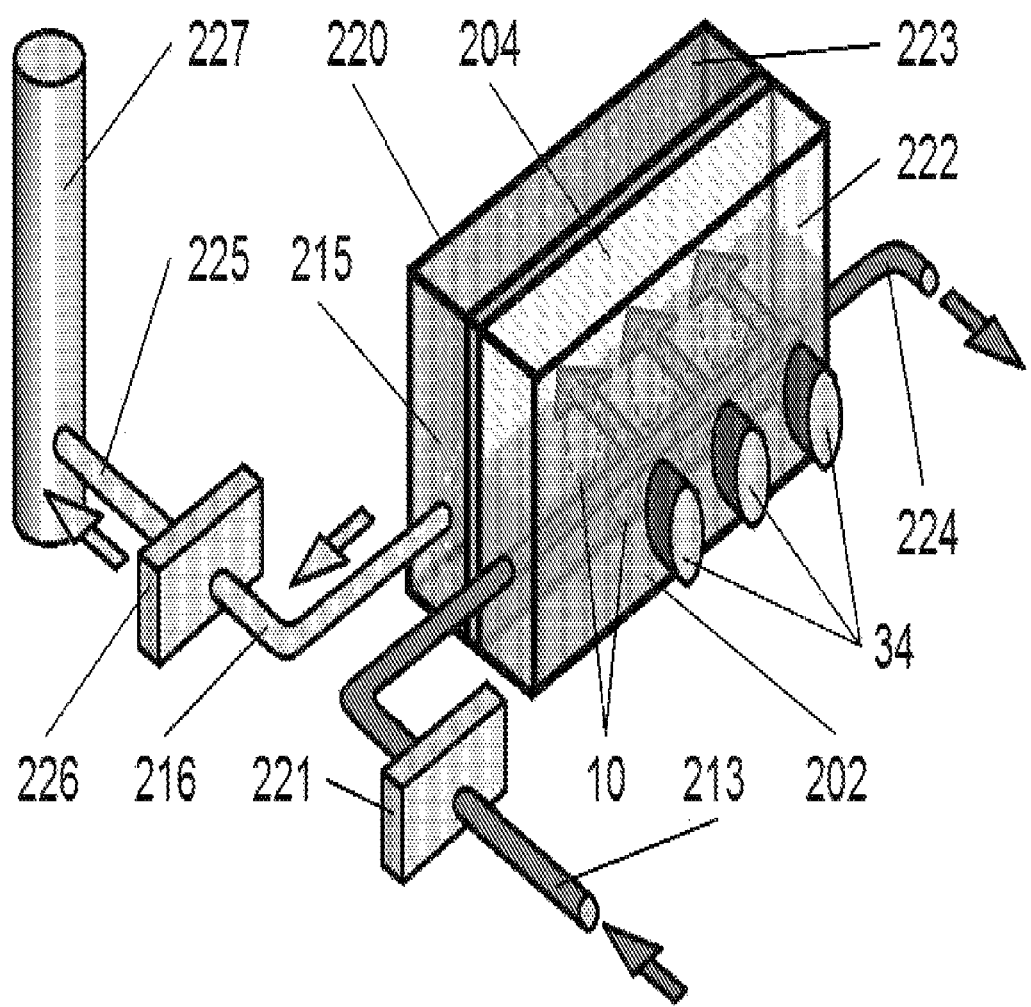
FIG. 22 is the schematic representation illustrating use of acoustic pressure shock wave devices to produce reverse osmotic filtration in a large parallelepipedic tank, according to one embodiment of the present invention.

In embodiment from FIG. 22, the acoustic pressure shock waves 10 are used to push salt water/industrial brine 202 (brine, sea water, industrial by-product water, etc.) through one layer of separation semi-permeable reverse osmosis membrane 204. In this way, the consumption of energy for creating super high pressures via high pressure pumps 214 (energy intensive) is reduced, thus avoiding the system drawback presented in FIG. 21. For embodiment presented in FIG. 22, the osmotic pressure for desalination is provided by the combined action of acoustic pressure shock wave devices 34, there is no need for high pressure pumps 214. Also, the simplicity of semi-permeable reverse osmosis membrane 204 allows the elimination of rolled membranes incorporated in actual reverse osmosis membrane elements/cartridges 212 and of high pressure resistance construction for reverse osmosis membrane elements/cartridges 212, which translates in a significant cost reduction. When large parallelepipedic reverse osmotic tank 220 is used, the salt water/industrial brine 202 will be passed through one layer of semi-permeable reverse osmosis membrane 204, this simplified construction has major potential to reduce the reverse osmosis system cost, in general. For this system, salt water/industrial brine 202 is introduced inside large parallelepipedic reverse osmotic tank 220 via salt water/industrial brine from pre-treatment inlet 213. Before getting inside large parallelepipedic reverse osmotic tank 220, salt water 202 passes through inlet saline filter 221. Once the salt water/industrial brine 202 is inside large parallelepipedic reverse osmotic tank 220, acoustic pressure shock wave devices 34 (placed inside acoustic pressure shock wave osmotic chamber 222) create acoustic pressure shock waves 10 and the necessary pressure to pass salt water/industrial brine 202 through the one layer semi-permeable reverse osmosis membrane 204 (requires smaller pressure for reverse osmosis when compared to reverse osmosis membrane elements/cartridges 212 presented in FIG. 21). After passing through semi-permeable reverse osmosis membrane 204, desalinated water 215 accumulates into desalinated water chamber 223 then exits through post-treatment outlet 216. An additional cleaning is done via pure water ultra-filtration filter 226 and pure water follows pure water outlet 225 towards pure water reservoir 227. The brine resulted from the reverse osmosis process is collected from acoustic pressure shock wave osmotic chamber 222 via concentrated brine outlet 224.

For the embodiment presented in FIG. 22, if an in-line cleaning system with acoustic pressure shock waves 10 is added (as the ones presented in FIG. 13A, FIG. 13B, FIG. 15A, FIG. 15B, FIG. 16, FIG. 17, FIG. 18 and FIG. 19), in order to avoid the clogging of semi-permeable osmosis membrane 204 from large parallelepipedic reverse osmotic tank 220, then the life of semi-permeable osmosis membrane 204 can be increased, which can produce significant savings in operating the reverse osmosis desalination system.

Figure 23:
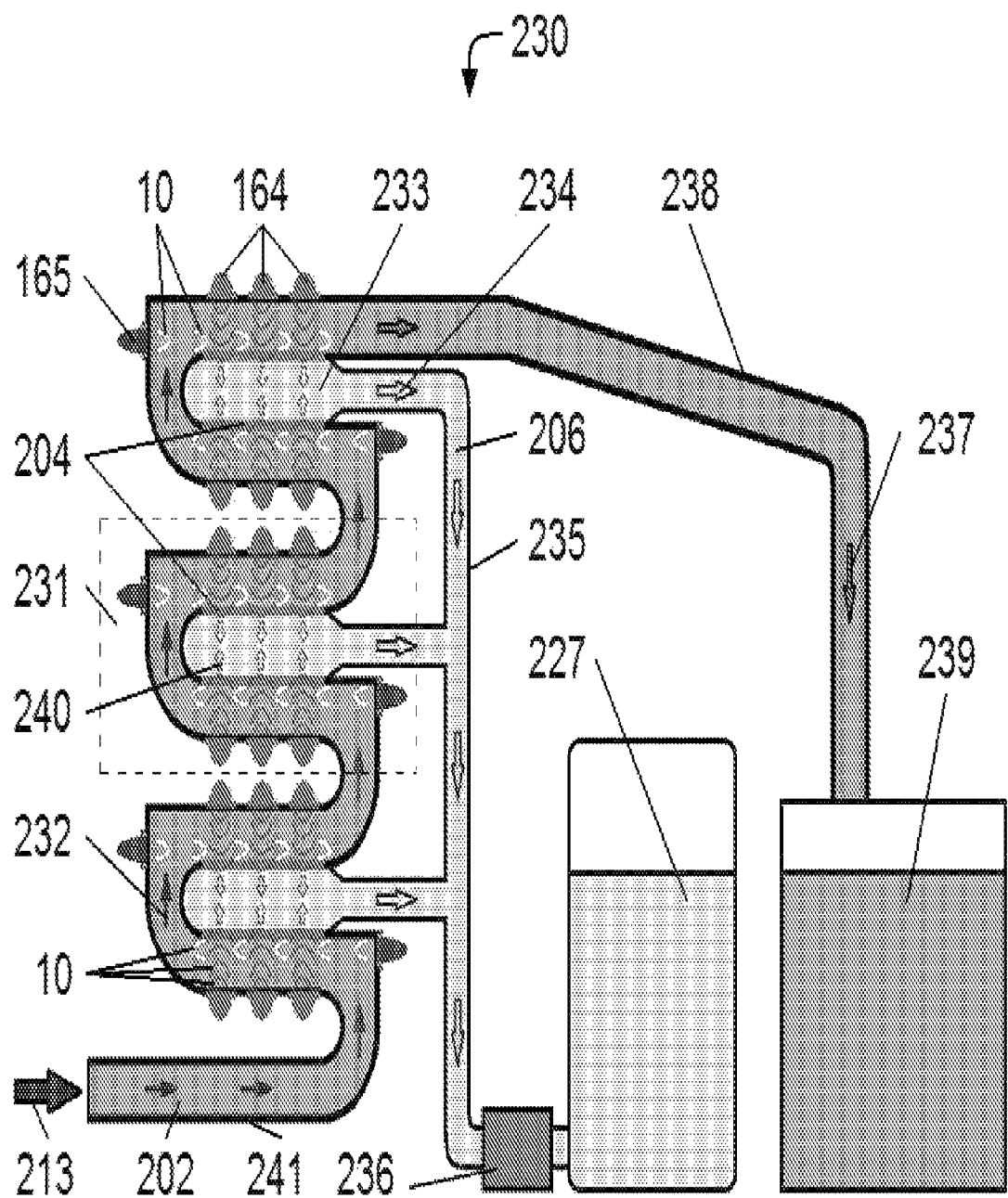
FIG. 23 is a schematic representation illustrating use of acoustic pressure shock wave devices to produce reverse osmotic filtration in a large array system that has multiple reverse osmotic cells/units, according to one embodiment of the present invention.

A much larger reverse osmosis desalination array system, that uses acoustic pressure shock waves 10, is presented in FIG. 23. To produce reverse osmotic filtration, acoustic pressure shock wave reverse osmotic array 230 incorporates multiple reverse osmotic cells/units 231. Specifically, acoustic pressure shock wave reverse osmotic array 230 from FIG. 23 has three reverse osmotic cells/units 231, although more than three cells/units can be used, depending on salt concentration of salt water 202. The pressure necessary for reverse osmosis process is given by frontal acoustic pressure shock wave devices 164 that push salt water/industrial brine 202 through one layer semi-permeable osmosis membrane 204 (requires smaller pressure for reverse osmosis when compared to reverse osmosis membrane elements/cartridges 212 presented in FIG. 21). Winding reverse osmosis conduit 241 moves salt water/industrial brine 202 in a tangential/parallel flow relatively to semi-permeable osmosis membranes 204, which are incorporated in the interior wall of each wind of winding reverse osmosis conduit 241. In each reverse osmotic cell/unit 231, two semi-permeable osmosis membranes 204 are used and acoustic pressure shock waves 10 are generated by a set of three or more frontal acoustic pressure shock wave devices 164. The number of frontal acoustic pressure shock wave devices 164 included in each set depends on the scale of acoustic pressure shock wave reverse osmotic array 230. The reverse osmosis process is produced by salt water/industrial brine flow through reverse osmosis membrane 240 and pure water 206 is collected inside pure water collection chamber 233, located inside the wind of winding reverse osmosis conduit 241. For each semi-permeable osmosis membrane 204, acoustic pressure shock waves 10 are perpendicular to semi-permeable osmosis membrane 204 and orientated towards pure water collection chamber 233. Pure water flow 234 from each water collection chamber 233 guide pure water 206 through pure water collection pipe 235 towards pure water reservoir 227. Before entering pure water reservoir 227, pure water 206 is further cleaned inside post-treatment module 236. As presented for embodiments from FIG. 13B, FIG. 15B and FIG. 6, for acoustic pressure shock wave reverse osmotic array 230, tangential/parallel acoustic pressure shock waves 10 are used to keep unclogged the surface of semi-permeable osmosis membranes 204 with salt ions. To accomplish the continuous cleaning of the surface facing salt water 202 of semi-permeable osmosis membranes 204, tangential acoustic pressure shock wave devices 165 are used. Acoustic pressure shock waves 10 created by tangential acoustic pressure shock wave devices 165 push away the salt ions from the surface of semi-permeable osmosis membranes 204 and in the direction of salt water/industrial brine flow 232, through winding reverse osmosis conduit 241, or in the direction of post desalination concentrated brine flow 237 through concentrated brine pipe 238 and towards concentrated brine reservoir 239. The advantages of acoustic pressure shock wave reverse osmotic array 230 presented in FIG. 23 are given by the use of less expensive one layer semi-permeable osmosis membranes 204, that are continuously cleaned (longer life before exchange), and by smaller pressures needed (generated by acoustic pressure shock waves 10) to perform the reverse osmotic process, when compared to reverse osmosis membrane elements/cartridges 212 presented in FIG. 21, which ultimately translate into a more economic and a highly efficient system.

The invention presented in patent application US2007/0295673 relates to a novel desalination method and system that uses freeze crystallization technology, incorporates the use of compressed air energy as the source for freezing temperatures. The process is called Eutectic Freeze Crystallization Technology. When solutions are chilled below water freezing point (0° C. or 32° F.), the water portion of the solution begins to crystallize as ice, the remaining liquid becomes more concentrated. Agitation of the chilled solution usually accelerates ice crystal formation, thus offering a method of speeding up the entire separation/concentration process. The ice crystals are formed in a suspension of brine solution, and require a filtration system/removal system, for that the ice crystals to be separated from brine, and a washing column, to wash out brine contained in between and on the surface of small ice crystals. Principally, three forces are acting on the ice crystals, the buoyancy force Fb, due to the ice density, which has to overcome the drag force Fd and gravity (mg) for the ice crystals upward movement. Acoustic pressure shock waves can be used to add to the buoyancy force, thus making much faster the ice upward movement (economical efficiency). Finally, after their separation from brine slush, the ice crystals are melted back into pure water. The process works very well for extracting high-grade water from less than desirable water sources (desalinization). Freeze desalination has several advantages, such as lower energy costs compared to heating technologies, potential liquid discharge, minimal corrosion and scaling, energy recovery, low cost materials, no use of chemicals, pretreatment not necessary and low environmental impact. On the other hand, the freeze desalination has disadvantages, such as process complexity, impurity entrapment and long freezing cycle duration.

The idea of using acoustic pressure shock waves 10 to separate ice crystals from salt water/industrial brine 202 was developed based on intriguing results and difficulties described in patent application US2007/0295673 and existing literature that present the Eutectic Freeze Crystallization Technology. Said Eutectic Freeze Crystallization Technology showed inefficiencies due to slow process to separate ice from solid salt, high dependency on ice crystals size, entanglement between ice crystals and salt particles during separation, larger pieces of ice crystal tend to block the separator, the use of numerous moving parts and meshes into the system that can be clogged during separation process, etc.

Practically, the desalination processes using freezing are based on removal of ice particles from salt water/industrial brine 202 (with a higher density than water ice particles) due to gravity. In the embodiment from FIG. 24 and FIG. 25 it is described a process that relies on fast and efficient ways to separate water ice crystals from salt water/industrial brine 202 by using acoustic pressure shock waves 10, which dramatically improves the efficiency of freezing desalination systems and make freezing desalination technology competitive for an industrial scale application. Furthermore, the acoustic pressure shock waves 10 (using acoustic streaming and cavitation jets) can help pushing out salt water/industrial brine 202 trapped in between ice crystals, which can increase even more the efficiency of freezing desalination process and avoid extensive wash with fresh water of ice crystals to remove salty brine from the ice mass, as was the case with the embodiments from patent application US2007/0295673. Intermittent functioning of ice crystallizer with intermittent use of acoustic pressure shock waves 10 after slurry is formed represents the best way of operation.

Direct or indirect freeze processes can be applied to produce ice crystals. In a direct freezing process, the refrigerant is directly mixed with salt water/industrial brine 202. The direct freezing process is less used due to the possibility of a contamination. In an indirect freezing process, the refrigerant/freezing agent is separated from salt water/industrial brine 202 by a heat transfer surface. For the indirect cooling the refrigerant/freezing agent is introduced into a series of pipes and mantles, which cools the enclosure where salt water/industrial brine 202 resides. The materials surrounding the enclosure should have very good heat insulation properties to be able and maintain the chilling effect inside the enclosure with minimal losses towards environment. Total contact surface area is needed for indirect cooling and the coefficient of heat transfer from the pipes and mantle are the key parameters for this process. Indirect cooling prevents contact between refrigerant and salt water/industrial brine 202 by using a heat exchanger surface instead. The disadvantage of a cooled wall heat exchanger is the scaling of both ice and salt crystals on heat exchanger wall. These scaling can be removed by scrapers over the surface. Besides the scaling removal, the scrapers also prevent scaling by creating a turbulent flow and improving heat transfer from the wall. Also, to prevent scaling of both ice and salt crystals, acoustic pressure shock waves 10 can be used to avoid concentration of crystals on solid heat exchange surfaces and to improve heat transfer from the wall.

Carbon dioxide ($CO_2$) has specific benefits in use as a refrigerant/freezing agent. First of all, it is limitless available in our atmosphere. It has no ozone depletion potential and an insignificant global warming potential (at least in the small amounts used in refrigeration). Furthermore, it is a cheap, non poisonous and non flammable refrigerant. However, other refrigerants/freezing agents can be used, such as halons, chlorofluorocarbons (CFC), perfluorocarbons (FCs), hydrochlorofluorocarbons (HCFC), ammonia, non-halogenated hydrocarbons, etc.

Figure 24:
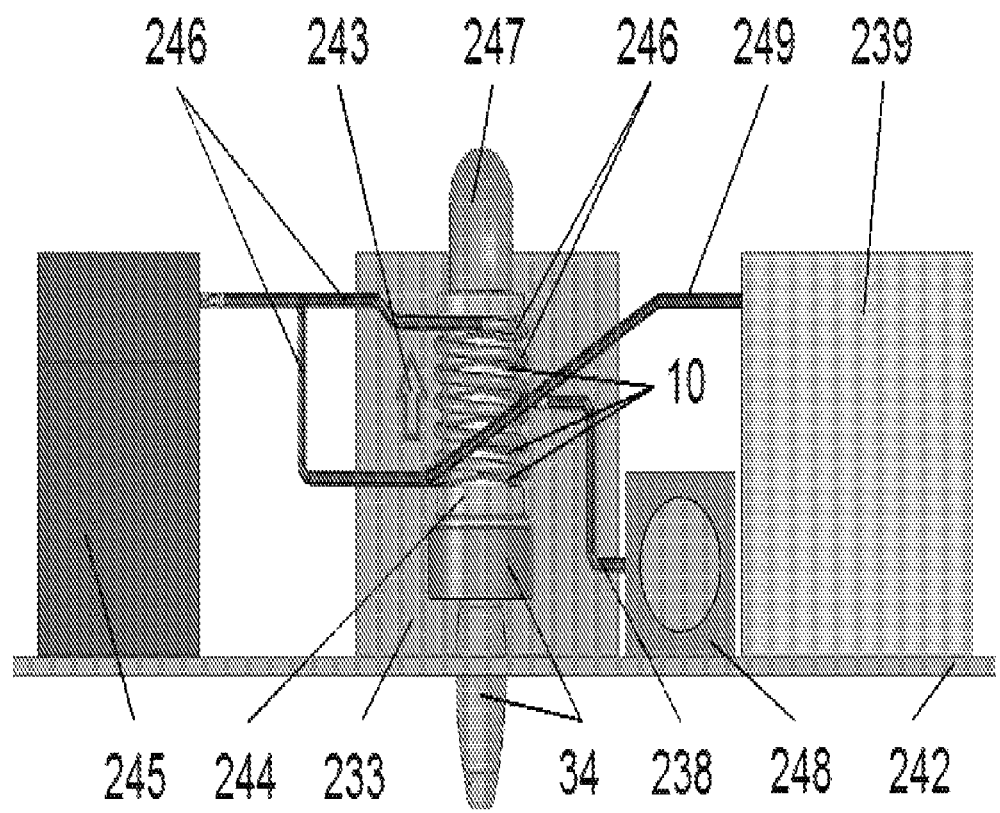
FIG. 24 is a schematic representation illustrating use of acoustic pressure shock wave devices for water desalination, according to one embodiment of the present invention.
Figure 25:
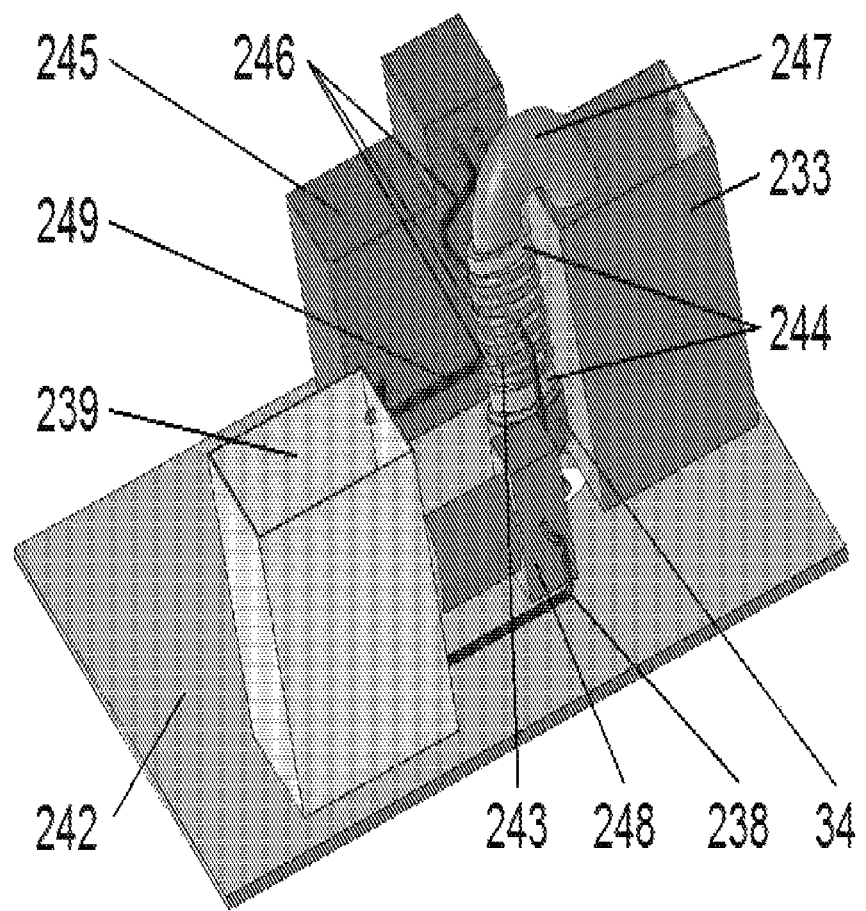
FIG. 25 is a three dimensional view of the water desalination system presented in FIG. 24 that uses acoustic pressure shock wave devices, according to one embodiment of the present invention.

The system from FIG. 24 and FIG. 25 uses acoustic pressure shock waves 10 inside a suspension freeze concentration/crystallization chamber 244, where the freeze crystallization occurs due to refrigeration coil 246 controlled by refrigeration system 245. Salt water/industrial brine 202 is pumped into suspension freeze concentration/crystallization chamber 244 by pump/pumping system 248, which creates a steady flow through the whole system. Refrigeration coil 246, wrapped around suspension freeze concentration/crystallization chamber 244, allows the cooling and freezing of salt water/industrial brine 202. Refrigeration system 245 holds the refrigeration substance and pumps it through refrigeration coil 246 during ice forming period/freezing period. The freezing process starts and sustains the water ice crystals formation inside suspension freeze concentration/crystallization chamber 244. After creation of a slush (mixture of ice crystals with concentrated brine), inside the suspension freeze concentration/crystallization chamber 244, acoustic pressure shock waves upward direction 243 produces a very efficient ice crystals movement towards the top of suspension freeze concentration/crystallization chamber 244, thus separating the ice crystals from concentrated brine, that settles at the bottom. Ice collection pipe 247 sends the ice inside pure water collection chamber 233, where it melts using heat that is collected from the refrigeration system 245 or is produced by a separate ice melting system/heat exchanger (for simplicity and clarity, not shown in FIG. 24 and FIG. 25, but shown later in FIG. 29, FIG. 30, FIG. 31, FIG. 34 and FIG. 35). Three different thawing methods can be employed for the separated pure water ice crystals, such as hot air (20° C.), water bath (40° C.) and microwave oven (700 W, 2450 MHz). The process of melting the ice with any of these methods can be combined with a membrane separation at the bottom of pure water collection chamber 233, to separate any residual salt particles entangled in the ice crystals or attached to the ice crystals surface, which can be similar to reverse osmosis. In this case, acoustic pressure shock waves devices 34 will be arranged along the surface of the reverse osmosis membrane, to prevent its clogging due to salt accumulation in its pores (as presented in FIG. 13B, FIG. 15B, FIG. 16 and FIG. 23). After the desalination process, heat pumps/heat exchangers can be used to warm up the ice (it can increase efficiency, thus reducing the whole cycle energy consumption). Heat pumps/heat exchangers are designed to move thermal energy opposite to the direction of spontaneous heat flow, by absorbing heat from a cold space and releasing it to a warmer zone, thus the heat pumps/heat exchangers are devices that provide heat energy from a source of heat to a destination called a "heat sink".

In the embodiments presented in FIG. 24 and FIG. 25, the concentrated brine from the bottom of suspension freeze concentration/crystallization chamber 244 is vacuum pumped into concentrated brine reservoir 239 via return pipe for concentrated brine 249. Concentrated brine slush from concentrated brine reservoirs 239 can be sent back into the system to go through desalination process or discarded in the ocean/environment. Concentrated brine reservoirs 239 are designed with insulated walls, to maintain low temperatures of the concentrated brine slush during its storage.

The freeze desalination system presented in FIG. 24 and FIG. 25 represents a small system that can be used for small quantities of water. This is the reason why the whole system sits on a system platform 242, which makes it easier to be transported from one location to another. However, this system is also easy to scale up and be transformed in a large system that can provide significant amounts of desalinated water. Of course, in the latter case, more powerful acoustic pressure shock wave devices 34 will be used and also larger and multiple suspension freeze concentration/crystallization chambers 244 will be used.

In US2007/0295673 patent application, different methods to preserve energy and produce a more efficient heat exchange are presented. Thus, in order to prevent ice formation sticking to the crystallization chamber walls, warm sea water is used to wrap around crystallization chamber. Also, the sea water that needs desalination is pre-cooled to near freezing temperatures even before it enters crystallization chamber. Finally, waste heat from refrigerant compressors can be used to prevent ice particles from sticking to crystallization chamber. All these energy optimization processes can also be applied to the invention presented in this patent.

For the embodiment presented in FIG. 24 and FIG. 25, sensors (not specifically shown into these figures) can be used to measure the salt concentration of salt water/industrial brine 202 that needs desalination, in order to economically control the chilling temperature used to create the slush from which water crystals are separated using acoustic pressure shock waves 10, without creating a compact ice/snow mass.

Figure 26:
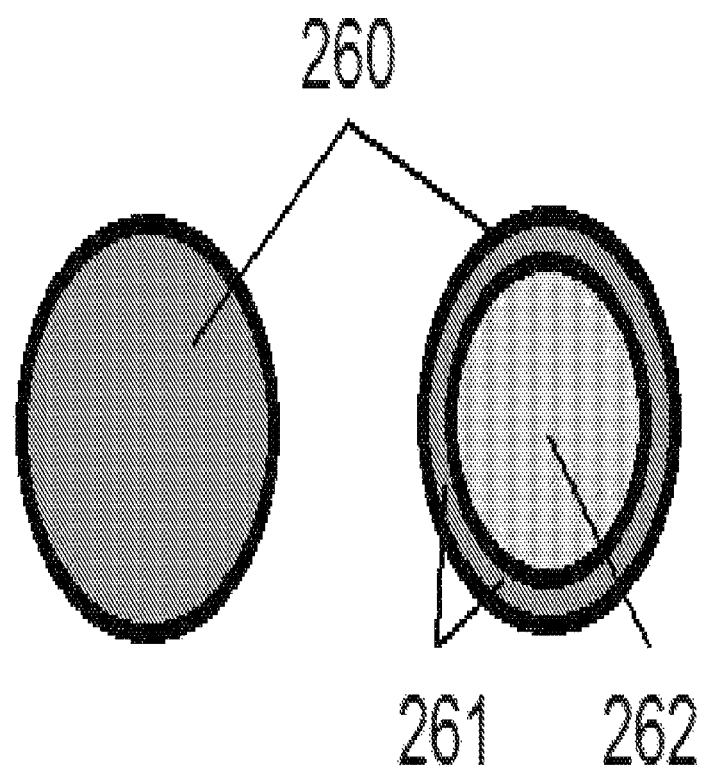
FIG. 26 is a schematic representation illustrating hollow balls that can be used to chill faster the brine during freezing water desalination, according to one embodiment of the present invention.

In order to expedite the freezing process for the embodiments presented in FIG. 24 and FIG. 25, cold seeds can be used to start the freezing process. For this purpose, the embodiment from FIG. 26 presents chilled hollow micro-spheres 260 that can be used as cold seeds to start or expedite the freezing processes. These chilled hollow micro-spheres 260 are hollow inside their outer shell 261 a chilling freezing agent 262 can be introduced. The chilled hollow micro-spheres 260 can have their outer shell 261 be made of special materials that have very good thermal conductivity and are light weight, to facilitate their rapid chilling/freezing. Based on this particular construction, the chilled hollow micro-spheres 260 should be able to chill very fast in a refrigeration system, and then, when introduced in freezing desalination systems, they can rapidly start the freezing process. For example, into the process presented in FIG. 24 and FIG. 25, chilled hollow micro-spheres 260 can be used as a method to apply direct cooling to salt water/industrial brine 202 and allow a rapid ice crystal formation (chilled hollow micro-spheres 260 act as the seeds of water crystallization into ice form). After desalination, during ice melting process the iced water mixtures with chilled hollow micro-spheres 260 can be filtered, to separate desalinated water 215 (see FIG. 21) from chilled hollow micro-spheres 260. In this way, chilled hollow micro-spheres 260 can be collected and reused for the process. This can avoid the drawback of using cooling fluid that is injected directly into salt water/industrial brine 202 to achieve direct cooling, thus eliminating the disadvantage of having refrigerant intermixed with the ice, which affects the purity of desalinated water 215.

Agitation of chilled solution usually accelerates ice crystal formation, thus offering a method of speeding up the entire separation/concentration process. From this point of view, for the embodiment presented in FIG. 24 and FIG. 25, the acoustic pressure shock waves 10 can also be used to agitate the solution during freezing period, which allows a diminish of necessary time to create the ice crystals. Using acoustic pressure shock wave agitation, combined with chilled hollow micro-spheres 260 presented in FIG. 26, should significantly expedite the freezing process. For freezing crystallization operation, acoustic pressure shock waves 10 can use different energy setting (lower energy output), when compared to the energy output necessary to separate ice crystals from concentrated brine. For the agitation during freezing period combined with ice crystal separation necessary during freezing desalination process, the acoustic pressure shock waves 10 can be used either continuously or intermittently.

Figure 27:
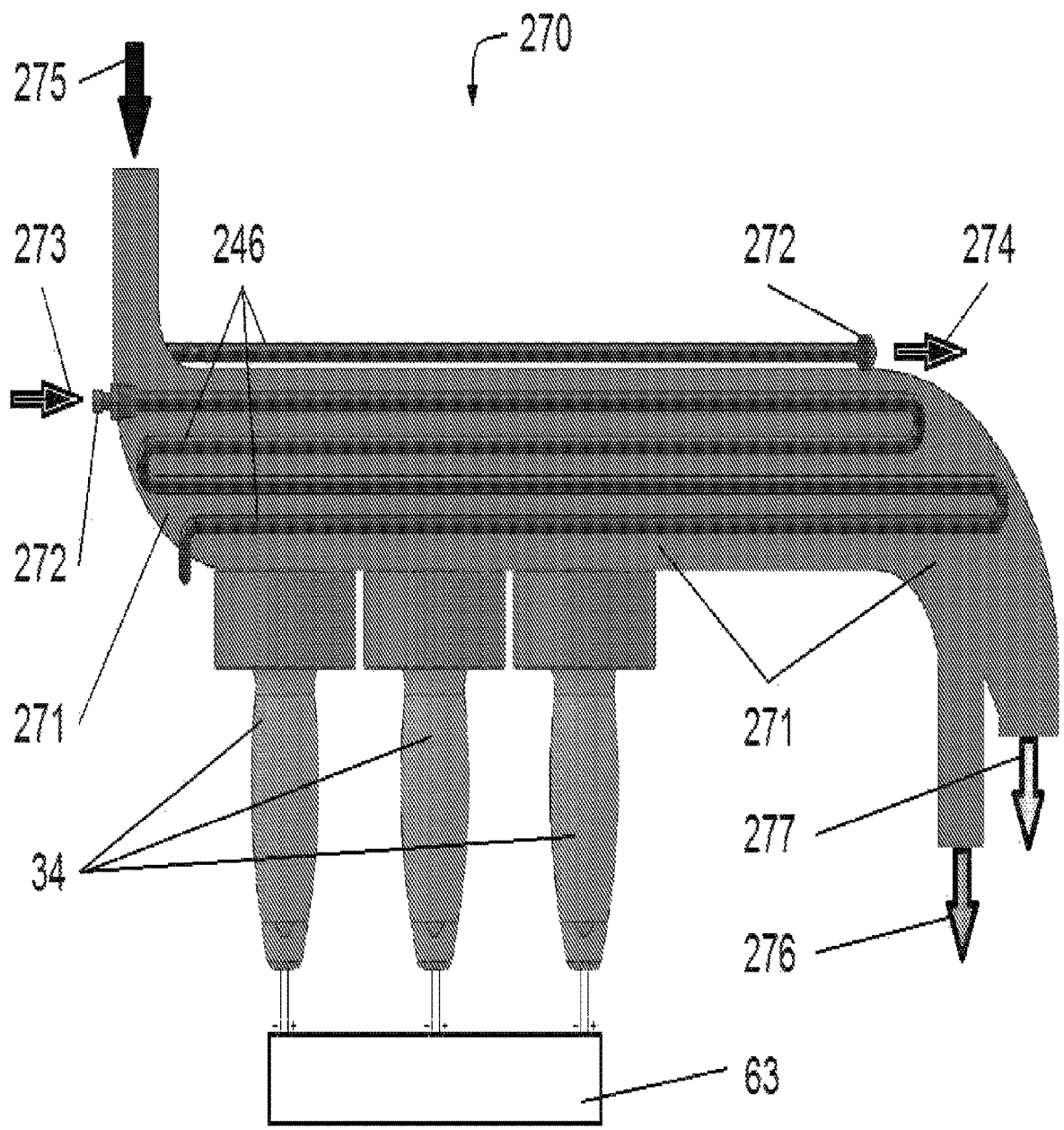
FIG. 27 is a schematic representation illustrating a cell/unit that uses acoustic pressure shock wave devices for water desalination to rapidly separate ice crystals from brine, according to one embodiment of the present invention.
Figure 28:
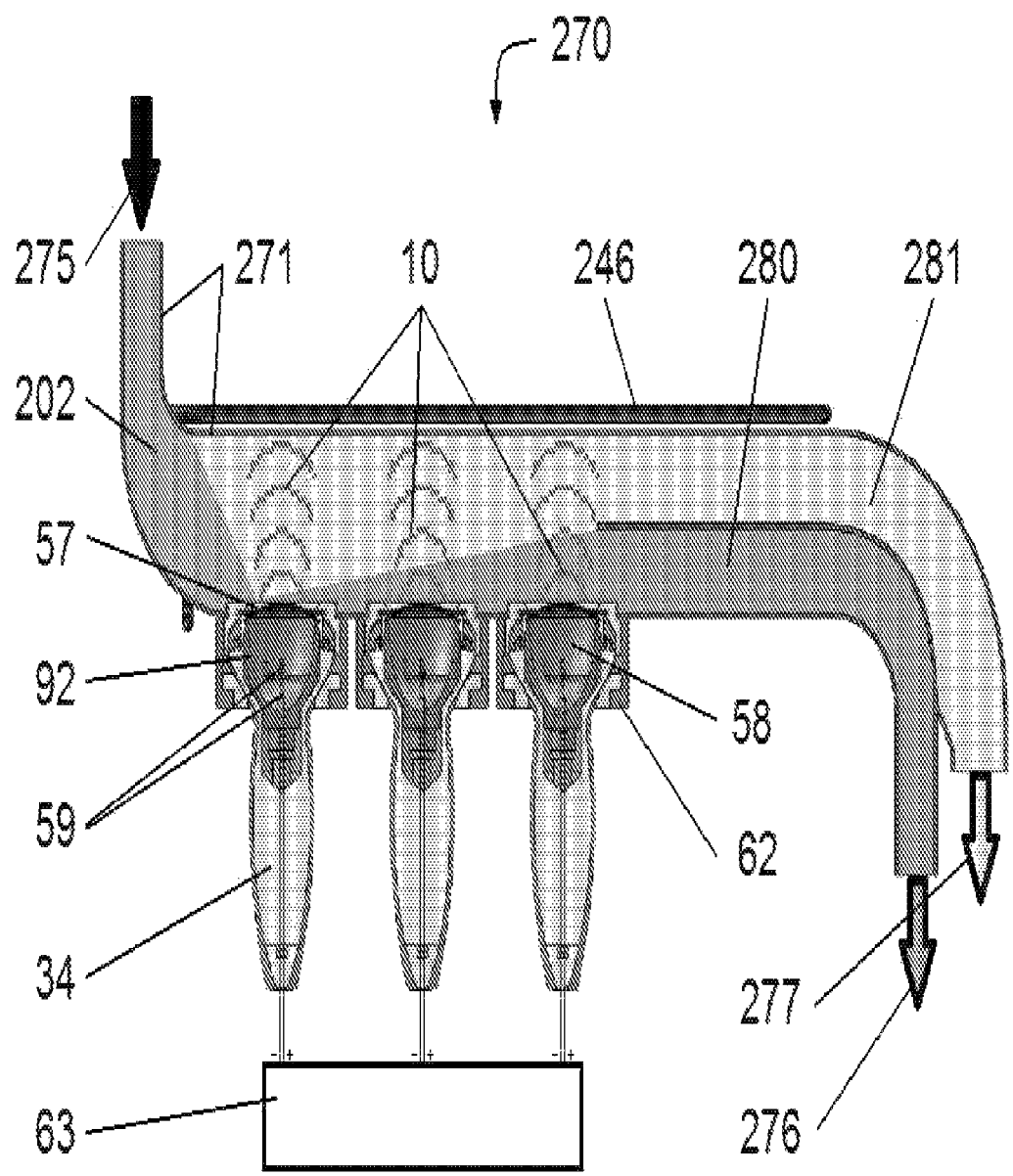
FIG. 28 is a cross-sectional schematic representation of the cell/unit presented in FIG. 27 illustrating the use of acoustic pressure shock wave devices for water desalination to rapidly separate ice crystals from brine, according to one embodiment of the present invention.

The embodiment presented in FIG. 27 and FIG. 28 shows specialized freezing desalination cell/unit 270 that incorporate acoustic pressure shock wave devices 34. Specialized freezing desalination cell/units 270 are designed in such way that allow enough residence time of salt water/industrial brine 202 inside freezing desalination cell/unit enclosure 271 to produce a slush made of ice crystals and concentrated brine. The freezing process is produced by an indirect refrigeration system 245 (not specifically shown in FIG. 27 and FIG. 28, but shown in FIG. 24 and FIG. 25). It can be seen in FIG. 27 and FIG. 28 that refrigeration coil 246 and refrigeration coil connectors 272 are used to connect to the main/central refrigeration system 245. Refrigerant/freezing agent inlet 273 allows refrigerant/freezing agent to enter in wrap around refrigeration coil 246, then refrigerant/freezing agent exits through chilling/freezing agent outlet 274. The flow speed of refrigerant/freezing agent inside refrigeration coil 246, properties of materials used in construction of refrigeration coil 246 and freezing desalination cell/unit enclosure 271 dictate the freezing process efficiency and the ice formation speed. However, the salinity of salt water/industrial brine 202 that enters freezing desalination cell/unit enclosure 271 via salt water/industrial brine inlet 275 also has influence on the freezing process (the higher the salt concentration, the lower the necessary freezing temperature to be accomplished). By using a salinity sensor for salt water/industrial brine 202 and a temperature sensor (not specifically shown in figures throughout this patent) inside freezing desalination cell/unit enclosure 271, the freezing process can be automatically controlled via a computer/microprocessor control system.

The acoustic pressure shock wave devices 34 from FIG. 27 and FIG. 28 are powered by electric energy from acoustic pressure shock wave generator 63, in order to produce acoustic pressure shock waves 10 inside specialized freezing desalination cell/unit 270. During the freezing process, intermittent on continuously, acoustic pressure shock wave devices 34 can be used to mix salt water/industrial brine 202 in order to expedite the ice crystallization process. To further accelerate the freezing process, chilled hollow microspheres 260 (as the ones presented in FIG. 26) can be used inside specialized freezing desalination cell/unit 270. The acoustic pressure shock wave devices 34 receive energy from acoustic pressure shock wave generator 63 to produce acoustic pressure shock waves 10 via high voltage discharge in between electrodes 59 and inside clean liquid/fluid/water propagation medium 58, encompassed by the membrane 57 and acoustic pressure shock wave reflector 92. The role of acoustic pressure shock wave reflector 92 is to focus acoustic pressure shock waves inside specialized freezing desalination cell/unit 270, to produce the separation of ice crystals from concentrated brine slush 280. Acoustic pressure shock wave devices 34 are kept in place and in sealed contact with freezing desalination cell/unit enclosure 271, by connecting and sealing assembly 62. The number of acoustic pressure shock wave devices 34 used with specialized freezing desalination cell/unit 270 can vary (one, two, three or more acoustic pressure shock wave devices 34), based on desalination necessities and cost/benefit of freezing desalination system.

In FIG. 27 and FIG. 28, the acoustic pressure shock waves 10 (due to their acoustic streaming and cavitational water jets) can rapidly separate the ice at the top of freezing desalination cell/unit enclosure 271 from concentrated brine slush 280 that accumulates at the bottom of freezing desalination cell/unit enclosure 271. The normal flow of liquid/fluid/water through freezing desalination cell/unit enclosure 271 pushes desalinated ice 281 towards desalinated ice outlet 277 and concentrated brine slush 280 towards concentrated brine slush outlet 276. The specialized freezing desalination cells/units 270 are modular in their construction and can be incorporated in modular systems/array systems as the ones presented in FIG. 29 and FIG. 30. Based on how specialized freezing desalination cells/units 270 are used (as individual cell/unit or as part of a modular systems/array systems), desalinated ice 281 goes directly to a pure water reservoir 227 or to the next specialized freezing desalination cell/unit 270 for further processing, and concentrated brine slush 280 goes to a concentrated brine slush reservoir 299 or to the next specialized freezing desalination cell/unit 270 for further desalination.

Figure 29:
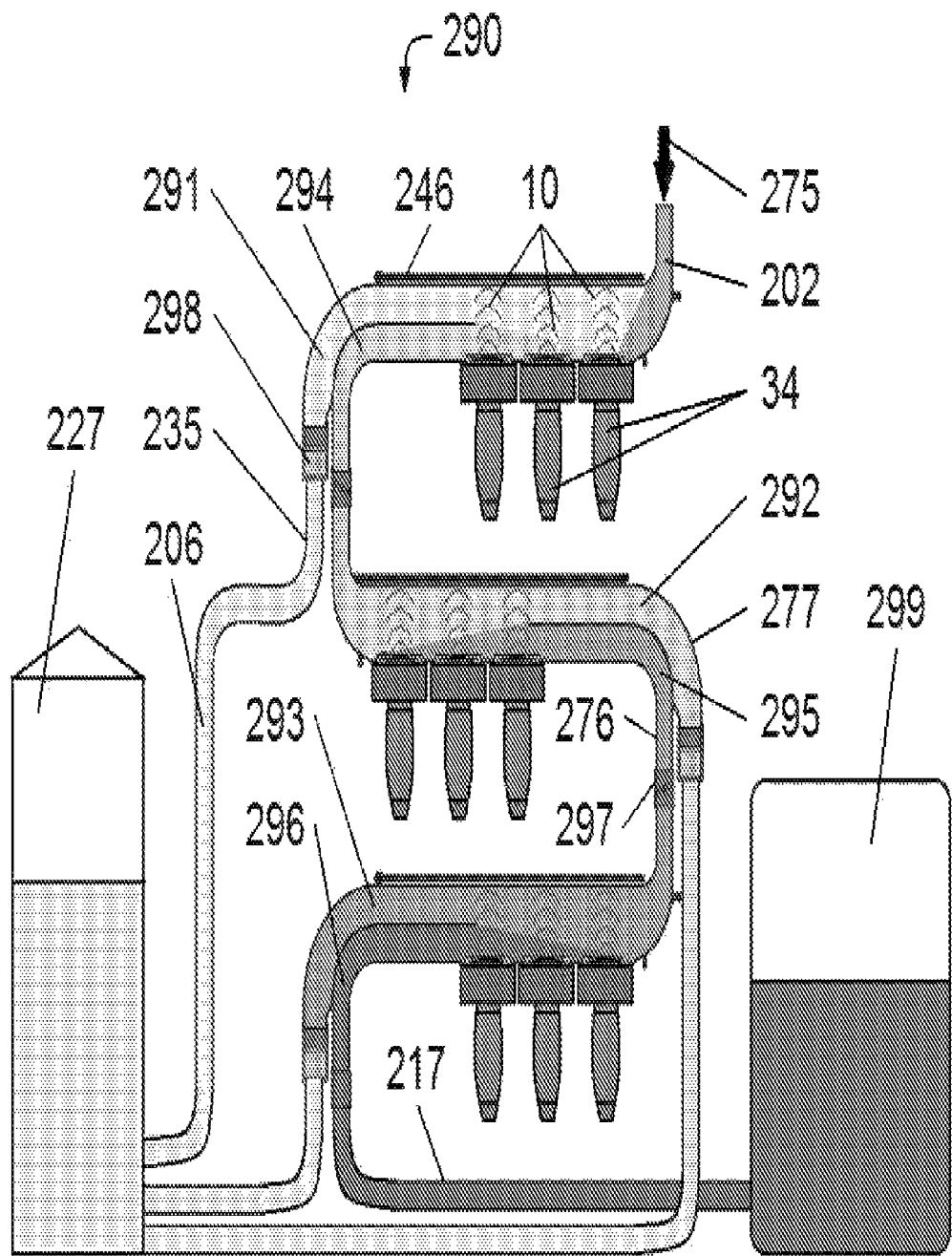
FIG. 29 is a schematic representation illustrating use of acoustic pressure shock wave devices for water desalination in a large array system that has multiple cells/units presented in FIG. 27 and FIG. 28, according to one embodiment of the present invention.

The embodiment from FIG. 29 presents the use of acoustic pressure shock waves 10 for freezing desalination in a large array of freezing desalination cells/units 290, that has multiple specialized freezing desalination cell/unit 270, as the ones presented in FIG. 27 and FIG. 28. In this case, three specialized freezing desalination cells/units 270 are used and are interconnected, each of them performs a cycle of the overall system desalination process (practically, this system is having three specialized freezing desalination cell/unit 270 that perform three different freezing desalination cycles). These systems are used for desalination of salt water/industrial brine 202 that have a high concentration of salt and also for increasing system efficiency. The pretreated (filtration, cleaning and possible chilling) salt water/industrial brine 202 enters via salt water/industrial brine inlet 275. After entering the first specialized freezing desalination cell/unit 270, salt water/industrial brine 202 is subject to freezing crystallization via the chilling effect provided by refrigeration coil 246. For a more rapid crystallization and prevention of deposit of ice on the walls of freezing desalination cell/unit enclosure 271, acoustic pressure shock waves 10 can be delivered continuously or intermittent during crystallization process to ensure the steering of the slush solution. Sensors (not specifically shown in FIG. 29) can be used to monitor the freezing temperature and adjust the output of refrigeration system 245. After ice crystallization is accomplished (without creating excessive ice accumulation), acoustic pressure shock wave devices 34 have their energy output adjusted/increased in order to deliver directional acoustic pressure shock waves 10 tuned to perform a rapid and efficient separation of the first cycle desalinated ice 291 from the first cycle concentrated brine slush 294. The first cycle desalinated ice 291, separated by acoustic pressure shock waves 10 at the top of the first specialized freezing desalination cell/unit 270, is pushed via desalinated ice outlet 277 by the normal flow of liquid/fluid/water through freezing desalination cell/unit enclosure 271 towards ice melting system/heat exchanger 298, where ice crystals are melted and transformed in pure water 206. Pure water collection pipes 235 will guide pure water 206 collected from any of the three specialized freezing desalination cells/units 270 towards pure water reservoir 227. On its turn, the first cycle concentrated brine slush 294 is pushed from the bottom (where accumulates) of the first specialized freezing desalination cell/unit 270 through concentrated brine slush outlet 276 and pipe connector 297, towards the input port of the second specialized freezing desalination cell/unit 270 for further desalination. Going through the same freeze desalination process (as described for the first specialized freezing desalination cell/unit 270), the second specialized freezing desalination cell/unit 270 produces a further desalination and the output will be the second cycle desalinated ice 292 and the second cycle concentrated brine slush 295. Similarly, the third specialized freezing desalination cell/unit 270 will output the third cycle desalinated ice 293 and the third cycle concentrated brine slush 296. The second cycle desalinated ice 292 and third cycle desalinated ice 293 are sent through the ice melting system/heat exchanger 298, via the pure water collection pipes 235 and towards the pure water reservoir 227. The third cycle concentrated brine slush 296 is sent through the brine concentrate pipe 217 towards the concentrated brine slush reservoir 299 for storage or later discharge. The three freeze desalination cycles performed by the array of freezing desalination cells/units 290 will ensure that desalination is efficient and complete.

Figure 30:
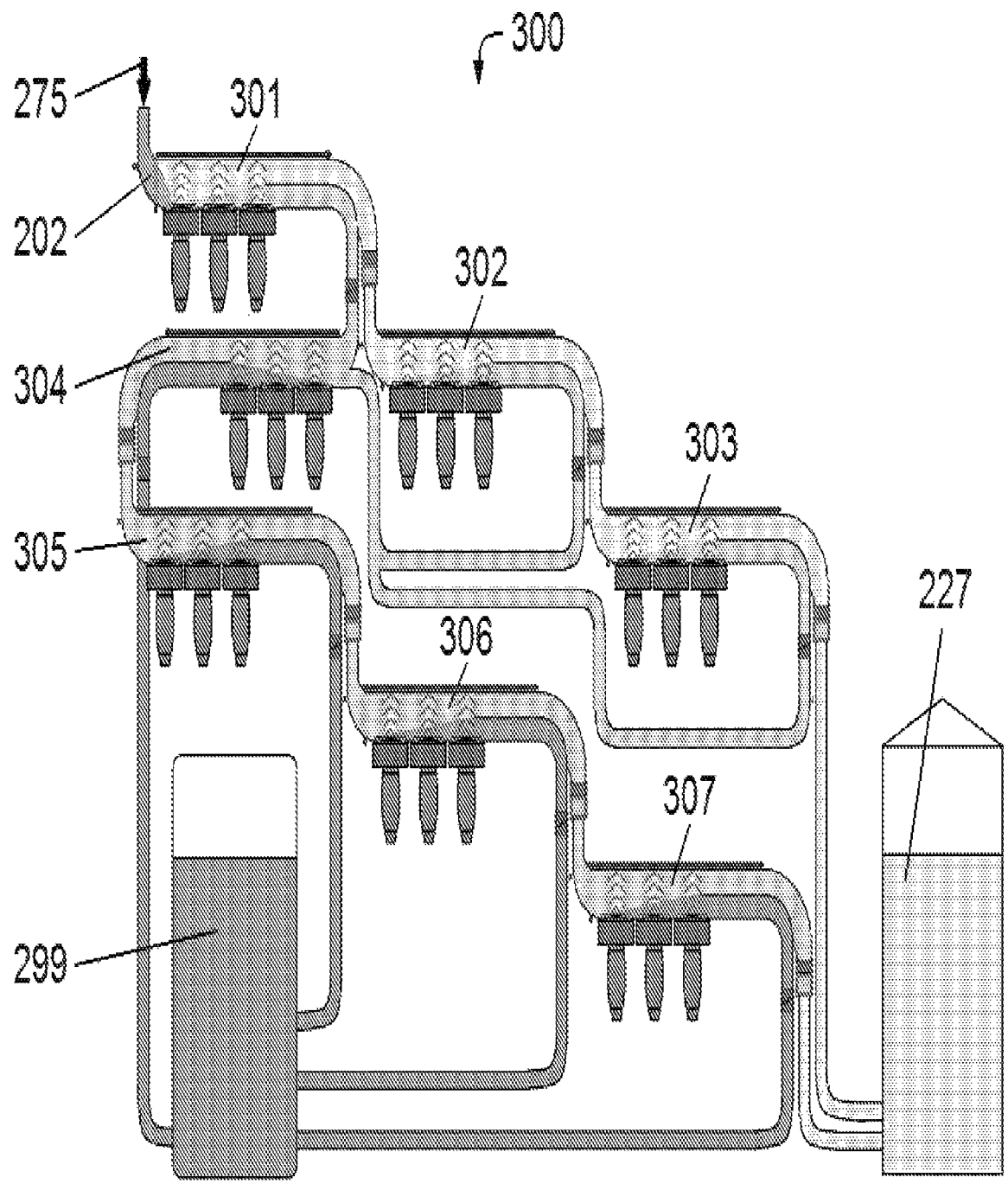
FIG. 30 is a schematic representation illustrating use of acoustic pressure shock wave devices for water desalination in a large array system that has multiple cells/units presented in FIG. 27 and FIG. 28, according to one embodiment of the present invention.

The embodiment from FIG. 30 presents the use of acoustic pressure shock waves 10 for freezing desalination in a large double-tier array of freezing desalination cells/units 300, that has multiple specialized freezing desalination cell/unit 270, as the ones presented in FIG. 27 and FIG. 28. Large double-tier array of freezing desalination cells/units 300 are used for freezing desalination of highly concentrated brine solutions and this is the reason why it requires multiple cycles and tiers to achieve a proper drop in salinity. The first array tier is formed by first cycle freezing desalination cell/unit for desalinated water tier 301, second cycle freezing desalination cell/unit for desalinated water tier 302 and third cycle freezing desalination cell/unit for desalinated water tier 303. This tier produces subsequent desalination of desalinated ice collected from the top of specialized freezing desalination cell/units 301, 302 and 303. Practically, due to brine entrapped inside ice crystals or presence of attached brine to the outer surface of crystals, the first cycle freezing desalination cell/unit for desalinated water tier 301 cannot produce pure water 206 and it requires additional two cycles to get to pure water/drinkable water stored in pure water reservoir 227. The second array tier is designed to continue desalination of brine slush 280, produced by the first cycle freezing desalination cell/unit for desalinated water tier 301. This second array tier is formed by the first cycle freezing desalination cell/unit for residual brine tier 304, second cycle freezing desalination cell/unit for residual brine tier 305, third cycle freezing desalination cell/unit for residual brine tier 306 and fourth cycle freezing desalination cell/unit for residual brine tier 307. The second tier requires four freezing desalination cells/units due to the fact that brine gets gradually more concentrated and it requires more freezing desalination cells/units 304, 305, 306 and 307 to separate as much as possible and feasible water out of brine slush 280. Concentrated brine slush 280 is collected from all four cells/units 304, 305, 306 and 307 into concentrated brine slush reservoir 299. In this way, salt water/industrial brine 202 enters the double-tier array of freezing desalination cells/units 300 via salt water/industrial brine inlet 275, gets the appropriate freezing desalination process to obtain the best output relatively to the cost.

Figure 31:
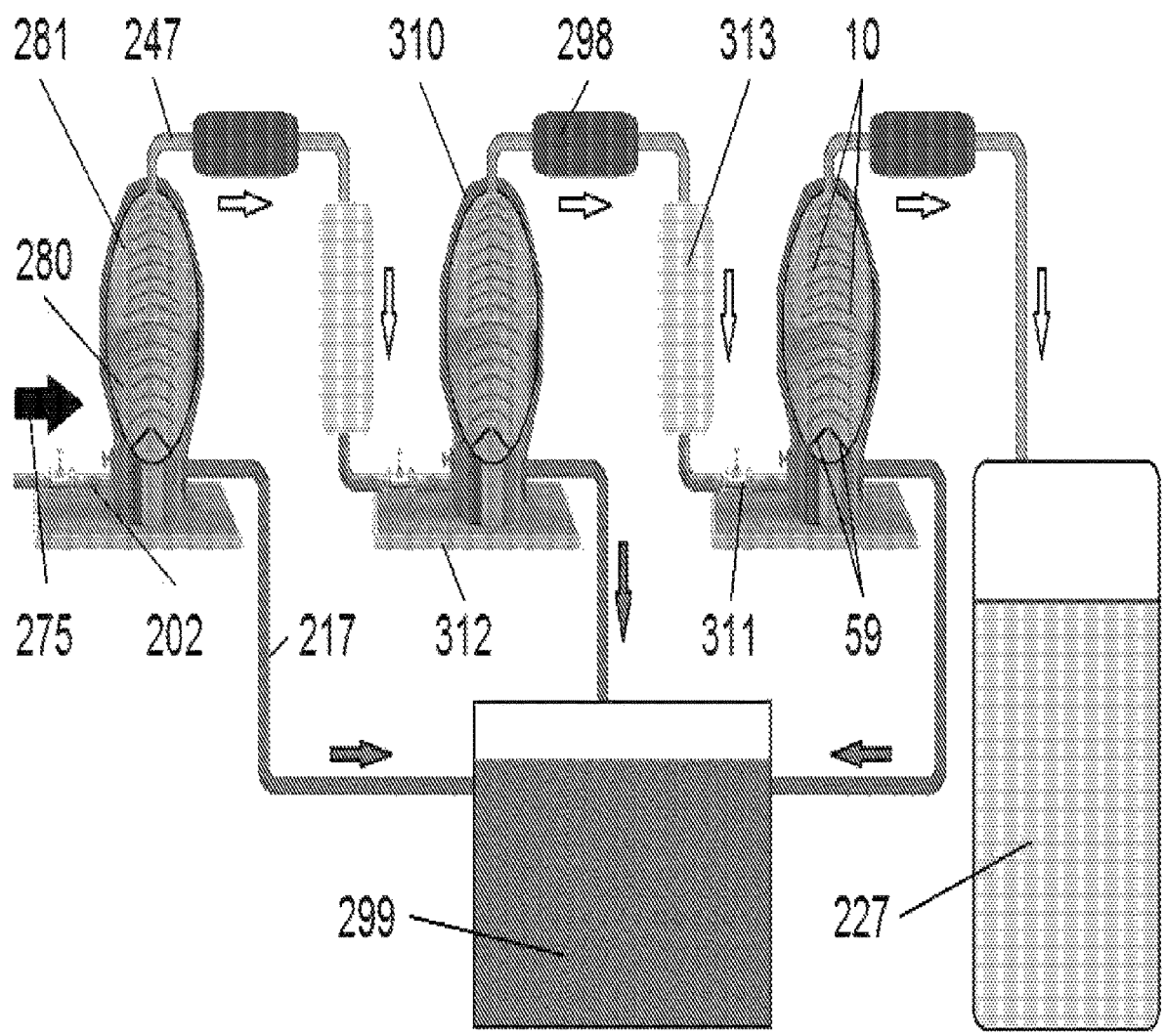
FIG. 31 is a schematic representation of a large system used for water desalination that employs acoustic pressure shock waves and full ellipsoidal tanks according to one embodiment of the present invention.

In FIG. 31 is presented an embodiment that uses specialized freezing desalination ellipsoidal tanks 310 that employ acoustic pressure shock waves 10 and full ellipsoidal tanks, similar in construction to those presented in FIG. 5B and FIG. 5C. The advantage of full ellipsoidal tanks is that a larger reflection area for acoustic pressure shock waves 10 is available (full ellipsoid and not half ellipsoid, as for the acoustic pressure shock wave devices 34 presented through-out this patent), which creates pressure gradients and unidirectional movement of acoustic pressure shock waves 10 that helps with stronger acoustic streaming and cavitational jets. Each of specialized freezing desalination ellipsoidal tanks 310 is standing on a tank base 312 that assures its stability. In the embodiment from FIG. 31, salt water/industrial brine 202 is introduced into desalination station via salt water/industrial brine inlet 275. Salt water/industrial brine 202 comes pretreated into the station, which includes cleaning, filtration, and partial chilling. The specialized freezing desalination ellipsoidal tanks 310 have their wall construction, to include an envelope or pipes used to circulate refrigerant/freezing agent for continuous chilling of salt water/industrial brine 202 to produce the freeze crystallization of ice crystals. The electrodes 59 produce acoustic shock waves 10 inside specialized freezing desalination ellipsoidal tanks 310. Acoustic pressure shock waves 10 can be used intermittently or continuously for the crystallization period (helps with the chilling), and also for the ice crystals separation (desalinated ice 281) from concentrated brine slush 280. An automated control system can regulate the flow through the freeze desalination station and also the settings for a certain energy output given by acoustic pressure shock waves 10 (low energy output for the crystallization period, and high energy output for the ice crystals separation period).

The freeze desalination station presented in FIG. 31 includes three interconnected freezing desalination ellipsoidal tanks 310. The output from the first specialized freezing desalination ellipsoidal tank 310 is connected to the input of the second specialized freezing desalination ellipsoidal tanks 310 its output is connected to the third specialized freezing desalination ellipsoidal tanks 310, which practically describes a serial arrangement. In each specialized freezing desalination ellipsoidal tank 310, due to upwards action of acoustic pressure shock waves 10, desalinated ice 281 accumulates at the top of specialized freezing desalination ellipsoidal tank 310 from where desalinated ice 281 is pushed or vacuumed through ice collection pipe 247 towards ice melting system/heat exchanger 298, where the ice crystals are melt in a solution (although still having low temperature). After the melting into ice melting system/heat exchanger 298, the desalinated water is filtered in filtration unit 313 and then goes through another cycle of freezing desalination in the second specialized freezing desalination ellipsoidal tank 310 (as the arrows indicate). The desalination process is continuously achieved in each of the three specialized freezing desalination ellipsoidal tanks 310 until the quality of the desalinated water meets the drinking water standards. Pure water is stored in pure reservoir 227 and residual concentrate brine slush 280 is send via brine concentrate pipe 217 from each specialized freezing desalination ellipsoidal tank 310 towards concentrated brine slush reservoir 299. The flow of liquid/fluid/water through desalination station is controlled by a pumping system (not shown for simplicity and clarity in FIG. 31) and a series of valves 311.

The desalination with combination of freezing and acoustic pressure shock waves 10 can be used for high concentrated industrial brines. The embodiments from FIG. 24, FIG. 25, FIG. 27, FIG. 28, FIG. 29, FIG. 30 and FIG. 31 can be used to lower the percentage of salt from high concentrated industrial brines to a manageable point to allow an efficient use of existing high energetic technologies as Reversed Osmosis, Electrodialysis or Multi Stage Flash Distillation. In the case of Multi Stage Flash Distillation the acoustic pressure shock waves 10 can be used to reduce and eliminate the scale formation produced by calcium sulfate, as presented in detail in US 2015/0337630.

For the systems presented in FIG. 24, FIG. 25, FIG. 27, FIG. 28, FIG. 29, FIG. 30 and FIG. 31 in order to reduce the energy consumption for freezing desalination of sea/ocean waters, the collection of water should be done from locations away from the shore at deep depth, where the sea/ocean water is naturally cooler.

For the embodiments presented in FIG. 24, FIG. 25, FIG. 27, FIG. 28, FIG. 29, FIG. 30 and FIG. 31, in the case of industrial brine that needs to be stored before desalination process in storage tanks, the construction and design of such storage tanks can be done from materials that prevent heating-up of the brine during storage in spring, summer or fall. Also, these storage tanks for brine can be underground tanks in order to preserve cooler temperatures than the ambient temperature of the air.

When acoustic pressure shock waves 10 are used together with freezing desalination, the acoustic pressure shock waves 10 can work both upwards (push the ice to the top of the enclosure/tank faster) or downwards (push down the brine out of the ice crystals and thus the water ice crystals can float at the top). This means that for the systems presented in FIG. 24, FIG. 25, FIG. 27, FIG. 28, FIG. 29, FIG. 30 and FIG. 31 that have the acoustic pressure shock waves 10 moving in an upward direction, can also have the acoustic pressure shock waves 34 pointing downwards to create acoustic pressure shock waves 10 that are moving in a downward direction.

High concentration salt water/industrial brine 202 when is desalinated in embodiments presented in FIG. 24, FIG. 25, FIG. 27, FIG. 28, FIG. 29, FIG. 30, FIG. 31, the ice crystals may entrap or have salt ions attached to their surface. To clean the ice crystals from salt the fresh water is used to wash the attached brine to the ice crystals (in dedicated systems that are not shown in the figures of this patent for simplicity and clarity of the figures). The washing of salt from the ice crystals is based on the fact that fresh water freezes as it attaches to each layer of ice crystals and thus is displacing the very thin viscous salty brine layer from the interstices between the ice particles. Instead of using this method, the acoustic pressure shock waves 10 can be used to push the brine from in between ice crystals and thus avoiding the use of fresh water wash for each step of the desalination. If needed, such a wash can be employed only at the last step of the desalination process.

Figure 32:
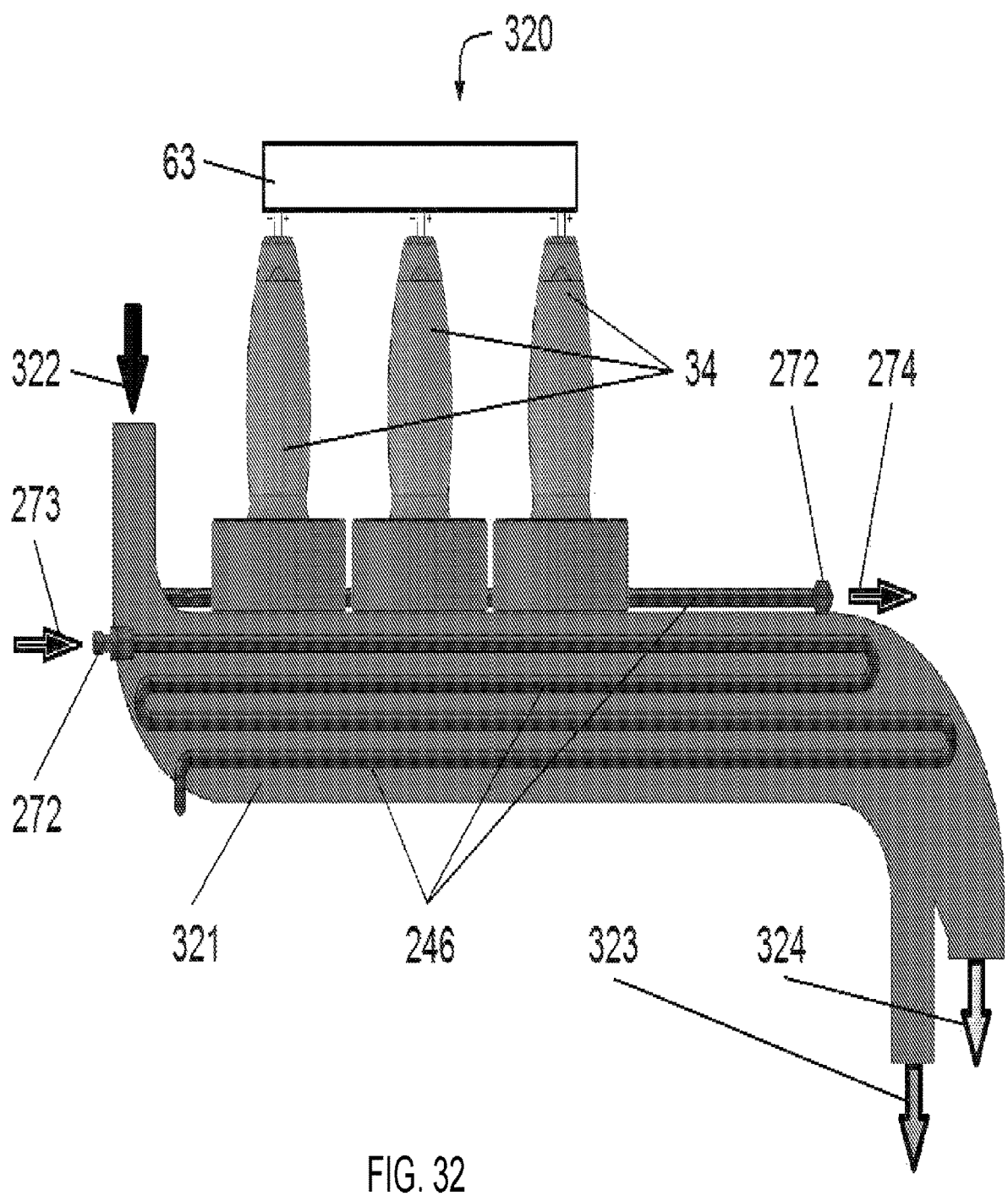
FIG. 32 is a schematic representation illustrating a cell/unit that uses acoustic pressure shock wave devices to separate heavy water from normal water, according to one embodiment of the present invention.
Figure 33:
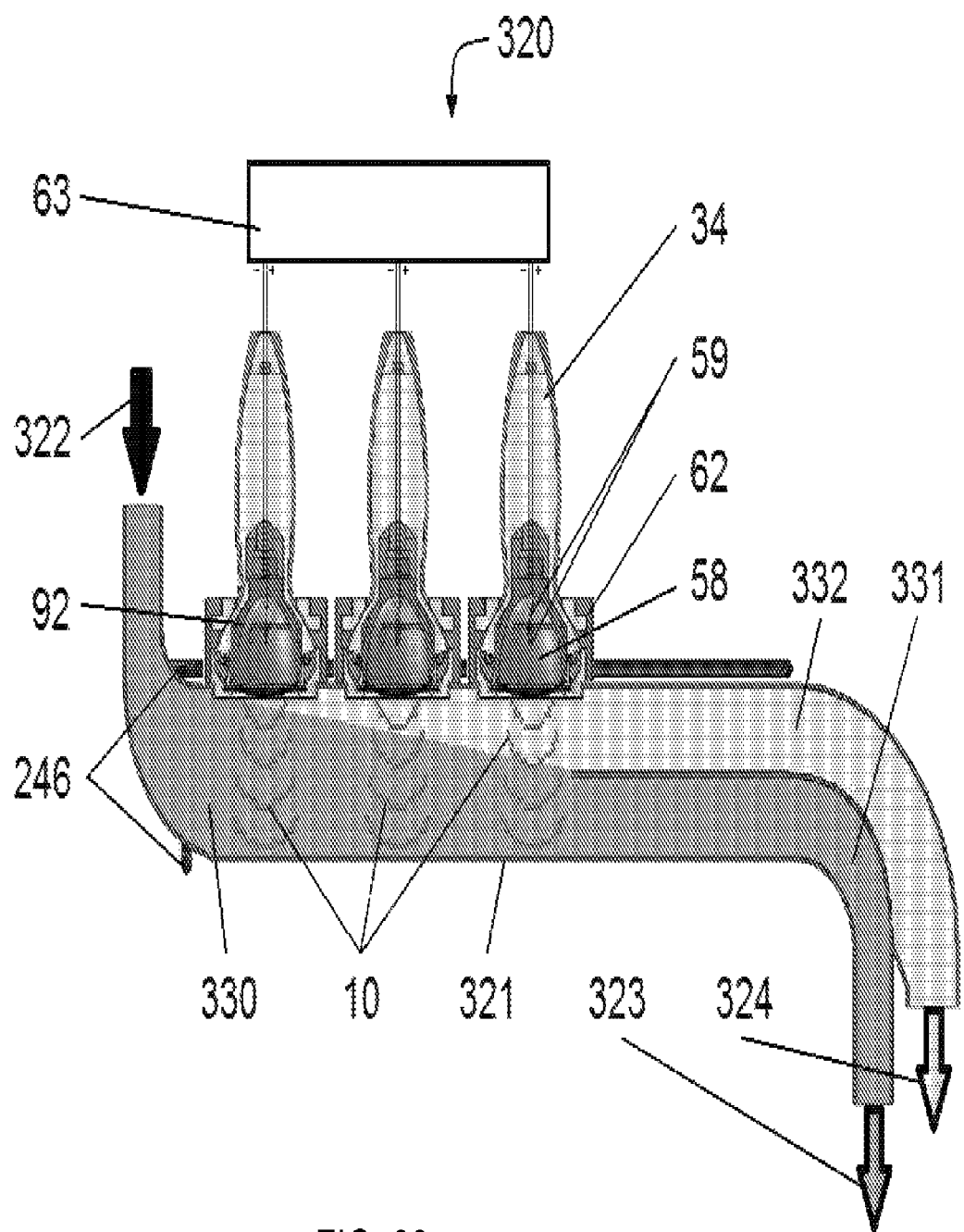
FIG. 33 is a cross-sectional schematic representation of the cell/unit presented in FIG. 32 illustrating use of acoustic pressure shock wave devices to separate heavy water from normal water, according to one embodiment of the present invention.

FIG. 32 and FIG. 33 present the embodiment of a tritiated water/heavy water separation cell/unit 320 that uses acoustic pressure shock wave devices 34 to separate tritiated water/heavy water 331 from normal water/light water 332. The US 2005/0279129 is presenting a method to separate heavy water from regular water by lowering the temperature of the mixture to the melting point of the heavy water, which is 4.49° C. Practically, a mixture of the tritiated water/heavy water and normal water/light water 330 when chilled below 4.49° C., will allow the frozen/solid state tritiated water/heavy water 331 to fall to the bottom of the tritiated water/heavy water separation cell/unit 320 and the normal water/light water 332 will rise to the top. By using highly unidirectional downward acoustic pressure shock waves 10 the separation process of the tritiated water/heavy water 331 from normal water/light water 332 can be expedited and thus make it more compelling to be used at industrial scale.

The specialized tritiated water/heavy water separation cell/unit 320 are designed in such way that allow enough residence time of the mixture of the tritiated water/heavy water and normal water/light water 330 inside the tritiated water/heavy water separation cell/unit enclosure 321 to produce a slush made of normal water/light water 332 and ice crystals of tritiated water/heavy water 331. The freezing process is produced by an indirect refrigeration system 245 (not specifically shown in FIG. 32 and FIG. 33, but shown in FIG. 24 and FIG. 25). What can be seen in FIG. 32 and FIG. 33 are the refrigeration coil 246 and the refrigeration coil connectors 272 that are used to connect to the main/central refrigeration system 245. The refrigerant/freezing agent inlet 273 allows the refrigerant/freezing agent to enter the wrap around refrigeration coil 246 and the refrigerant/freezing agent exits through the chilling/freezing agent outlet 274. The flow speed of the refrigerant/freezing agent inside the refrigeration coil 246, properties of materials used in construction of the refrigeration coil 246 and tritiated water/heavy water separation cell/unit 320 dictate the efficiency of the freezing process and the speed with which the ice crystals of tritiated water/heavy water 331 develop.

The acoustic pressure shock wave devices 34 from FIG. 32 and FIG. 33 are getting electric energy from the acoustic pressure shock wave generator 63 in order to produce the acoustic pressure shock waves 10 inside the specialized tritiated water/heavy water separation cell/unit 320. During the freezing process the acoustic pressure shock wave devices 34 can be used to mix (intermittent on continuously) the mixture of the tritiated water/heavy water and normal water/light water 330, in order to expedite the ice crystallization process for the tritiated water/heavy water 331. To further accelerate the freezing process chilled hollow microspheres 260 (as the ones presented in FIG. 26) can be used inside the tritiated water/heavy water separation cell/unit 320. The acoustic pressure shock wave devices 34 receive energy from the acoustic pressure shock wave generator 63 to produce the acoustic pressure shock waves 10 via high voltage discharge in between electrodes 59 and inside clean liquid/fluid/water propagation medium 58, encompassed by the membrane 57 and acoustic pressure shock wave reflector 92. The role of the acoustic pressure shock wave reflector 92 is to focus the acoustic pressure shock waves inside the specialized tritiated water/heavy water separation cell/unit 320 to produce the separation of ice crystals of tritiated water/heavy water 331 from the normal water/light water 332. The acoustic pressure shock wave devices 34 are kept in place and in sealed contact with the tritiated water/heavy water separation cell/unit 320 by the connecting and sealing assembly 62. The number of acoustic pressure shock wave devices 34 used with the tritiated water/heavy water separation cell/unit 320 can vary (one, two, three or more acoustic pressure shock wave devices 34) based on necessities and cost/benefit of the heavy water separation system.

In FIG. 32 and FIG. 33 the acoustic pressure shock waves 10 (due to their downward acoustic streaming and cavitational water jets) can rapidly separate the ice produced by the tritiated water/heavy water 331 at the bottom of the tritiated water/heavy water separation cell/unit enclosure 321 from the normal water/light water 332 that accumulates at the top of the tritiated water/heavy water separation cell/unit enclosure 321. The normal flow of liquid/fluid/water through the tritiated water/heavy water and normal water/light water 330 pushes ice crystals of the tritiated water/heavy water 331 towards the frozen tritiated water/heavy water outlet 323 and the normal water/light water 332 towards the normal water/light water outlet 324. The specialized tritiated water/heavy water separation cells/units 320 are modular in their construction and can be incorporated in modular systems/array systems as the one presented in FIG. 34. Based on how the specialized tritiated water/ heavy water separation cell/unit 320 are used (as individual cell/unit or as part of a modular systems/array systems) the normal water/light water 332 goes directly to a normal water/light water reservoir 347 and the ice crystals of tritiated water/heavy water 331 to a tritiated water/heavy water slush reservoir 348 or to the next tritiated water/heavy water separation cell/unit 320 for further processing.

Figure 34:
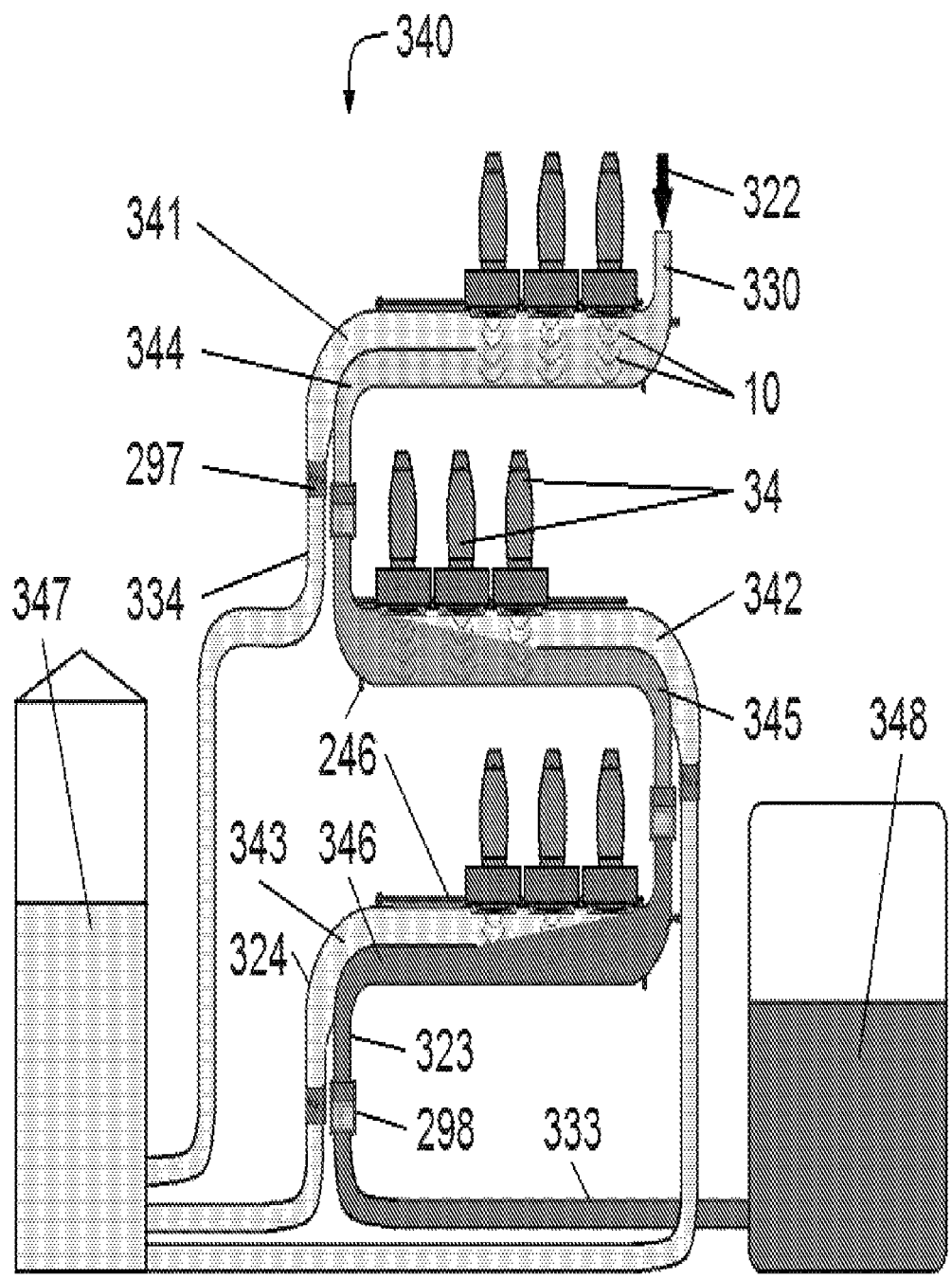
FIG. 34 is a schematic representation illustrating use of acoustic pressure shock wave devices to separate heavy water from normal water in a large array system that has multiple cells/units presented in FIG. 32 and FIG. 33, according to one embodiment of the present invention.

The embodiment from FIG. 34 presents the use of acoustic pressure shock waves 10 for separation of tritiated water/heavy water 331 from normal water/light water 332 in a large array of tritiated water/heavy water separation cell/unit 340 that has multiple specialized tritiated water/heavy water separation cells/units 320, as the ones presented in FIG. 32 and FIG. 33. In this case three tritiated water/heavy water separation cells/units 320 are used that are interconnected and each of them performs a cycle of the overall freezing separation process of tritiated water/heavy water 331 from normal water/light water 332 (this system is having practically three specialized tritiated water/heavy water separation cells/units 320 that will perform three different freezing separation cycles). These systems are used for separation of tritiated water/heavy water 331 from normal water/light water 332, when there is a high concentration of tritiated water/heavy water 331 in the system, and also for increasing the system efficiency. The mixture of tritiated water/heavy water and normal water/light water 330 enters via the mixture of the tritiated water/heavy water and the normal water/light water inlet 322. After entering the first tritiated water/heavy water separation cells/units 320 the mixture of tritiated water/heavy water and normal water/light water 330 is subject to freezing crystallization via chilling effect provided by refrigeration coil 246. For a more rapid crystallization and prevention of deposition of ice crystals from tritiated water/heavy water 331 on the walls of tritiated water/heavy water separation cell/unit enclosure 321, acoustic pressure shock waves 10 can be delivered continuously or intermittent during crystallization process to ensure steering of the slush solution. Sensors (not specifically shown in FIG. 29) can be used to monitor the freezing temperature and adjust the output of refrigeration system 245. After the ice crystallization, tritiated water/heavy water 331 is accomplished (without creating excessive ice accumulation), acoustic pressure shock wave devices 34 have their energy output adjusted/increased in order to deliver directional acoustic pressure shock waves 10 tuned to perform a rapid and efficient separation of the first cycle normal water/light water 341 from the first cycle tritiated water/heavy water ice crystals 344. The first cycle tritiated water/heavy water ice crystals 344 separated by acoustic pressure shock waves 10, at the bottom of the first specialized tritiated water/heavy water separation cell/unit 320, are pushed via frozen tritiated water/heavy water outlet 323 by the normal flow of liquid/fluid/water through tritiated water/heavy water separation cell/unit 320 towards ice melting system/heat exchanger 298, where tritiated water/heavy water 331 ice crystals are melted. Then, the first cycle of tritiated water/heavy water 344 will enter the second tritiated water/heavy water separation cell/unit 320 for further processing. On its turn, the first cycle normal water/light water 341 is pushed from the top of the first tritiated water/heavy water separation cells/units 320 through the normal water/light water outlet 324 and pipe connector 297 via normal water/light water pipe 334 towards the normal water/light water reservoir 347. Going through the same freeze separation process (as described for the first tritiated water/heavy water separation cells/units 320), the second tritiated water/heavy water separation cells/units 320 produces a further freezing separation and the output will be the second cycle normal water/light water 342 and the second cycle tritiated water/heavy water ice crystals 345. Similarly, the third tritiated water/heavy water separation cells/units 320 will output the third cycle normal water/light water 343 and the third cycle tritiated water/heavy water ice crystals 346. The second cycle tritiated water/heavy water ice crystals 345 is sent through ice melting system/heat exchanger 298 and towards the third water/heavy water separation cells/units 320. The third cycle tritiated water/heavy water ice crystals 346 are sent through ice melting system/heat exchanger 298 via tritiated water/heavy water slush pipe 333 towards tritiated water/heavy water slush reservoir 348. The second cycle normal water/light water 342 and the third cycle normal water/light water 343 are sent through normal water/light water pipes 334 towards normal water/light water reservoir 347. The three freeze separation cycles performed by array of tritiated water/heavy water separation cells/units 340 will ensure that separation of tritiated water/heavy water 331 from normal water/light water 332 is efficient and complete.

Figure 35:
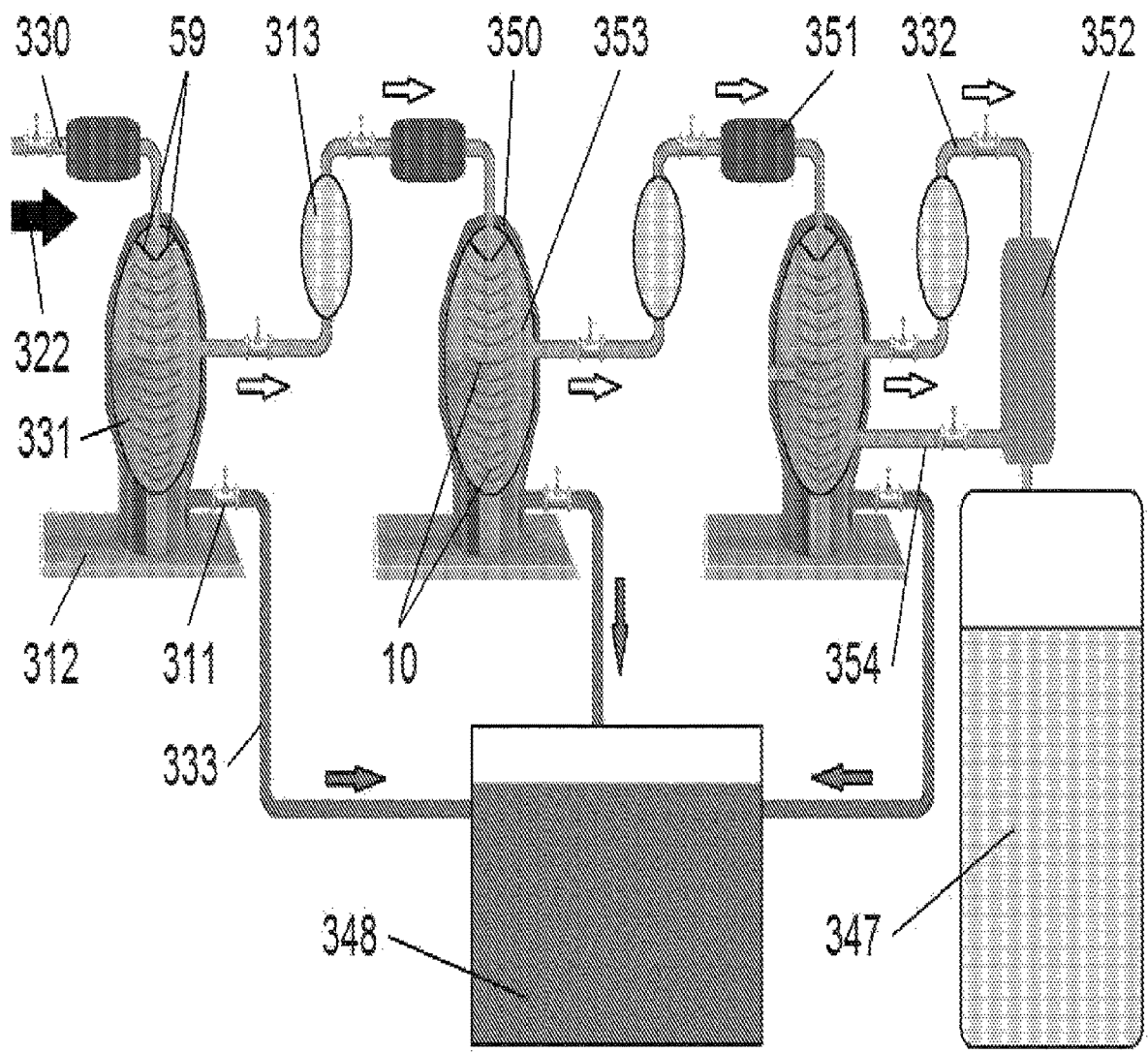
FIG. 35 is a schematic representation of a large system used to separate heavy water from normal water that uses acoustic pressure shock wave devices and full ellipsoidal tanks, according to one embodiment of the present invention.

In FIG. 35 is presented an embodiment that use specialized freezing separation ellipsoidal tanks for tritiated water/heavy water 350 that employs acoustic pressure shock waves 10 and full ellipsoidal tanks similar in construction to those presented in FIG. 5B and FIG. 5C. The advantage of the full ellipsoidal tanks is that a larger area for reflection of acoustic pressure shock waves 10 is available (full ellipsoid and not half ellipsoid as for the acoustic pressure shock wave devices 34 presented throughout this patent), which creates pressure gradients and unidirectional movement of acoustic pressure shock waves 10 that helps with stronger acoustic streaming and cavitational jets. Each of specialized freezing separation ellipsoidal tanks for tritiated water/heavy water 350 is standing on a tank base 312 that assures its stability. In the embodiment from FIG. 35, the mixture of tritiated water/heavy water and normal water/light water 330 is introduced into the freeze separation station via mixture of tritiated water/heavy water and normal water/light water inlet 322. Immediately, the mixture of tritiated water/heavy water and normal water/light water 330 enter chiller 351, where most of temperature dropping occurs. However, specialized freezing separation ellipsoidal tanks for tritiated water/heavy water 350 can also have their wall construction to include an envelope or pipes set to circulate refrigerant/freezing agent for continuous chilling of mixture of tritiated water/heavy water and normal water/light water 330, to produce the freeze crystallization of ice crystals from tritiated water/heavy water 331. Electrodes 59 generate acoustic shock waves 10 inside specialized freezing separation ellipsoidal tanks for tritiated water/heavy water 350. Acoustic pressure shock waves 10 can be used intermittently or continuously for the crystallization period (helps with chilling), and also for the separation of tritiated water/heavy water 331 ice crystals from the mixture of tritiated water/heavy water and normal water/light water 330. An automated control system can regulate the flow through the freeze separation station, and also the settings for a particular energy output given by acoustic pressure shock waves 10 (low energy output for the crystallization period, and high energy output for the ice crystals separation period).

The freeze separation station presented in FIG. 35 includes three interconnected specialized freezing separation ellipsoidal tanks for tritiated water/heavy water 350. These freezing separation stations are used for heavily contaminated waters, where it is necessary to have more than one cycle to process contaminated water in order to get rid of tritiated water/heavy water 331. The output from the first specialized freezing separation ellipsoidal tank for tritiated water/heavy water 350 is connected to the input of the second specialized freezing separation ellipsoidal tank for tritiated water/heavy water 350, and its output is connected to the third specialized freezing separation ellipsoidal tank for tritiated water/heavy water 350, which practically describes a serial arrangement. Note that the output from each specialized freezing separation ellipsoidal tank for tritiated water/heavy water 350 is done from the middle of the tank, from where partially decontaminated water 353 is collected for further decontamination/processing. After leaving the first specialized freezing separation ellipsoidal tank for tritiated water/heavy water 350, partially decontaminated water 353 goes through a filtration unit 313 and then enters chiller 351, where its temperature is dropped for the second freezing separation cycle that takes place into the second specialized freezing separation ellipsoidal tank for tritiated water/heavy water 350. The same process and arrangement is repeated for the third specialized freezing separation ellipsoidal tank for tritiated water/heavy water 350. However, at the output from the third specialized freezing separation ellipsoidal tank for tritiated water/heavy water 350, normal water/light water 332 should be found, which is filtered into filtration unit 313, then goes through a radiation level control unit 352 ensure complete decontamination of tritiated water/heavy water 331. If it passes the necessary decontamination level, normal/regular water/light water 332 is then stored inside the normal water/light water reservoir 347. If it does not pass the necessary decontamination level, partially decontaminated water 353 is sent back via return pipe for insufficient decontaminated water 354 to specialized freezing separation ellipsoidal tank for tritiated water/heavy water 350 for further freezing decontamination process.

In each specialized freezing separation ellipsoidal tanks for tritiated water/heavy water 350 due to downward action of the acoustic pressure shock waves 10, the tritiated water/heavy water 331 ice crystals from the mixture of tritiated water/heavy water and normal water/light water 330 at the bottom of the specialized freezing separation ellipsoidal tanks for tritiated water/heavy water 350 from where the tritiated water/heavy water 331 ice crystals are pushed or vacuum through tritiated water/heavy water slush pipe 333 towards the tritiated water/heavy water slush reservoir 348. The freezing separation/decontamination process is continuously achieved in each of the three specialized freezing separation ellipsoidal tanks for tritiated water/heavy water 350 until the quality of the normal water/light water 330 meets the standards of decontamination. The flow of the liquid/fluid/water through freezing separation/decontamination station is controlled by a pumping system (not shown for simplicity and clarity in FIG. 35) and a series of valves 311.

For freezing desalination systems presented in FIG. 24, FIG. 25, FIG. 27, FIG. 28, FIG. 29, FIG. 30, FIG. 31, and freezing separation systems for tritiated water/heavy water from FIG. 32, FIG. 33, FIG. 34, and FIG. 35, the acoustic pressure shock waves 10 can be used continuously or intermittent. This is dictated by the speed of creating the slurry in respective system, which is mainly influenced by the cooling system efficiency and the flow rate. If acoustic pressure shock waves 10 are used in an intermittent mode, then acoustic pressure shock waves 10 will start based on a temperature sensor (not shown specific in the figures) that senses the required freezing temperature from inside the system, for a specific concentration of salt water 202/brine or of mixture of tritiated water/heavy water and regular/normal water/light water 330. In case of salt water 202, the actual freezing temperature is dictated by the salt concentration from the salt water 202/brine (the higher the concentration of salt, the lower the freezing temperature will be).

Also, for the systems presented in FIG. 24, FIG. 25, FIG. 27, FIG. 28, FIG. 29, FIG. 30, FIG. 31, FIG. 32, FIG. 33, FIG. 34, and FIG. 35 some of the ice melting systems/heat exchangers 298 (involved in freezing desalination or freezing separation systems for tritiated water/heavy water) can have means to recover heat or chilled liquids that can be recycled into the process.

The chilled hollow micro-spheres 260 presented in FIG. 26 can be used as cold seeds to start or expedite the freezing processes for any of the embodiments presented in FIG. 24, FIG. 25, FIG. 27, FIG. 28, FIG. 29, FIG. 30, FIG. 31, FIG. 32, FIG. 33, FIG. 34, and FIG. 35.

For any of the embodiments presented in FIG. 24, FIG. 25, FIG. 27, FIG. 28, FIG. 29, FIG. 30, FIG. 31, FIG. 32, FIG. 33, FIG. 34, and FIG. 35 the acoustic pressure shock waves 10 can also be used to agitate the solution during freezing period, which will allow the reduction of time necessary to create the ice crystals. Using acoustic pressure shock wave agitation combined with the chilled hollow micro-spheres 260 presented in FIG. 26 should significantly expedite the freezing process. For the agitation during freezing period the acoustic pressure shock waves 10 can be used either continuously or intermittently and at lower energy settings, when compared to the separation process of ice crystals from the concentrated brine solution.

For the embodiments from FIG. 24, FIG. 25, FIG. 27, FIG. 28, FIG. 29, FIG. 30, FIG. 31, FIG. 32, FIG. 33, FIG. 34, and FIG. 35 the forces against the tanks/chambers/enclosures walls (suspension freeze concentration/crystallization chamber 244 or freezing desalination cell/unit enclosure 271 or specialized freezing desalination ellipsoidal tank 310 or tritiated water/heavy water separation cell/unit enclosure 321 or specialized freezing separation ellipsoidal tank for tritiated water/heavy water 350) generated by the expansion of ice makes these tanks/chambers/enclosures susceptible for ruptures due to wall stresses. Powerful acoustic pressure shock waves 10 can break the ice and detach any possible ice formation from the cooling surfaces of the tanks/chambers/enclosures where the freezing process takes place, which reduces the risk of tanks/chambers/enclosures ruptures when acoustic pressure shock waves 10 are employed into the freeze process. This represents another advantage of employing acoustic pressure shock waves 10 into the freezing process used for desalination of salt water/industrial brine 202 or separation of tritiated water/heavy water 350 from normal water/light water 332.

For the embodiment presented in FIG. 24, FIG. 25, FIG. 27, FIG. 28, FIG. 29, FIG. 30, FIG. 31, FIG. 32, FIG. 33, FIG. 34, and FIG. 35 sensors (not shown specifically into this figures) can be used. These sensors can measure the liquid/fluid/water flow (inside the freezing tanks/chambers/enclosures or refrigeration pipes or mantles, the salt concentration of salt water/industrial brine 202 that needs desalination, the temperature inside the freezing tanks/chambers/enclosures or of the salt water/industrial brine 202 or of the refrigerant/freezing agent from inside the refrigeration pipes and mantles, the pressure produced by acoustic pressure shock waves 10 to optimize the output of acoustic pressure shock wave devices 34, etc. All of these sensors are used to control economically the functioning of the entire system, via a centralized computer/microprocessor control system.

All embodiments presented in this patent for maintenance and cleaning of water installations require a high longevity/functional life, which dictate a rugged and waterproof construction, and various modalities to generate acoustic pressure shock waves 10, while minimizing the exchange of equipment for function or maintenance. Any of the embodiments presented above can be used as presented or in different combinations or variations, which is based on the complexity and characteristics of each specific application. This can be accomplished via the reflector's design, combination of different reflectors, number of reflectors per each device, total number of devices, etc. Of course, the dosage of the shock waves (number of shock waves, frequency and energy setting) will also dictate the efficiency for maintenance and cleaning of water installations. The described devices from the embodiments of this patent deliver energy for different purposes based on the specific application. The best way to express the energy output for these acoustic pressure shock wave devices is through the energy flux density measured in $mJ/mm^2$. In general, these devices that generate acoustic pressure shock waves 10 used in the embodiments of this patent should be capable of having an energy output of 0.6 up to 100 $mJ/mm^2$.

When the acoustic pressure shock wave technology is used in the water processing, it has some advantages as follows:
- Diminishes the infrastructure (less water processing tanks and foot imprint)
- Reduces waste water processing time
- Eliminates or reduces chemicals need
- It is environmental friendly
- Does not require movable parts, which translates in high reliability
- Reduces installation maintenance costs
- Functions independently or in conjunction with existing technologies
- It is simple to implement and easy scalable
- Can be mobile or fixed
- Has low cost—uses electric energy in the order of 2 and 10 kW-hour, depending on complexity of the system
- It is energy efficient—transforms high voltage into heat and then in focused kinetic energy (at least 90% efficient)

While the invention has been described with reference to exemplary structures and methods in embodiments, the invention is not intended to be limited thereto, but to extend to modifications and improvements within the scope of equivalence of such claims to the invention.

What is claimed is:

1. A method comprising applying acoustic pressure shock waves that have a compressive phase producing high compressive pressure and a tensile phase producing cavitation bubbles that collapse with high speed jets to sludge in a liquid containment.

2. The method of claim 1, further comprising applying the acoustic pressure shock waves to the sludge in wastewater during a biological oxidation process.

3. The method of claim 2, further comprising aerating the wastewater during the biological oxidation process.

4. The method of claim 3, further comprising producing the acoustic pressure shock waves near a mixed liquor surface of the wastewater.

5. The method of claim 2, further comprising producing the acoustic pressure shock waves near a mixed liquor surface of the wastewater.

6. The method of claim 4, wherein the acoustic pressure shock waves are applied from an acoustic pressure shock wave activation device floating on the mixed liquor surface.

7. The method of claim 3, wherein the acoustic pressure shock waves are applied from an acoustic pressure shock wave activation device floating on the mixed liquor surface.

8. The method of claim 6, further comprising moving the acoustic pressure shock wave activation device on the mixed liquor surface with one or more driving motors.

9. The method of claim 5, further comprising moving the acoustic pressure shock wave activation device on the mixed liquor surface with one or more driving motors.

10. The method of claim 1, wherein the sludge is liquid sludge in a filter basket having a filter lining within a dewatering tank and applying acoustic pressure shock waves to dewater the liquid sludge and collecting solid sludge from the basket.

11. The method of claim 10, further comprising moving a floating acoustic pressure shock wave dewater device applying the acoustic pressure waves to dewater the liquid sludge.

12. The method of claim 1, wherein the sludge is frozen sludge and further comprising thawing the frozen sludge over a permeable media, applying acoustic pressure shock waves to dewater the frozen sludge during thawing, and collecting solid sludge from the media.

13. The method of claim 12, further comprising moving an acoustic pressure shock wave dewater device applying the acoustic pressure shock waves to dewater the frozen sludge to push water in a certain zone of sludge sediment.

14. A sludge treatment system comprising a containment with wastewater and sludge that has a fluid surface and an acoustic pressure shock wave device movable across the fluid surface and having a generator that produces acoustic pressure shock waves into the sludge, wherein the acoustic pressure shock wave device floats at the fluid surface.

15. The treatment system of claim 14, wherein the acoustic pressure shock wave device includes one or more driving motors.

16. The treatment system of claim 15, further comprising one or more aerators in the wastewater.

17. A sludge treatment system comprising a containment with wastewater and sludge that has a fluid surface and an acoustic pressure shock wave device movable across the fluid surface and having a generator that produces acoustic pressure shock waves into the sludge, and further comprising one or more aerators in the wastewater.

18. A sludge treatment system comprising a containment with wastewater and sludge that has a fluid surface and an acoustic pressure shock wave device movable across the fluid surface and having a generator that produces acoustic pressure shock waves into the sludge, and further comprising at least one of a filter and filter media positioned in the in the containment beneath the fluid surface.

19. The treatment system of claim 15, further comprising at least one of a filter and filter media positioned in in the containment beneath the fluid surface.

* * * * *